United States Patent
Miller et al.

(10) Patent No.: US 11,833,928 B2
(45) Date of Patent: Dec. 5, 2023

(54) REGENERATIVE BRAKING FOR ELECTRIC AND HYBRID VEHICLES

(71) Applicant: Tomcar Holding Company LLC, Phoenix, AZ (US)

(72) Inventors: Moshe Miller, Rehovot (IL); Jonathan Drori, Kibbutz Zikim (IL); Yoram Zarchi, Givat Hashlosha (IL)

(73) Assignee: Tomcar Holding Company LLC, Phoenix, AZ (US)

( * ) Notice: Subject to any disclaimer, the term of this patent is extended or adjusted under 35 U.S.C. 154(b) by 199 days.

(21) Appl. No.: 17/127,941

(22) Filed: Dec. 18, 2020

(65) Prior Publication Data

US 2021/0178905 A1 Jun. 17, 2021

Related U.S. Application Data

(63) Continuation of application No. 16/177,070, filed on Oct. 31, 2018, now Pat. No. 10,933,752.
(Continued)

(51) Int. Cl.
*B60L 7/18* (2006.01)
*B60L 15/20* (2006.01)
*B60L 58/12* (2019.01)

(52) U.S. Cl.
CPC ............ *B60L 7/18* (2013.01); *B60L 15/2009* (2013.01); *B60L 58/12* (2019.02);
(Continued)

(58) Field of Classification Search
None
See application file for complete search history.

(56) References Cited

U.S. PATENT DOCUMENTS

| 6,054,776 A | 4/2000 | Sumi |
| 2012/0074960 A1 | 3/2012 | Minarcin et al. |

(Continued)

FOREIGN PATENT DOCUMENTS

| KR | 10-2009-0058047 A | 6/2009 |
| KR | 10-2016-0084426 A | 7/2016 |

OTHER PUBLICATIONS

Curtis Insturments, Inc., Manual 1234/36/38 AC Induction Motor Controllers OS 11 with VCL, 2009, 134 pages.
(Continued)

*Primary Examiner* — Tamara L Weber
(74) *Attorney, Agent, or Firm* — Lee Sullivan Shea & Smith LLP

(57) ABSTRACT

A device comprises motor controller coupled to a drive motor and a battery pack of a vehicle. The motor controller comprises a processor that is configured to: determine that the vehicle is engaged in a neutral braking mode, and after determining that the vehicle is engaged in the neutral braking mode: select a neutral braking torque curve, determine a rotational velocity of the drive motor, based on the determined rotational velocity of the drive motor, determine an amount of regenerative braking torque to apply to the drive motor based on the selected neutral braking torque curve, apply the determined amount of regenerative braking torque to the drive motor, wherein applying the determined amount of regenerative braking torque to the drive motor results in a regenerative current generated by the drive motor, and supply the regenerative current to the battery pack to at least partially recharge the battery pack.

20 Claims, 72 Drawing Sheets

Related U.S. Application Data

(60) Provisional application No. 62/662,826, filed on Apr. 26, 2018, provisional application No. 62/579,358, filed on Oct. 31, 2017.

(52) U.S. Cl.
CPC ..... *B60L 2240/12* (2013.01); *B60L 2240/421* (2013.01); *B60L 2240/423* (2013.01)

(56) References Cited

U.S. PATENT DOCUMENTS

| | | |
|---|---|---|
| 2015/0006039 A1 | 1/2015 | Hyun |
| 2016/0318501 A1 | 11/2016 | Oldridge |
| 2018/0011483 A1* | 1/2018 | Ricci .................... G07B 15/063 |
| 2018/0111496 A1* | 4/2018 | Cholewa .................. B60L 1/02 |

OTHER PUBLICATIONS

PCT International Searching Authority, International Search Report and Written Opinion dated Mar. 12, 2020, issued in connection with International Application No. PCT/US2019/029183, filed on Apr. 25, 2019, 11 pages.

International Preliminary Report on Patentability, PCT/US2019/029183, dated Nov. 5, 2020, 8 pages.

\* cited by examiner

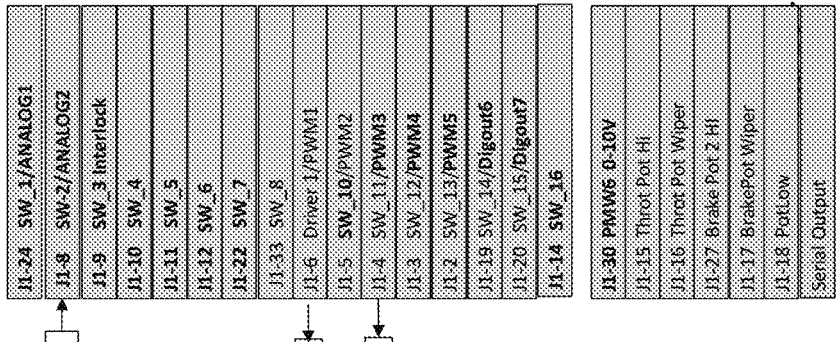
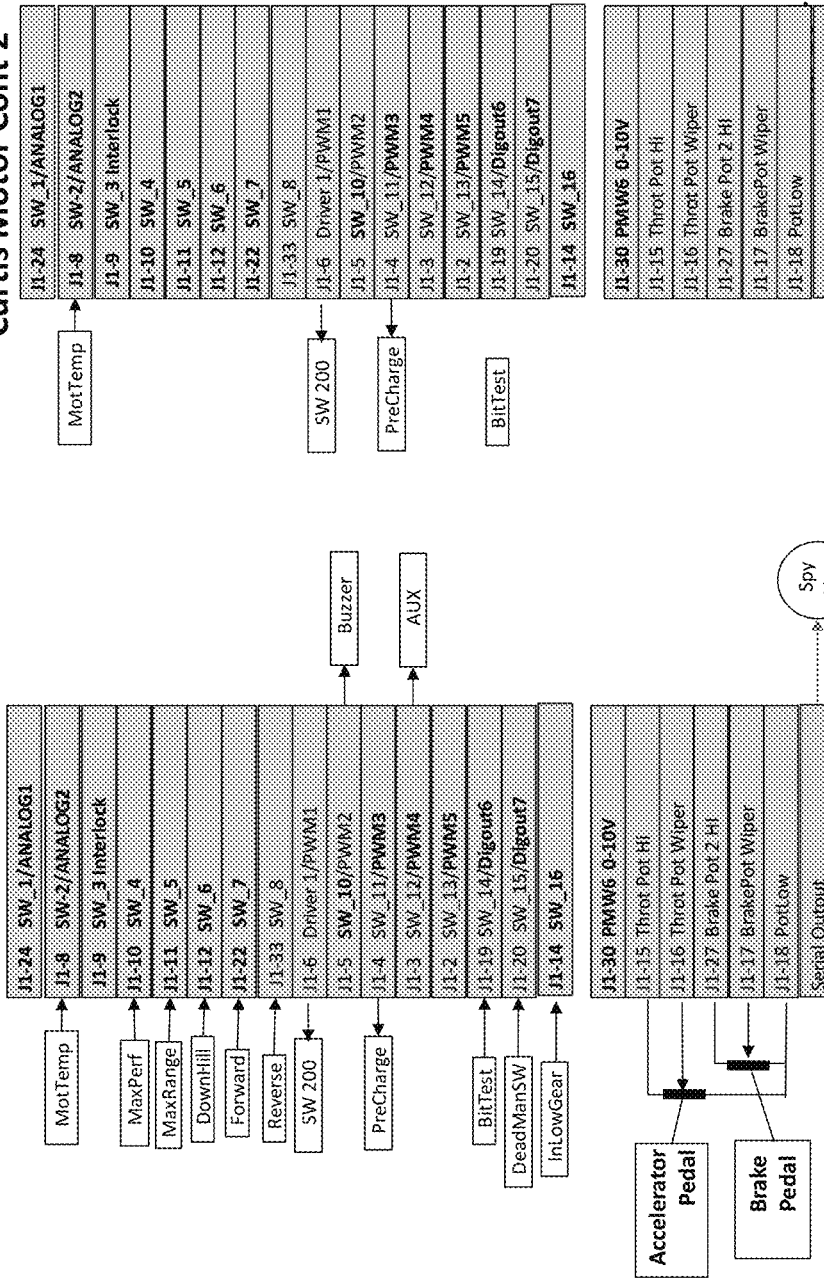
FIG. 4

MainLoop:

Enter BMS_Control    600

Enter VehicleControl_T4

Call Handle_Drive_Current_Limit

Goto MainLoop

640

```
HandleNeutralBrakingTrq:
if (EnableDownhillStrategy = OFF)                                   ; Section 1 Cancel Downhill Strategy
   begin                                                            ;
     My_Neutral_Braking_TrqM = 1638     ;5%
     return
   end;

If (SW_16 = OFF)                                                    :Section 2 In High Gear
  begin      ;Hi Gear
    if (SW_6 = ON)
      begin
        My_Neutral_Braking_TrqM = DownHill_Regen_Map6_Output   ;Section 2a with Downhill
      end
    else
      begin
        My_Neutral_Braking_TrqM = P_User137                    ;Section 2b No Downhill
      end
  end          ;Hi Gear
else
  begin      ;Low Gear                                              :Section  3 In Low Gear
    if (SW_6 = ON)
      begin
        My_Neutral_Braking_TrqM = DownHill_Regen_Map7_Output   ; Section 3a with Downhill
      end
    else
      begin
        My_Neutral_Braking_TrqM = P_User147                    ; Section 3b No Downhill
      end
  end          ;Low Gear
```

Handle_Drive_Current_Limit:

Drive_Current_Limit = BMS_Drive_Current_Limit

Regen_Current_Limit = BMS_Regen_Current_Limit    ;See Fig. 9 which sets BMS_Regen_Current_Limit
Brake_Current_Limit = Regen_Current_Limit Neutral_Braking_TrqM = My_Neutral_Braking_TrqM    ;See Fig. 6 code segment 640 which sets
                                                   ;My_Neutral_Braking_TrqM return

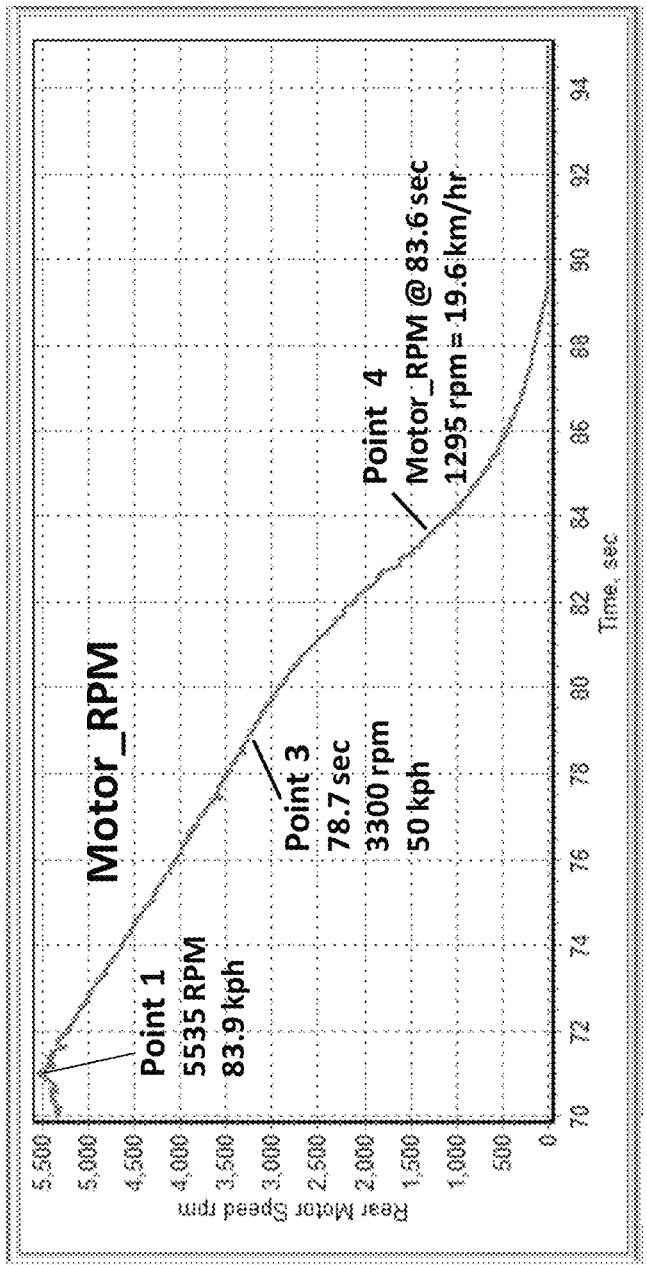
FIG. 12A
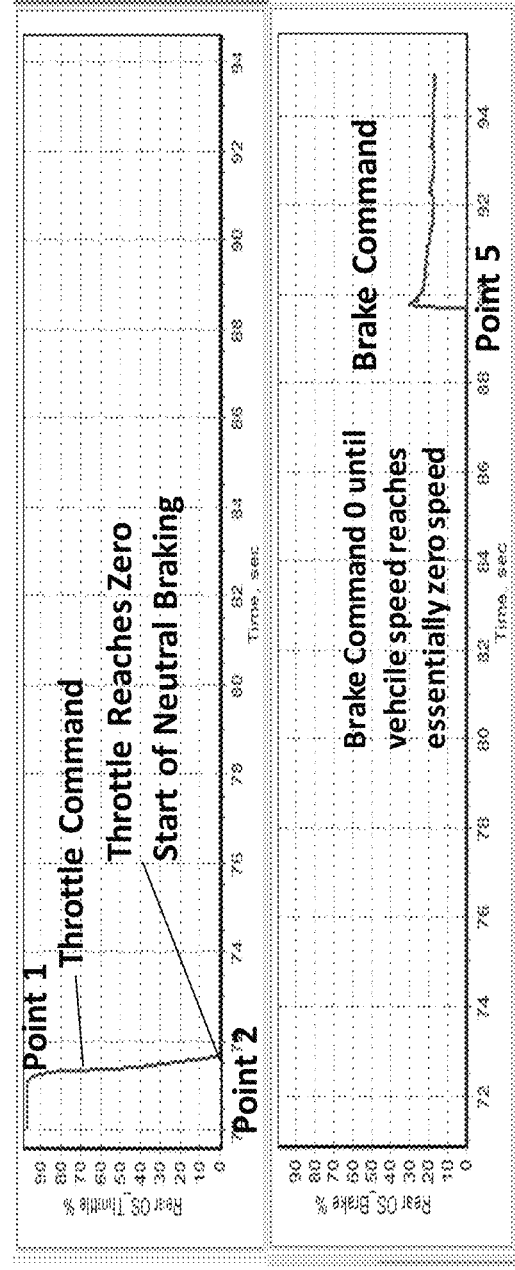
FIG. 12B
FIG. 12C

Downhill and Regen Control Front

```
Handle_Drive_Current_Limit_Front:
if (VEH_Drive_Current_Limit < BMS_Drive_Current_Limit)
    begin
        Drive_Current_Limit = VEH_Drive_Current_Limit
        Useri12 = Useri12 + 1
    end
else
    begin
        Drive_Current_Limit = BMS_Drive_Current_Limit
        Useri13 = Useri13 + 1
    end Neutral_Braking_TrqN  = My_Neutral_Braking_TrqN    ;Combi..

Regen_Current_Limit = BMS_Regen_Current_Limit;
Brake_Current_Limit = Regen_Current_limit
return;
```

*FIG. 19*

DOWNHILL IN FRONT
Based on Neutral_Braking_TrqM

```
;===============================================================
; Subroutine:: NewHandleVCLBrakeAndRegenCurrentLimit_AllModes
;                with Neutral_Braking_Torque
;===============================================================
NewHandleVCLBrakeAndRegenCurrentLimit_AllModes:
if (ABS_OS_Throttle > 1)   ;VCL_Throttle is set already higher up
begin                      ;NORMAL DRIVING ----------------------
    VEH_Regen_Current_Limit = 1638  ;if throttle is pressed in Forward there is no reason
    VCL_Brake = 0                   ;to apply any braking
    User120 = 1
end;
else
begin
    if (OS_Brake < PAR_BrakeOffsetForNeutralBraking) ; was 600 to enter NEUTRAL BRAKING.
    begin
        VCL_Brake = 0
        if (FDModuleState = cFDModule_RWD)
        begin
            VEH_Regen_Current_Limit = 1638   ;5%
            User120 = 2
        end
        else
        begin
            User120 = 3
            if (SW_6 = OFF)
            {Neutral_Braking_TrqM = PAR_AWD_Regen_Current_Limit}       ;P_User34
            else
            {Neutral_Braking_TrqM = DownHill_Regen_Map5_Output}        ;MAP5 oupput for downhill mode in Ref 4a
        end
    end
    else
    begin         ;PEDAL CONTROLLED BRAKING --------------------
        VEH_Regen_Current_Limit = 30000;   91%
        VCL_Brake = OS_Brake
        User120 = 4
    end
end
return
```

*FIG. 21*

Downhill and Regen Control Rear

```
                                    ;Handle_Drive_Current_Limit_Rear;
                                       Drive_Current_Limit = BMS_Drive_Current_Limit Neutral_Braking_TrqM  =  My_Neutral_Braking_TrqM
                                          Regen_Current_limit   =  BMS_Regen_Current_limit
                                          Brake_Current_limit   =  Regen_Current_Limit return
```

Part 1  AWD Hi Gear
P_User10
P_User11
P_User22
P_User23
User83  User84
Map1

Part 2  AWD Lo Gear
P_User50
P_User51
P_User52
P_User53
User85  User86
Map2

Part 3  RWD Hi Gear
P_User54
P_User55
P_User56
P_User57
User113  User114
Map5

Part 4  RWD Lo Gear
P_User60
P_User61
P_User62
P_User63
User111  User112
Map6

```
Setup_MLP(FrontMotorSpinMap,4,                       ;MLP
                              -3000,  -4500,         ;
                                  0,      0,         ;Input
                               5000,   3076,         ;10%
                               7000,   6553,         ;20%
                                  0,      0,
                                  0,      0,
                                  0,      0);

AUTOMATIC_MLP(FrontMotorSpinMap, Front_Motor_RPM);
```

Part 5  FrontOnly
My_Neutral_Braking_TrqM = 1639 All cases

*FIG. 22*

Power ON Logic

1. We will have 2 separate 12 volt systems. One will be used for the vehicle systems (lights, horn, display etc) and will include a dc-dc converter and auxiliary battery. The other 12 volt system will be for the Curtis inputs and will only include a low output DC-DC converter.
2. The BMS will be powered by the vehicle system (hence aux battery).
3. The 12 volt auxiliary battery will receive a low voltage cutoff switch to prevent it's depletion and to allow for vehicle startup.
4. Power ON:
   a. When the KSI is switched ON the 86 volt battery will be connected by its cutoff switch (when disconnected we have 2 packs of 43v). BMS will be switched ON. Curtis will be switched ON.
   b. Curtis Interlock must be controlled by VCL for the following to happen.
   c. BMS will report SOC, DCL etc.
   d. If BMS input data to the Curtis are within range:
      i. AUX relay PWM is engaged – this will engage the DC-DC converters.
      ii. interlock is switched ON.
      iii. Main contactor is closed.

*FIG. 51*

Interlock Control Means at High Motor Speeds

Sequencing Error on Startup HPD SRO

Before Main Loop Starts

HPD_SRO_Type = 0 in Handheld

If (CheckSeqErrorAtStart = ON)

If OS_Throttle > 25% and Direction Selected

1. Display SEQ ERR in Spyglass
2. Continue until OS_Throttle < 25% and SW_7 and SW_8 are off.

This is done in both Front and Rear

*FIG. 64*

Sample Maps for Hybrid Regen Trq Calculation

MAP1 SOC Limits

```
            ;-- MAP 1 Map SOC      ;MAP1 MapSOC Output
Setup_MAP(MapSOC,4,   ;MAP1 MapSOC Output
    0,     32767,     ;   0%       100%
    750,   29490,     ;  75%        90%
    850,      0,      ;  85%         0
    1000,     0,      ; 100%         0
    0,        0,
    0,        0);

AUTOMATE_MAP(MapSOC,@MTr1_OUTPUT)
AUTOMATE_MAP(MPDIV(MTr1,@VarPackSOC,10,1));
```

MAP2 Engine Speed Lo Charge

```
Setup_MAP(MapBrakeLoCharge,6,  ;MAP2  MBrakeLo
    0,       0,      ;   0 rpm      0%
    1000,    6553,   ;1000 rpm     20%
    1500,    13106,  ;1500 rpm     40%
    3000,    16383,  ;3000 rpm     50%
    4000,    16383,  ;4000 rpm     50%
    5000,    13106,  ;5000 rpm     40%
    0,       0);

AUTOMATE_MAP(MapBrakeLoCharge, @EngineRPM)
```

MAP3 Eng Speed Hi Charge

```
Setup_MAP(MapBrakeHiCharge,6,   ;MAP3 NBrakeHiC
    0,       0,      ;   0 rpm      0%
    1000,    8191,   ;1000 rpm     25%
    1500,    16383,  ;1500 rpm     50%
    3000,    24575,  ;3000 rpm     75%
    4000,    24575,  ;4000 rpm     75%
    5000,    16383,  ;5000 rpm     50%
    0,       0);

AUTOMATE_MAP(MapBrakeHiCharge, @EngineRPM);
```

MAP4 Rear Ctrl Temp

```
Setup_MAP(MapCtrlTemp,7,   ;MAP4 MapCtrlTem
    0,      32767,   ;  0C       100%
    200,    32767,   ; 20C       100%
    350,    32767,   ; 35C       100%
    500,    29490,   ; 50C        90%
    650,    24575,   ; 65C        75%
    750,    16383,   ; 75C        50%
    800,       0,    ; 80C         0%
    500,       0);

AUTOMATE_MAP(MapCtrlTemp, @MTr4_OUTPUT);
```

MAP5 VehicleSpd * 100

```
                                    ;MAP 5 Map RearVehicleSpd -
Setup_MAP(MapVehicleSpd,7,    ;MAP5 Front_Mot
    0,         0,      ;  0 kpm       0%
    2000,      0,      ;  0 kpm       0%
    2500,    6553,     ; 25 kpm      20%
    3500,    9830,     ; 35 kpm      30%
    5000,    9830,     ; 50 kpm      30%
    6500,       0,     ; 65 kpm       0%
    12000,      0);    ;  0C          0%

AUTOMATE_MAP(MapVehicleSpd,@Front_Motor_REM);
```

MAP6 Rear Eng Throttle

```
Setup_MAP(MapThrottle,7,   ;MAP6 MapThrott
    0,       29490,   ;   0          90%
    8191,    29490,   ;  25%         90%
    16383,   24575,   ;  50%         75%
    19660,   16383,   ;  60%         50%
    24575,   8191,    ;  75%         25%
    26213,      0,    ;  80%          0%
    32767,      0);   ;   0           0%

AUTOMATE_MAP(MapThrottle, @Rear_GS_Throttle);
```

FIG. 66

Regen_Current_Limit in Rear Method for HYBRID Mode

```
;;;===============================================================
;;;    Subroutine Handle_Drive_Current_Limit_Rear_HYBRID
;;;    This should be the ONLY place that Drive_Current_Limit is set
;;;===============================================================
Handle_Drive_Current_Limit_Rear_HYBRID:
    Drive_Current_Limit = BMS_Drive_Current_Limit Neutral_Braking_TrqM = 32767
    Regen_Current_limit  = RearHybridRegenCmdFrom1310
    Brake_Current_Limit  = RegenCurrentLimit AutoUser199 = AutoUser199 + 1
return
```

*FIG. 67*

Regen and Engine Throttle Control for Charge in Park

```
If (ValPackSOC > 85)
  begin
    EngThrottleCmdFrom1310 = 0              ;0% throttle for No Charge
    MyRearNBrakeValue        = 0;
    return;
  end ;------Set EngThrottleCmdFrom1310 According to Hi/Lo/No Charge------------
if (SW_7 = ON)   ;HiCharge      {SW_7 and SW_8 should be a double switch}
  begin
    EngThrottleCmdFrom1310 = PAR_EngThrotHiChargeInPark   ;  19660    60% throttle for Hi Charge
    MyRearNBrakeValue      = PAR_NBrakeValHiChargeInPark  ;  16383    50%
  end
else if (SW_8 = ON) ;LoCharge
  begin
    EngThrottleCmdFrom1310 = PAR_EngThrotLoChargeInPark   ;  9830     30% throttle for Lo Charge
    MyRearNBrakeValue      = PAR_NBrakeValLoChargeInPark  ;  8191     25%
  end
else
  begin    ;No Charge
    EngThrottleCmdFrom1310 = 0              ;0% throttle for No Charge
    MyRearNBrakeValue        = 0;
    return;
  end;
```

FIG. 68

Handling Emergency Brake and Remote Control Faults

In Manual
PWM2 = 0
Set_Interlock()
SW-16 Low Gear Switch is ignored

In Remote – Each Program cycle
From Startup
PWM2 = 0  to lock EMR_Brake

After 5 Second Delay

Check for the following faults:
* LowGear switch OFF           (SW-16 OFF)           LowGearInRemote           Error 67
* 1222 Steering system error. (SW_3 ON )             SteeringSystemFault       Error 63
* 1222 CAN messages stop for x msec                  SteeringSystemFault       Error 63
* 1352 NoComm is OFF  for 100msec                    RemoteSystemFault         Error 64
* 1352 EMR Brake Command goes ON                     RemoteSystemFault         Error 64
* 1352 CAN messages stop for x sec                   RemoteSystemFault         Error 64
* EMR Brake Feedback        (SW_14 ON)               RemoteSystemFault         Error 64 if there are NO faults
PWM2 = 12V which unlocks the EMR_Brake
Set_Interlock()

*FIG. 70*

Emergency Shutdown

A RemoteControlFault (Fault 64) triggers the following in the 1239:
Shutdown_Motor
Shutdown_Main
Shutdown_Interlock
Shutdown_Throttle
Activate EMRBrakeRelay   PWM2 or

| Remote Control Faults | Actions Taken by 1239 | |
|---|---|---|
| 1. SW_3 ON | FaultOut from the 1222 | J1-24 on 1222 |
| 2. SW_14 ON | J1-19 Emergency Brake Feedback switch on 1239 | J1-19 on 1239 |
| 3. Input1 of 1352 (NoComm) goes OFF | Communication lost from Remote device for more than x msec. | Input1 of 1352 |

| Remote Control Faults | Actions Taken by 1352 | |
|---|---|---|
| 1. EMR Brake Command | Input6 on 1352 goes HI triggering sent by Remote Device. | J1-12 on 1352 |

*FIG. 71*

REGENERATIVE BRAKING FOR ELECTRIC AND HYBRID VEHICLES

RELATED APPLICATIONS

This application claims the benefit of priority as a continuation under 35 U.S.C. § 120 to U.S. application Ser. No. 16/177,070 filed Oct. 31, 2018, entitled "Regenerative Braking for Electric and Hybrid Vehicles", which claims the benefit of priority to U.S. Provisional Application Ser. No. 62/662,826, filed Apr. 26, 2018 titled "Architecture and Systems for Electric and Hybrid All-Terrain Vehicles" and U.S. Provisional Application Ser. No. 62/579,358 filed Oct. 31, 2017 entitled "Architecture and Systems for Electric and Hybrid All-Terrain Vehicles", the contents of each which are hereby incorporated by reference in their entirety for all purposes.

FIELD OF THE DISCLOSURE

The present disclosure relates generally to electric or hybrid electric vehicles, such as industrial and/or all-terrain vehicles and more particularly to control systems for use therein.

BACKGROUND

Vehicles, such as hybrid-electric and all-electric vehicles may include energy recapture systems. Such energy recapture systems may include regenerative braking systems, as one possible implementation.

SUMMARY

I. Overview

Various embodiments will be described that provide various advantages for electric and hybrid vehicles. It is appreciated that features of these various embodiments may be combined with each other in accordance with the desired system requirements. It should be understood that these embodiments may be combined with each other in various combinations.

Additionally, many of the examples and embodiments described herein make reference motor controllers that perform various functions and provide various functionality. According to various implementations and examples, reference is made to a motor controller available from Curtis Instruments of Mt. Kisco, N.Y. The Curtis manual for Enhanced AC Controllers for Induction Motors and Surface Permanent Magnet Motors, Software Version OS 30.0, is incorporated herein by reference. An overview of various implementations will now be described at various levels of detail.

A1. Regenerative Braking Control

A first embodiment of this disclosure relates to regenerative braking systems and more particularly to controlling regenerative braking systems in various contexts.

Increasingly, vehicles, such as fully electric and hybrid-electric ("hybrid") vehicles, that utilize energy recovery systems are being employed for various applications. Vehicles that implement energy recovery systems may have several benefits as compared to vehicles that lack such energy recovery systems.

Vehicular energy recovery systems take various forms, one of which is a regenerative braking system, which may take various forms. One form of a regenerative braking system utilizes a motor that is configured to act as a generator that converts mechanical energy generated from the braking process to electrical energy which may be stored in various forms. Examples of such energy storage forms may include mechanical forms, such as a flywheel, electrical forms, such as capacitors, or chemical forms, such as a battery.

Regenerative braking systems may provide benefits to owners and operators of electric or hybrid vehicles. One such benefit may take the form of extending the overall range of the vehicle. Various other advantages result from using a regenerative braking system as well.

Regenerative braking systems may be used in various different scenarios. For instance, a vehicle may utilize a regenerative braking system to slow a vehicle. However, current regenerative braking systems suffer from the drawback that regenerative braking systems may not apply torque from the regenerative braking system to slow the vehicle in a manner that is consistent with a driver's expectations regarding the application of the regenerative torque.

As a specific example of such a drawback, in many vehicles, a driver may have to manually select an amount of regenerative torque that the regenerative braking system should apply when slowing a vehicle. In many instances, the manually selected torque amount may not produce the maximum amount of energy that could theoretically be recaptured.

As another example, when a vehicle is going downhill, a driver of a vehicle may apply the service brakes to slow the vehicle and/or to bring the vehicle to a constant speed when neutral braking torque could instead be applied to slow the vehicle. When the driver applies service brakes to slow a vehicle going downhill, not only do the service brakes undergo unnecessary wear and heating of the service brakes that could be avoided by the application of neutral braking torque, but also energy that could be recaptured by the regenerative braking system is lost.

One embodiment is directed to solving problems related to optimizing the behavior of regenerative braking in various scenarios. More particularly, an embodiment is directed to determining amounts of torque to apply during regenerative braking, to maintaining a desired speed and thereby vehicle stability while performing regenerative braking without depression of the brake pedal, and to limiting use of service brakes in vehicles undergoing regenerative braking.

This embodiment may have particular application to a vehicle that has certain components. One such component may include a battery pack, which may act as the vehicle's energy source. Another component may take the form of one or more a drive motors, which may provide torque to drive the vehicle's axle(s). In the case that the vehicle is equipped with a regenerative braking system, the drive motor may also be configured to apply regenerative braking torque in response to a received voltage phase and magnitude, which causes the drive motor to produce a regenerative current, which may in turn be supplied to the battery pack for storage. Yet another component may take the form of a motor controller. At a high level, the motor controller may comprise a configurable computing device that may be configured to periodically obtain inputs, execute a control loop and other functions based on the obtained inputs, and finally generate one or more outputs based on the output of the executed functions.

The motor controller may receive inputs from, may control, and/or may otherwise be coupled to various components and systems of the vehicle. As examples, the motor controller may be coupled to and/or may control the drive motor, battery, and a set driver controls, as some non-limiting examples. The motor controller may be coupled to various other components of the vehicle as well.

This implementation may apply to scenarios in which a vehicle is engaged in a particular mode, such as a neutral braking mode, which occurs when a driver removes his/her foot from the accelerator, and more particularly to a downhill neutral braking mode in which the vehicle undergoes neutral braking and the motor controller of the vehicle is configured to automatically determine an amount of neutral braking torque to apply to slow the vehicle to a more or less constant speed. Further, while in the engaged mode, the vehicle may be configured to perform the functions of optimizing the amount of energy recaptured during the process of neutral braking and avoiding operation of the service brakes during the engaged mode. The process of applying a determined amount of regenerative braking torque during neutral braking and performing various other functions related to braking may take various forms.

In general, the techniques of this embodiment may apply to a hybrid or electric vehicle having a motor controller that is configured to determine different amounts of neutral braking torque to maximize energy recapture and to maintain an approximately constant vehicle speed when the vehicle is engaged in a particular braking mode, such as a neutral braking mode and more particularly, a downhill neutral braking mode.

One such input that the motor controller may receive may indicate a mode in which the vehicle is engaged. For instance, the motor controller may receive a value from a component coupled to the motor controller indicating the vehicle is engaged in a regenerative braking mode such as a neutral braking mode, also referred to as a downhill neutral braking mode. After determining that the motor controller is engaged in a neutral braking mode, the motor controller may execute one or more subroutines associated with the given neutral braking mode.

More particularly, after determining that the vehicle is engaged in a given neutral braking mode, such as a neutral braking mode or a downhill neutral braking mode, the motor controller may be configured to execute (e.g., periodically) a "neutral braking subroutine," that may comprise one or more subroutines dedicated to managing the vehicle while in the given regenerative braking mode. For instance, while in the neutral braking mode, the neutral braking mode subroutine may cause the motor controller to manage various components of the vehicle, such as the drive motor, etc.

At a high level, a neutral braking mode subroutine may be configured to repeatedly (e.g., periodically) determine an amount of regenerative braking torque to apply to the drive motor and apply the determined amount of neutral braking torque to the drive motor to generate a regenerative braking current. In some implementations, motor controller may be configured to determine an amount of torque to apply to the drive motor to cause the vehicle to maintain an approximately constant speed and such that the regenerative current supplied by the drive motor to the vehicle's battery is maximized. The motor controller may determine an amount of torque to apply to the drive motor when the vehicle is engaged in a neutral braking mode in various manners.

In a particular implementation, the motor controller may be configured to access a set of neutral braking torque curves and used the curves to determine and apply the determined regenerative braking torque to the drive motor when the vehicle is engaged in a neutral braking mode, such as a downhill neutral braking mode. A neutral braking mode occurs when a vehicle undergoes neutral braking. Neutral braking occurs when the vehicle is moving and the throttle (e.g., the accelerator pedal) is reduced towards the neutral position. In a more particular case of neutral braking, such as the downhill neutral braking mode, the vehicle is both moving downhill and is undergoing neutral braking.

In a particular implementation, the set of one or more neutral braking torque curves may have been predefined or may be determined and defined dynamically by the motor controller. Each curve (also be referred to as a "map") may consist of a set of points, and each given point of the curve may specify an amount (e.g., a percentage) of regenerative braking torque to apply to the drive motor based on a parameter of the vehicle, such as the vehicle's speed, a rotational velocity of the drive motor, etc. The conditions associated with selecting a given neutral braking torque curve and with determining the amount of regenerative braking torque to apply to the drive motor may take various forms.

In one implementation, the motor controller may select a regenerative torque curve based on a gear in which the vehicle is engaged. For example, the motor controller may select a first regenerative torque curve if the vehicle is in a first gear (e.g., a high gear) and may select a second regenerative torque curve if the vehicle is engaged in a second, different gear (e.g., a lower gear relative to the first gear).

According to another implementation, the motor controller may be configured to select a neutral braking torque curve depending on a mode in which the vehicle is engaged. For example, the motor controller may be configured to select a first regenerative braking curve if the vehicle is engaged in a downhill neutral braking mode, a second regenerative braking mode if the vehicle is engaged in a different mode, such as a maximum range mode or a maximum performance mode. A vehicle may be equipped with other driving modes and may be configured to select regenerative torque curves in various other manners as well.

The motor controller may be configured to determine that the vehicle is engaged in the neutral braking mode based on a signal received from a component coupled to the motor controller. As an example, the motor controller may be coupled to a set of driver controls that may be operable by a driver of the vehicle, such as switches, pedals, knobs, etc. The driver may activate a control, such as a switch, to engage the neutral braking mode, such as the downhill neutral braking mode. The neutral braking mode may be activated in various other manners as well.

Additional detail regarding an example neutral braking mode subroutine will now be described. To begin execution of the neutral braking mode subroutine, the motor controller may obtain any input values that are relative to the neutral braking mode subroutine. Such input values may take the form of a vehicle speed value, or a rotational velocity of n motor, as some examples. If necessary, after obtaining any input values for the neutral braking mode subroutine, the motor controller may preprocess or convert the input values to a different format. For example, the motor controller may obtain an input value corresponding to a speed of the vehicle and may convert the speed value to a value indicative of a rotational velocity of the drive motor or vice versa. The motor controller may obtain various other additional input values and may convert various other values as well.

After obtaining or converting the form of any inputs, the neutral braking mode subroutine may then determine an amount of regenerative braking torque to apply to the drive motor. The neutral braking mode subroutine may then cause the motor controller to apply the determined amount of regenerative braking torque to the drive motor, which results in the drive motor producing a regenerative current.

Once a regenerative current is generated, a second subroutine, referred to as a "drive current limit handling subroutine" subroutine may then cause the motor controller to control the regenerative current supplied to the battery pack to at least partially recharge the battery pack. The functions of determining an amount of regenerative braking torque to apply to the drive motor, causing the drive motor to apply the determined amount of regenerative torque to the drive motor, and supplying regenerative current to the battery pack may take various forms.

The motor controller may determine the amount of regenerative braking torque to apply to the drive motor based on the selected neutral braking torque curve. According to an implementation, the motor controller may determine the amount of regenerative braking torque to apply to the drive motor based on the selected neutral braking torque curve by using the selected neutral braking torque curve to map an input value to the curve to an output amount of regenerative braking torque as that is specified by the selected neutral braking torque curve.

According to an implementation, the input to the input to the neutral braking torque curve may be a rotational velocity, such as a number of RPMs or the speed of the vehicle, which may be expressed in terms of kilometers or miles per hour, as some examples. The output of the neutral braking torque curve may be expressed in terms of a percentage of regenerative braking torque to apply to the drive motor.

To map an input value to an output value based on the selected neutral braking torque curve, the motor controller may execute call one or more mapping functions, which run continuously and in parallel with the neutral braking mode subroutine. Such a mapping functions may perform the task of constantly mapping input value such as a rotational velocity to the selected curve and generating an output in the form an amount of regenerative braking torque based on the selected neutral braking torque curve. In some examples, the amount of regenerative braking torque that the motor controller may apply to the drive motor may be expressed as a percentage of a maximum amount of regenerative braking torque that motor controller may apply to drive motor during regenerative braking. The amount of regenerative braking torque may be expressed in various other forms as well.

After the neutral braking mode subroutine causes the motor controller to determine an amount of regenerative braking torque to apply to the drive motor, the neutral braking mode subroutine may then cause the motor controller to apply the determined amount of regenerative braking torque to the drive motor.

As a result of the drive motor applying the determined amount of regenerative torque to the drive motor, a regenerative braking current is generated by the drive motor. The drive current limit handling subroutine may cause the motor controller to in turn supply the regenerative braking current to the battery pack of the vehicle. The functions involving the motor controller supplying the regenerative braking current to the battery pack as part of executing the neutral braking mode subroutine may take various forms.

At a high level, the drive current limit handling subroutine may cause the motor controller to supply the regenerative braking current to the battery back based on an amount of charge that the battery pack can accept. A battery management system (BMS), which may be in communication with the motor controller and the battery pack via a suitable communications protocol such as a CANbus, may provide various data to the motor controller related to the operation of the battery pack, which may include an amount of current that the battery pack can accept or provide at a given time. The amount of current that the battery pack can accept or provide at a given time is but one example of data that the battery management system may provide to the motor controller. The battery management system may provide other data related to the operation of the battery pack to the motor controller as is well known by those normally skilled in that art.

More particularly, the battery management system may determine a charge level of the battery pack, and based on the determined charge level, may determine an amount of regenerative current that the battery pack can accept. If the battery management system determines that the battery pack is near a full charge level, the battery management system determines that the battery is able to accept a lower amount of regenerative current. If the battery management system determines that the battery pack has a low charge level, the battery management system may determine that the battery pack can accept a higher amount of regenerative current. In any case, the battery management system may periodically provide to the motor controller an amount of current that the battery pack can accept at a given time.

If the motor controller determines that the amount of regenerative braking current exceeds a regenerative current limit that may be based on the maximum current the battery pack can accept, the drive current limit handling subroutine may cause the drive motor to reduce the amount of regenerative current supplied to the battery pack to regenerate the battery charge level to the regenerative current limit. The motor controller may reduce the amount of regenerative current supplied to the battery pack in various manners. For instance, the motor controller may reduce the amount of regenerative current supplied to the battery pack by reducing an amount of root mean squared (RMS) AC current allowed during regeneration, which in turn reduces the amount of regenerative current supplied to the battery pack during regeneration. The motor controller may reduce the amount of regenerative current supplied to the battery pack in various other manners as well.

Various functions and examples with respect the regenerative braking embodiment have been described and will be described in greater detail herein.

An example apparatus implemented in accordance with the present disclosure includes a motor controller coupled to a drive motor and a battery pack of a vehicle, wherein the motor controller comprises a processor that is configured to: determine that the vehicle is engaged in a neutral braking mode, and after determining that the vehicle is engaged in the neutral braking mode: select a neutral braking torque curve; determine a rotational velocity of the drive motor; based on the determined rotational velocity of the drive motor, determine an amount of regenerative braking torque to apply to the drive motor based on the selected neutral braking torque curve; apply the determined amount of regenerative braking torque to the drive motor, wherein applying the determined amount of regenerative braking torque to the drive motor results in a regenerative current generated by the drive motor; and supply the regenerative current to the battery pack to at least partially recharge the battery pack.

Another example method implemented in accordance with the present disclosure includes determining that the vehicle is engaged in a neutral braking mode, and after determining that the vehicle is engaged in the neutral braking mode: selecting a neutral braking torque curve; determining a rotational velocity of a drive motor of the vehicle; based on the determined rotational velocity of the drive motor, determining an amount of regenerative braking torque to apply to the drive motor based on the selected neutral braking torque curve; applying the determined amount of regenerative braking torque to the drive motor, wherein applying the determined amount of regenerative braking torque to the drive motor results in a regenerative current generated by the drive motor; and supplying the regenerative current to the battery pack to at least partially recharge the battery pack.

An example tangible machine-readable medium has instructions stored thereon implemented in accordance with the present disclosure that when executed, cause at least one processor to determine that a vehicle is engaged in a neutral braking mode; and after determining that the vehicle is engaged in the neutral braking mode: select a neutral braking torque curve; determine a rotational velocity of a drive motor of the vehicle, based on the determined rotational velocity of the drive motor; determine an amount of regenerative braking torque to apply to the drive motor based on the selected neutral braking torque curve; apply the determined amount of regenerative braking torque to the drive motor wherein applying the determined amount of regenerative braking torque to the drive motor results in a regenerative current generated by the drive motor; and supply the regenerative current to the battery pack to at least partially recharge the battery pack.

1. Traction Control of Dual Motor all-Wheel Drive Electric Vehicles

Another embodiment is related to traction control of dual motor, all-wheel drive electric vehicles. The traction control system of the present embodiment is intended for dual motor all-wheel drive off-road electric drive vehicles and improves traction at low speeds under difficult road conditions of high grades and unfavorable terrain. According to various implementations, the traction control system may be used in battery-only vehicles and hybrid electric vehicles.

The traction control embodiment may present various advantages including, for example: (1) maximizing traction between front and rear axles on conditions of high grade and poor terrain, (2) minimizing spin and energy loss of spinning wheels, (3) automatically adjusting for forward and reverse drive on uphill grades, (4) preventing of digging-in of spinning wheels on loose sand or snow, (5) allowing untrained drivers to maneuver effectively over the most difficult terrain, (6) providing driver-selectable means to cancel the traction control, (7) providing a controllable differential, (8) providing a minimum speed for activation of traction control, and (9) utilizing a comparison between Front_RMS_Current and Rear_RMS_Current to detect cases when one wheel of the vehicle is in the air. The traction control embodiment may provide various other advantages as well.

2. Performance Optimization for Dual Motor all-Wheel Drive Electric and Hybrid Vehicles Another embodiment is related to performance optimization of dual motor, all-wheel drive electric and hybrid vehicles.

This embodiment described herein relates to means for controlling the division of torque between the front axle and the rear axle to accommodate different vehicle speed ranges and varying terrain conditions.

At low vehicle speeds and difficult terrain both front and rear motors can operate at full torque for maximum traction. At higher vehicle speeds, maximum traction is no longer required and it is beneficial to reduce the torque generated by the front motor. At still higher vehicle speeds it may be desirable to reduce the front motor torque contribution to zero.

The torque division means may also comprise driver selected means for propelling the vehicle by the front drive motor only. These driver-selected means may also be operable to propel the vehicle by the rear drive motor only.

These driver-selected means may also be operable to allow the driver to select the desired torque division between front and rear axles at will, even when the vehicle is moving at high speed. The torque division means may also comprise means for automatically limiting the current drawn from the battery to safe levels commensurate with the state of the battery.

3. Regeneration and Braking Control

This disclosure also describes a regeneration and braking control embodiment. The braking and regeneration control embodiment optimizes and simplifies control of electric and parallel hybrid vehicles during extended downhill and braking operation.

Some example advantages of the regeneration and braking control embodiment comprise switch-selectable regeneration means for extended downhill operation so vehicle speed can be maintained without depression of brake pedal. The switch-selectable regeneration means eliminates heating of service brakes and maximizes recovery of energy, allows optimized regeneration of energy during braking between front and rear wheels while maintaining vehicle stability, and controls rate of response of the brake pedal in front and or rear controller to respond rapidly at high vehicle speeds and more slowly at lower vehicle speeds. Thus, the regeneration and braking control embodiment prevents instability in the controller at very low speeds while providing required rapid response at high speeds. Additional detail of this embodiment will be described in greater detail herein.

4. Optimizing Performance of 4WD Electric Drive Vehicles by Equalizing Component Temperatures Another embodiment disclosed herein relates to optimizing performance of 4WD electric drive vehicles by equalizing component temperatures. More particularly, in an all-wheel electric drive system, one of the drive axles inevitably assumes more of the load than the other axle. For example, while climbing a steep grade for extended periods, the rear drive motor and controller may tend to overheat thereby limiting vehicle performance.

The present embodiment provides temperature equalization methods that are operative to automatically adjust the division of power between front and rear axles depending on component temperatures.

This embodiment provides numerous advantages. The advantages of this embodiment include: (1) improving vehicle performance by reducing effects of automatic cutbacks of motor load, and (2) extension of vehicle component life by reducing load on higher temperature components, as some non-limiting examples.

5. Optimizing Electric Vehicle Performance while Preserving Required Range

Another embodiment of this disclosure relates to optimizing electric vehicle performance while preserving a required range.

More particularly, for any electric vehicle, the expected operating range depends on the amount of stored energy remaining in the vehicle energy storage system, the road and terrain conditions that the vehicle must traverse, and the required route including range for a safe return if desired. Electric vehicles are particularly sensitive to this issue because of the limited energy stored in the vehicle energy storage system; however, the functions related to this embodiment are applicable to hybrid-electric vehicles as well.

The purpose of the present invention is to provide a predictive or look-ahead method that takes into account details of the remainder of the route, including the return if desired, and advises the vehicle operator accordingly.

In a preferred implementation of the present embodiment, means are provided for operating with the Curtis Instruments controllers and a computationally intensive computer (Vehicle Management Unit or VMU) in a co-processor mode. Detailed computations are carried out in the co-processor and the results of these computations are communicated to the Curtis controllers which control the current supplied to the vehicle motors.

In an alternative implementation of the present embodiment, the predictive functions will also comprise means for automatically reducing the current or power drawn from the energy storage system to preserve the amount of energy required to return (e.g., return-to-base in military operations). Similarly, the allowed maximum performance or the vehicle may be enhanced if substantially more energy than expected remains in the battery.

In another alternative implementation of the present embodiment, override means are provided to allow the vehicle operator or a remote-controlled operator to apply maximum vehicle propulsion power to escape an unexpected predicament. As soon as the emergency condition is over, the override means can be operative to recalculate the remaining portion of the mission.

In another alternative implementation of the present embodiment, that is applicable to an electric-hybrid vehicle, predictive means are provided for unscheduled charging of the battery if a long uphill region is expected in the near future. Similarly, the battery could be partially depleted if a long downhill region is expected thereby improving overall fuel consumption and remaining range.

This embodiment addresses two problems: (1) the mission profile mapped according to this embodiment has been carefully mapped so the terrain and road conditions of the remaining mission are known or estimated in advance, and (2) details of the terrain and road conditions are not known in advance but the return-to-base location is known. This algorithm may use map-based GPS data of the geography and terrain conditions.

The system provides various advantages in that the embodiment (1) automatically provides for maximum instantaneous vehicle performance while ensuring return-to-base capability, and (2) reduces the training level required of the vehicle operator.

6. Optimizing Range of 4WD Electric Vehicles and Hybrid-Electric Vehicles Based on Control Tables This disclosure also describes an embodiment that is related to optimizing range of vehicles, such as 4WD electric vehicles, and hybrid-electric vehicles based on control tables.

The performance of complex electric and hybrid-electric drive systems may be optimized by preparing control tables based on, for example, detailed simulation analysis of typical vehicle duty cycles. These control tables may then be downloaded to the Vehicle Management Unit computer (VMU) so that operation of the various power sources (e.g., battery power, engine and battery power) can be optimized to obtain, for example, maximum range or minimum fuel consumption.

These algorithms often require a VMU with extensive computational capabilities which may be in excess of the capability of the control computers, such as Curtis control computer, used in the vehicles of the present disclosure. As described elsewhere herein, motor controllers (e.g., Curtis controllers) communicate vehicle, battery and motor component data to the VMU. The VMU may also carry out the numerically intensive computation based on the various control tables stored therein and communicate the best solution to the (e.g., Curtis) controller(s). The controller(s) may then issue appropriate commands to the motors to provide the required power in the most efficient way possible.

This embodiment provides several advantages. For example, this embodiment enables use of advanced vehicle control techniques while retaining the advantages of the unique functionality of the (e.g., Curtis) motor control unit(s), and (2) reduces the training level of vehicle operators. This embodiment may provide various other advantages as well.

7. Series Hybrid Range Extender for all-Wheel Drive Electric Vehicles

Another embodiment according to this disclosure is related to a series hybrid range extender for all-wheel drive electric vehicles. According to the present embodiment, the all-wheel drive electric vehicle may also comprise an engine, an engine driven generator and a generator controller in a series hybrid architecture to substantially increase the range of the vehicle, as shown in various figures herein.

In an alternative embodiment of the present invention, the series hybrid also comprises engine control means operable to take advantage of the drivability and energy management features described herein for an all-wheel drive electric vehicle. It is a particular feature of this embodiment that the engine control means can be seamlessly integrated into the control software for the all-wheel drive electric vehicle.

8. Parallel Hybrid Output Power Assist with Improved Performance and Silent Capability Another embodiment of this disclosure related to parallel hybrid output power assist with improved performance and silent capability. This embodiment may comprise sub-embodiments 8.1 and 8.2.

8.1 Improved Shift Gradeability in Output Power Split Hybrid Mode

This sub-embodiment relates to a hybrid-electric vehicle driven by a conventional combustion engine and an electric drive motor. In such a vehicle, the drive train may be a post-transmission hybrid powertrain wherein the electric motor is located after the multi-speed transmission. The multi-speed transmission may be a manual shifted transmission and where a 2-speed reduction gear is located between the transmission output and the vehicle drive axles.

Various problems are associated with the example type of powertrain described with respect to this sub-embodiment. One of the problems associated with such a powertrain occurs during the 1-2 shift on difficult terrain at low vehicle speeds. In such cases, the interruption of torque transfer from the engine to the vehicle may prevent engagement in the 2nd gear without the engine stalling.

The transfer case may use a dog-clutch to engage a "Hi Gear" and a dog-clutch to engage a "Lo Gear." When neither dog clutch is engaged, the transfer case is in neutral. This neutral state of the transfer case allows the engine to charge the battery at vehicle standstill in any desired gear and allows the engine to rotate rapidly at standstill to recharge the battery.

One benefit of this embodiment is to provide functions for using the electric motor torque during the gear shift to prevent the vehicle from decelerating during the power interruption of the gear shift. The invention may also be used to allow the engine to recharge the battery during standstill in the most efficient transmission gear.

8.2 Output Power Assist with Combustion Engine and Automatic Transmission

Another sub-embodiment related to power assist applies to a hybrid electric vehicle driven by a conventional combustion engine and an electric drive motor. The drive train may be a post-transmission hybrid powertrain wherein the electric motor is located after the multi-speed transmission. The multi-speed transmission may be a conventional automatic transmission with a torque converter and a 2-speed reduction gear that is located between the transmission output and the vehicle drive axles. A 3-dimensional representation of the powertrain of the present invention is shown in FIG. 30.

Various flows may be used in various circumstances such as, for example, rough terrain, silent operation, use with a hybrid mode that involves battery charging, operation in a "charge in park" mode, and/or various other modes.

FIG. 31 shows some of the major drive line components of the Output Power Assist hybrid powertrain that may be used with the present invention.

FIG. 32 shows an example flow of power in a Standard Drive operating mode. In such a mode: (1) power is provided by the internal combustion engine, and (2) the electric motor rotates freely without affecting the output.

The flow of power in a Fuel Saver operating mode of the present embodiment is shown in FIG. 33. The Fuel Save operating mode may provide several advantages in that the Fuel Saver configuration may: (1) achieve maximum or near-maximum fuel efficiency and range, (2) provide power by the internal combustion engine, and (3) facilitate the electric motor to add power at high vehicle load and absorb power during periods of low driving load to improve efficiency of the engine.

A flow of power in a Hybrid Combined Drive operating mode is shown in FIG. 34. The Hybrid Combined Drive mode may: (1) be used when extra power is required for rough terrain, (2) provide power by the internal combustion engine and the electric motor simultaneously, (3) control the electric motor output torque with the motor controller. The electric motor torque output may be adjusted according to the demand for driving power by the vehicle operator. The flow of power in a Silent Mode of operation in shown in the FIG. 35. The Silent Mode is used to achieve silent operation with minimal engine exhaust In yet another embodiment disclosed herein, the Output Power Assist hybrid powertrain of the present invention, wherein the powertrain also comprises a second drive motor and second motor controller, may be configured to provide enhanced performance in the hybrid and silent modes of operation.

Also in accordance with an preferred implementation of the present embodiment, the hybrid vehicle powertrain also comprises a Vehicle Management Unit (VMU) which coordinates operation of aspects of the conventional drive components.

Also in accordance with an implementation of the present embodiment, the hybrid vehicle powertrain also comprises an Energy Storage system with sufficient energy storage and power capacity to propel the vehicle with electrical energy in a battery only or silent mode of operation and to assist the power delivered by the engine to enhance the maximum performance capability of the vehicle.

In accordance with yet another preferred embodiment of the invention, the Energy Storage system may comprise a battery and supercapacitor.

Various control means of the present embodiment are also described herein. The control means may: (1) provide full torque from both motors at low motor speeds until the peak discharge current limit (DCL) from the BMS is reached, (2) reduce the torque from both motors to prevent excessive battery discharge current, (3) control the current provided by each of the drive motors so as to minimize the overall losses of each motor thereby reducing the current provided by the batteries. Additionally, the control means may comprise: (1) first override means to reduce the motor torque by limiting motor speeds and field weakening in the event of a message from the BMS and (2) second override means to ignore all warnings and messages and to record each event and length of time of occurrence in the memory of the controllers. The control means may control the torque provided by both motors to favorably affect the transmission shift schedule and the torque converter clutch lock up schedule.

In yet another preferred implementation of the present embodiment, the transmission and torque converter clutch sensor means comprises vehicle communication (e.g., CAN-bus reading) means operable to read the transmission gear ratio and torque converter clutch status.

In still another preferred implementation of the present embodiment, the transmission and torque converter clutch sensor means comprises pressure switch means operable to provide information to the transmission control means regarding the operating state of the transmission gear and the torque converter clutch status.

In yet another preferred implementation of the present embodiment, mode control means are provided that are operable to favor high vehicle performance at the expense of fuel consumption by judiciously providing short bursts of power from the energy storage system to cause the VMU to unlock the torque converter lockup clutch and/or downshift the transmission to a lower gear.

9. Generalized Control for Electric or Hybrid Vehicles with Multiple Sources of Energy Additional embodiments relate to a generalized energy management system for an electric vehicle drive train with a range extender. The range extender may comprise a multiplicity of energy sources in addition to the vehicle's main battery.

The present embodiment may apply, for example, to a 2-Motor 4WD electric vehicle. The energy supply system (ESS) of this embodiment comprises a conventional battery and a conventional BMS.

The present embodiment relates to the method used to integrate operation of an energy supply system comprising multiple sources of energy.

According to the present embodiment, the vehicle system controller(s) receive information from an ESS Computer. It will be appreciated by those skilled in the art that the functionality of the ESS Computer can be integrated into the power controller of the generator which may be, for example, a conventional Curtis AC Motor Controller.

The vehicle system controller(s) may be configured with the required functionality to compute the power (e.g., PowerWeNeed) to meet the required driver commands and transmit this power requirement to the ESS computer. The ESS computer may be programmed with the functionality to decide how best to provide the power from the available sources of energy (i.e. the battery and/or the heat engine). If the power cannot be provided by any combination of the available power sources, the ESS Computer may transmit the maximum allowed discharge current in the value of ESS DCL.

It will be appreciated that as far as the vehicle controller(s) are concerned, it does not matter if the allowed discharge current is limited by the battery discharge limit (e.g., PackDCL) or by ESS DCL (in the present invention). The vehicle system controller(s) will react to the numerical value of the discharge current limit (e.g., PackDCL or ESS DCL).

It will be appreciated therefore that the investment and time spent in developing and debugging the intricate vehicle controls will operate without change. (In a certain sense it is like a plug-and-play system).

The ESS computer may be programmed with knowledge of, for example, the battery, fuel cell, super cap, etc. to decide on the best division of power. The vehicle system controller software does not have to know anything about how the ESS Computer makes its decisions.

10. Dealing with Under-Performing Battery Modules

This embodiment relates to dealing with under-performing battery modules.

As background, the importance of balancing the state of charge (SOC) of a multi-cell Lithium based battery is well known in the literature. Similarly, the importance of preventing even one of the cells of a multi-cell battery from exceeding prescribed limits is also well known. See for example XP Power System User Manual Rev. 4.8 published by Valence Technology of Austin Tex. Ideally, the SOC of each of the cells in a battery is substantially the same and intricate procedures have been developed for ensuring that Lithium based batteries are properly charge and balanced.

Safe operation of Lithium based batteries (particularly large batteries used in electric vehicles) may be supervised by a BMS. A BMS may monitor the state of each of the cells in a multi-cell battery and report on the state of the battery as a whole and also on the worst-case cell(s) of the battery. Thus, a BMS may report the voltage of lowest voltage cell in the battery pack, the lowest temperature cell, the highest temperature cell, the cell with the lowest SOC, the highest SOC, etc. The system may need to respond to the messages sent by the BMS and decrease the load on the battery pack if required. In extreme cases, it may even be required to shut the vehicle down completely to prevent a dangerous situation from occurring.

For various reasons that are well known in the literature, one or more of the battery modules may be at a lower SOC than the other modules. For maximum safety, the BMS may be programmed to base its calculations for the maximum recommended discharge current limit (e.g., PackDCL) on the battery module with the lowest SOC. The value of the module with the lowest SOC may also be reported to the driver as a measure of the charge remaining in the battery.

The present embodiment may be used to prevent this anomalous situation from interfering with the driver's concentration and providing meaningful feedback to the vehicle operator, and yet protecting the battery as required. The battery state display may also comprise means which are operative, when an SOC mismatch warning is issued by the BMS, to display the average value of the SOC as calculated by the vehicle controller(s). Using the SOC of the weakest module will continue to protect the battery.

In an alternative implementation of the present embodiment, the average value of the SOC may be reported to the vehicle operator and the SOC of the weakest cell may be used to protect the battery.

11. Preserving Residual Energy Level in Energy Storage System

Another embodiment relates to preserving residual energy levels in energy storage systems. As background, battery-only electric vehicle drive systems often require a low voltage energy source for operating relays, warning and indicator lights, and other low power devices typically associated with on- and off-road vehicles. Similarly, a hybrid-electric vehicle may also require a low voltage energy source for operating a starter motor to start the combustion engine. These auxiliary devices are often powered by a low voltage (e.g., 12V or 24V) conventional battery.

As is well known by one normally skilled in the art, the vehicle cannot even be started if the low voltage battery is completely discharged. To prevent this from occurring, DC-DC Converter means may be provided to keep the low voltage battery in a charged state. The energy required for this may come from the main high voltage energy storage device of the vehicle. It will be apparent that if the main high voltage energy storage device is completely discharged, the low voltage battery will become completely discharged and the vehicle will be completely unresponsive and may not even be capable of issuing an error state message indicating what the problem is. Such a case may occur if the vehicle is left completely unattended for a long period of time without the conventional vehicle ignition switch being turned off.

The present embodiment provides residual energy control means to preserve a minimum amount of energy in the low voltage system and in the high voltage energy storage device of the vehicle.

In another embodiment, the residual energy control means also comprises SOC display means operative to transform the battery pack state of charge (e.g., PackSOC) as reported by the BMS to a displayed SOC, wherein the displayed SOC may report a higher numerical value than the actual battery pack state of charge.

In another embodiment, the residual energy control means may also comprise as conventional serial display unit (e.g., Curtis Model 840 or similar device) for displaying numerical values to the vehicle operator.

It will be apparent to one normally skilled in the art of using motor controllers (e.g., controllers manufactured by Curtis Instruments) that numerical values may be stored in EEPROM memory by a fleet manager and that these values cannot be changed by a user of the vehicle.

12. Controllable Differential System for 4WD Electric Vehicles

Another embodiment of this disclosure relates to a controllable differential system for 4WD electric vehicles.

As background, the importance of being able to lock a differential to maximize traction is well known in the literature and various mechanisms for implementing this are well known to one normally skilled in the art. In most cases, a driver-selectable differential-lock mechanism is provided in both the front axle drive and the rear-axle drive system. These differential lock mechanisms prevent loss of traction when one of the drive wheels slips but at the cost of losses in the drive train on uneven terrain.

A serious problem often associated with a front-differential lock system is the susceptibility of the front axle drive system to heavy shocks when operating in a rough rock-strewn terrain. These shocks often lead to premature damage to the front axle.

The present embodiment can be used to minimize shocks encountered by the front axle by providing a rapid means for temporarily applying a varying torque on the faster of the drive wheels, thereby increasing traction to the front axle. This varying friction torque may be selectively applied only when desired by the operator.

The present embodiment comprises at least one shaft speed sensor arranged to monitor the rotational speed of at least one of the front wheels. The speed of the differential input shaft may be known from the speed sensor located on the front axle drive motor. The speed of the second front wheel therefore may be calculated from the known speed of the front axle drive motor, the known gear ratios, and speed measured by said shaft speed sensor.

The present embodiment also comprises friction disks and friction control means on both sides of the differential and operative to provide a varying friction torque to one of the drive wheels when desired. In one embodiment of the invention, the friction disks are the front wheel disk brakes.

Thus, if the speed of one of the front wheels is substantially higher than the speed of the second front wheel, the friction control means will operate to apply a friction torque to the faster brake disk, thereby forcing the slower wheel to provide a driving torque proportional to the torque applied to the faster wheel.

It will be apparent to one normally skilled in the art that the traction of the front axle will be increased when one of the brakes disks are activated. This embodiment may take various other forms as well.

13. Parallel Hybrid with CVT

Another embodiment of this disclosure relates to a Parallel Hybrid vehicle having a continuously variable transmission (CVT). This embodiment utilizes the 4WD electric vehicle drive technology and software components for battery only vehicles as part of a hybrid powertrain. In accordance with an embodiment of the present invention, an internal combustion engine is drivingly connected to the rear drive motor via a continuously variable transmission (CVT) and clutch.

The present embodiment provides numerous advantages and features. For example, the present embodiment may provide: (1) silent operation with front wheel drive (FWD), rear wheel drive (RWD) and all wheel drive (AWD) vehicles, (2) means for FWD, RWD and AWD when the engine operates, (3) an engine to drive a rear axle while providing electrical power to recharge the battery and/or power the front drive motor, (4) stop-start operation of the engine, (5) redundant controls to front and rear drive components, (6), redundant digital and analog controls for the system, (7), vehicle operation that continues if the communication system (e.g., a CANbus) fails, (8) vehicle operation in the event of catastrophic failure in electrical system, (9) 4WD operation if battery fails or is empty, (10) a vehicle range that is limited only by the vehicle's fuel supply, and/or (11) operation at high vehicle speed in excess of the maximum speeds allowed by the vehicle's electric motors. The present embodiment may provide various other advantages as well.

14. Safety Measure for Remote Control of Electric and Hybrid Vehicles

Yet another embodiment may provide safety measure for remote control of electric and hybrid vehicles. This aspect of the invention deals with control means for enhancing the safety of remote controlled electric and hybrid vehicles and in particular a means for bringing the vehicle to a safe stop when remote control is lost.

Such control means may comprise a combination of mechanical and software control features, such as: (1) release of spring-loaded brake responsive to detection of loss of control of the vehicle, and/or (2) electrically disabling drive controller(s) responsive to detection of loss of control of the vehicle. The present embodiment may provide various other advantages as well.

15. Predicting Remaining Battery Life Based on Analysis of Total Energy Consumption Still another embodiment of the present disclosure is related to predicting remaining battery life of a vehicle based on the analysis of the total energy consumption.

As background to this embodiment, the state-of-health of a secondary battery when subject to variations in charge and discharge rates, battery cell temperature, unequal cell balancing, depth of discharge, etc. are important factors in fleet management of electric and hybrid electric vehicles. This is especially critical in applications which require a guaranteed return-to-base capability.

The current embodiment deals with techniques for predicting the remaining useful life of a battery based on the total amount of energy delivered by the battery cells over the operational life of the battery.

In an alternate implementation of the present embodiment, the techniques also comprise means for predicting the remaining useful life of a battery based on manufacturer supplied data of battery life as a function of temperature and battery life as a function of depth of discharge.

As some implementations of the present embodiment, data reported by the BMS may be used to compute the total amp-hr (ampere-hour) throughput of the entire battery pack and/or the total amp-hr throughput of each battery cell and compare it with manufacture-supplied predictions of battery life as a function of the depth of discharge of the battery.

Various embodiments and implementations and embodiments of the present disclosure have been described. Additional detail regarding these implementations and embodiments will be described in greater detail below.

Although the following discloses example methods, apparatus, systems, and articles of manufacture including, among other components, firmware and/or software executed on hardware, it should be noted that such methods, apparatus, systems, and/or articles of manufacture are merely illustrative and should not be considered as limiting. For example, it is contemplated that any or all of these firmware, hardware, and/or software components could be embodied exclusively in hardware, exclusively in software, exclusively in firmware, or in any combination of hardware, software, and/or firmware. Accordingly, while the following describes example methods, apparatus, systems, and/or articles of manufacture, the examples provided are not the only way(s) to implement such methods, apparatus, systems, and/or articles of manufacture.

When any of the appended claims are read to cover a purely software and/or firmware implementation, at least one of the elements in at least one example is hereby expressly defined to include a tangible medium such as a memory, DVD, CD, Blu-ray, etc., storing the software and/or firmware.

These embodiments and many additional embodiments are described more below. Further, the detailed description is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure may be practiced without certain, specific details. In other instances, well known methods, procedures, components, and circuitry have not been described in detail to avoid unnecessarily obscuring aspects of the embodiments.

Reference herein to "embodiment" means that a particular feature, structure, or characteristic described in connection with the embodiment can be included in at least one example embodiment of the invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, may be combined with other embodiments.

BRIEF DESCRIPTION OF THE DRAWINGS

Features, aspects, and advantages of the presently disclosed technology are better understood with regard to the following description, appended claims, and accompanying drawings where:

FIG. 4 is a conceptual diagram of two motor controllers;
FIG. 6 is a conceptual diagram of a main control loop and a subroutine;
FIG. 10 is a conceptual diagram of a drive current limit handling subroutine;
FIGS. 12A-12C are graphs of a deceleration event;
FIG. 19 is a conceptual diagram of a code listing for handling regenerative braking torque and regenerative current limits;
FIG. 21 is a diagram of a code listing for controlling vehicle braking;
FIG. 22 is a conceptual diagram that summarizes techniques for limiting regenerative braking in a rear motor controller;
FIG. 51 is a conceptual diagram illustrating an example of power on logic.

FIG. 64 is a conceptual diagram illustrating an example operation of an interlock control means;

FIG. 66 is a conceptual diagram illustrating example maps for determining regenerative braking torque;

FIG. 67 illustrates example code of a regenerative current handling subroutine;

FIG. 68 illustrates example code for controlling recharging of battery;

FIG. 70 is a conceptual diagram illustrating techniques for bringing a remote-controlled vehicle to a safe stop in the event of a system failure;

FIG. 71 is a conceptual diagram illustrating techniques for bringing a remote-controlled vehicle to a safe stop in the event of a system failure.

Figure 1:
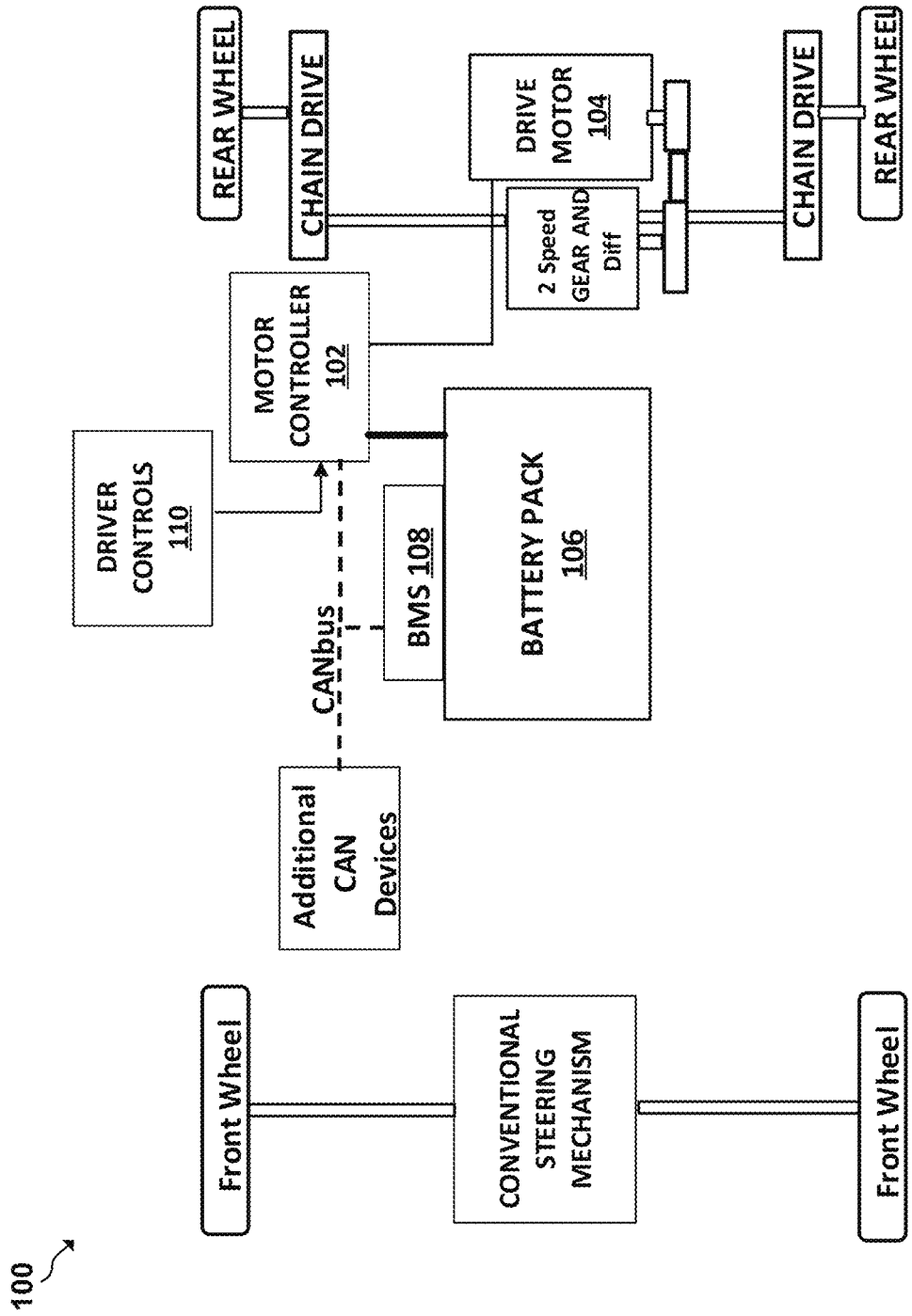
FIG. 1 is a conceptual diagram of a vehicle configuration.

In addition, the drawings are for the purpose of illustrating example embodiments, but it is understood that the present disclosure is not limited to the arrangements and instrumentality shown in the drawings.

DETAILED DESCRIPTION

II. Example Configurations

Referring now to the drawings, in which like numerals may refer to like parts throughout the figures. In general, the figures in this section depict example configurations of vehicles and their components with which the embodiments, implementations, and examples of this disclosure may be implemented.

Turning now to FIG. 1, FIG. 1 is a conceptual architectural diagram of a single-axle drive vehicle configuration 100 having a single-drive motor. Vehicle configuration 100 includes front wheels, a conventional steering mechanism coupled to the front wheels, a motor controller 102 that is coupled to a drive motor 104 and a battery management system (BMS) 108 that is in turn coupled to a battery pack 106.

Battery pack 106 is electrically connected to the DC power inputs of motor controller 102 which converts the DC power from battery pack 106 to a three-phase AC power accepted by drive motor 104. According to an implementation, motor controller 102 may be a Curtis 1238E AC Induction Motor Controller but may generally comprise any suitable AC controller or Curtis AC controller.

Battery pack 106 is also connected to battery management system (BMS) 108 which monitors each of the battery modules of battery pack 106 and provides appropriate signals to motor controller 102 to limit the amount of power allocated to drive motor 104, thereby protecting the battery pack 106 from damage. According to a preferred implementation, BMS 108 may comprise an Orion BMS-2 but may take various other forms as well.

Motor controller 102 may be in communication with the battery management system (BMS) 108 and/or additional devices connected through a shared communication medium such as, for example, CAN devices via a CANbus. Motor controller 102 is also coupled to driver controls 110 and to drive motor 104.

The conventional steering mechanism may provide steering capability for vehicle configuration 100. The operator may also use driver controls 110 to control various functions and/or modes or operation of vehicle configuration 100.

Motor controller 102 comprises a programmable computing device such as a central processing unit (CPU), application-specific integrated circuit (ASIC), programmable logic controller (PLC), field-programmable gate array (FPGA), digital signal processor (DSP), system on a chip (SoC), or another type of computing device. Motor controller 102 may also comprise power electronics that may be used to power the drive motor 104. Alternately, the power electronics may be provided in a separate power controller as is known in the art. Motor controller 102 may generally be configured control the operation of various components coupled to motor controller 102 such as, for example, the CAN devices, battery pack 106 (via BMS 108), and drive motor 104.

In vehicle configuration 100, drive motor 104 may comprise an electric drive motor, and may preferably comprise a three-phase AC induction motor or surface permanent magnet electric motor. Drive motor 104 may be drivingly connected via a fixed gear reduction to a conventional two-speed axle and a differential unit. The two-speed gear and differential may preferably comprise a driver-selectable high gear ratio and a driver-selectable low gear ratio. The fixed gear reduction may comprise a fixed ratio belt reduction. The output shafts of the differential are preferably connected via a fixed ratio chain drive to the rear drive wheels of the elective vehicle. It will also be appreciated that the two-speed gear and differential may also comprise a multiplicity of driver-selectable gear ratios.

Conventional service brakes are provided for the front wheels and the rear wheels as is known in the art. The service brakes are not shown in FIG. 1.

Vehicle configuration 100 may be powered by an energy storage system with sufficient energy and power capacity to propel a vehicle having vehicle configuration 100. In a preferred embodiment, the energy storage system may be a battery pack comprising a number of lithium ion battery modules arranged in series and parallel that may provide a suitable voltage for effective operation of motor controller 102 and drive motor 104.

According to various examples, motor controller 102 may control the operation of vehicle configuration 100 and more particularly drive motor 104 in response to receiving control signals, inputs, etc. (e.g. from driver controls 110, drive motor 102, BMS 108, and/or various other components of vehicle configuration 100).

According to an implementation, motor controller 102 may control the speed or torque of drive motor 104 by applying energy from battery pack 106 to drive motor 104. In response to receiving the applied energy, drive motor 104 may, in turn, apply force in the form of torque to a selected gear, which causes the axle connected to the selected gear and in turn a chain drive to rotate, which causes the rear wheels of vehicle configuration 100 to rotate.

Figure 2:
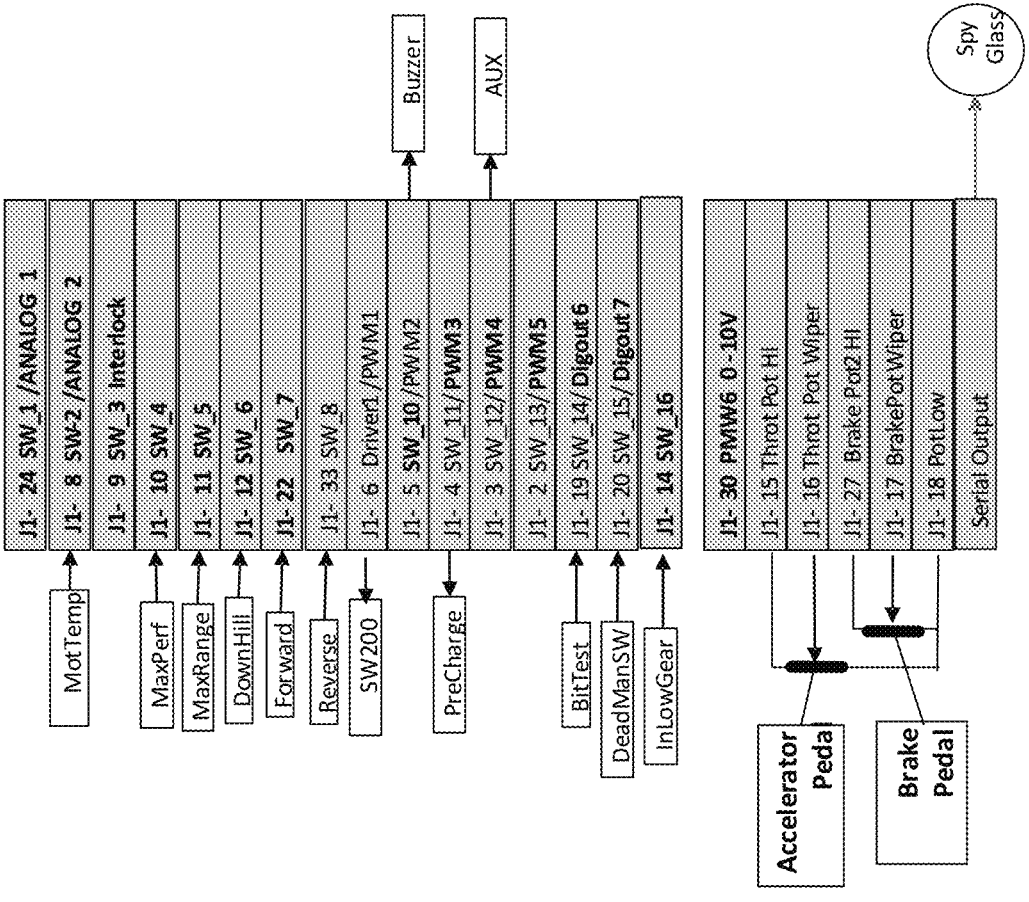
FIG. 2 is a conceptual diagram of a motor controller.

As mentioned above, motor controller 102 may generally control the operation of various components of vehicle configuration 100. FIG. 2 is conceptual diagram of various inputs and outputs that may be coupled to motor controller 102. According to various embodiments the motor controller illustrated in FIG. 2 may correspond to a Curtis Motor controller. However, motor controller 102 may take various other forms as well.

As illustrated in FIG. 2, motor controller 102 may be coupled to various switches, denoted as "SW_x," where x is some number, potentiometers, ("Pot's"), pedals, etc. As examples illustrated in FIG. 2, motor controller 102 may be coupled to an accelerator pedal, brake pedal, low gear switch, forward and reverse gear switches, a downhill neutral braking mode switch, a maximum performance mode switch, maximum range switch, and a "dead man switch," as some examples. Motor controller 102 may also output various signals, such as a precharge signal, buzzer signal, auxiliary signal, etc.

Some or all of connections to motor controller 102 may comprise driver controls 110. More particularly, driver controls 110 may comprise a throttle pot wiper means operative to indicate the position of an accelerator pedal, which provides information to the motor controller 102 regarding the amount of driving torque desired by the vehicle operator to propel the vehicle.

The driver controls 110 connected to motor controller 102 may also comprise brake pot wiper means operative to indicate the position of a brake pedal that provides information to motor controller 102 regarding the amount of decelerating torque desired by the vehicle operator.

As will be understood by those normally skilled in the art, the brake pedal may also be mechanically connected to the service brakes of the vehicle so that mechanical pressure on the brake pedal will also provide hydraulic pressure to the service brakes operative to decelerate the vehicle.

The driver controls 110 also comprise an InLowGear SW_16 switch. If the InLowGearSwitch SW_16 is ON, Motor Controller is configured to determine that the two-speed gear is arranged for operation in the low gear. Similarly, if the InLowGear SW_16 switch is OFF, motor controller 102 is configured to determine that the two-speed gear is arranged for operation in the high gear.

Driver controls 110 may also comprise a Downhill SW_6 switch input thereby allowing the vehicle operator to implement a downhill control mode if the Downhill SW_6 switch is in the ON position.

It will be apparent to one normally skilled in the art that the various switch inputs shown in 2 may be replaced by switches such as that provided Blink S.r.l. of Milan, Italy. The Blink device transmits the status of a number of switches to the Motor Controller via CANbus. Motor controller 102 may be coupled to various other inputs and outputs as well.

Figure 3:
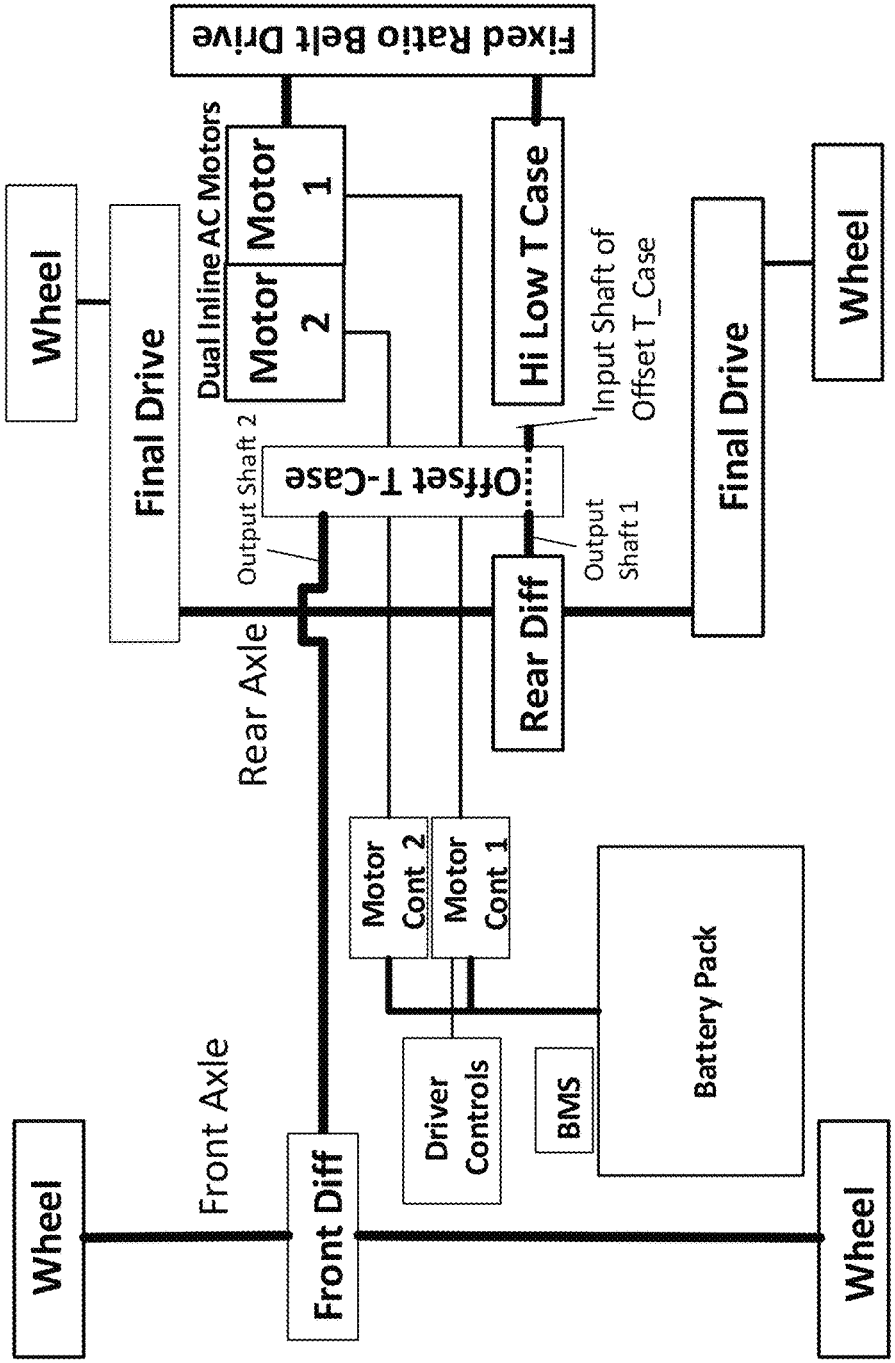
FIG. 3 is a conceptual diagram of a vehicle configuration.

FIG. 3 illustrates a second vehicle configuration 300. Vehicle configuration 300 may be generally similar to vehicle configuration 100 in that vehicle configuration 300 may be an electrical vehicle. However, vehicle configuration 300 may differ from vehicle configuration 100 due to inclusion of two drive motors rather than the single drive motor 104 of vehicle configuration 100. Vehicle configuration 300 may further differ from vehicle configuration 100 of FIG. 1 in that the dual motors of vehicle configuration 300 drive not just a single rear axle as illustrated in FIG. 1, but two axles (a front axle and a rear axle).

As mentioned with respect to FIG. 3, vehicle configuration 300 may include two motor controllers and two motors. Further, vehicle configuration 300 is a dual axle drive vehicle configuration rather than a single axle drive vehicle configuration. These dual motor controllers of FIG. 3 may generally be configured to control the operation of various components of vehicle configuration 300. Each motor controller of the dual motor controllers may be configured in a manner similar to motor controller 102 but each motor controller may control a respective motor.

In vehicle configuration 300, dual-in-line AC Motors, motor 1 and motor 2, are preferably drivingly connected via a fixed ratio belt drive to a hi low transfer case. The high low Transfer case preferably comprises a driver selected high gear ratio and driver-selected low gear ratio. The dual In-line AC motors, motor 1 and motor 2 may be identical in mechanical and electrical properties and are drivingly connected to rotate around a common shaft.

The hi low transfer case is drivingly-connected to an input shaft of an offset transfer case. The offset transfer case is operable to rotate output shaft 1 and output shaft 2 of the offset transfer case thereby dividing the mechanical power coming to or from drive motor 1 and drive motor 2. Output shaft 1 in turn is drivingly-connected to a rear axle via a rear differential and thence to the final drives and wheels on the rear axle.

Similarly, output shaft 2 in turn is drivingly connected to the front axle via the front differential and thence to the wheels on the front axle.

The rear differential and the front differential may be equipped with conventional lock-up differential clutches as is done in conventional four-wheel drive vehicles.

It is a feature of the present embodiment of the invention that the first control method described with reference to 1 for operation in the High Gear and the second control method for operation in the Low Gear described with reference to FIG. 1 are operable to control deceleration and downhill operation of the Dual Axle Drive of FIG. 3.

Figure 7:
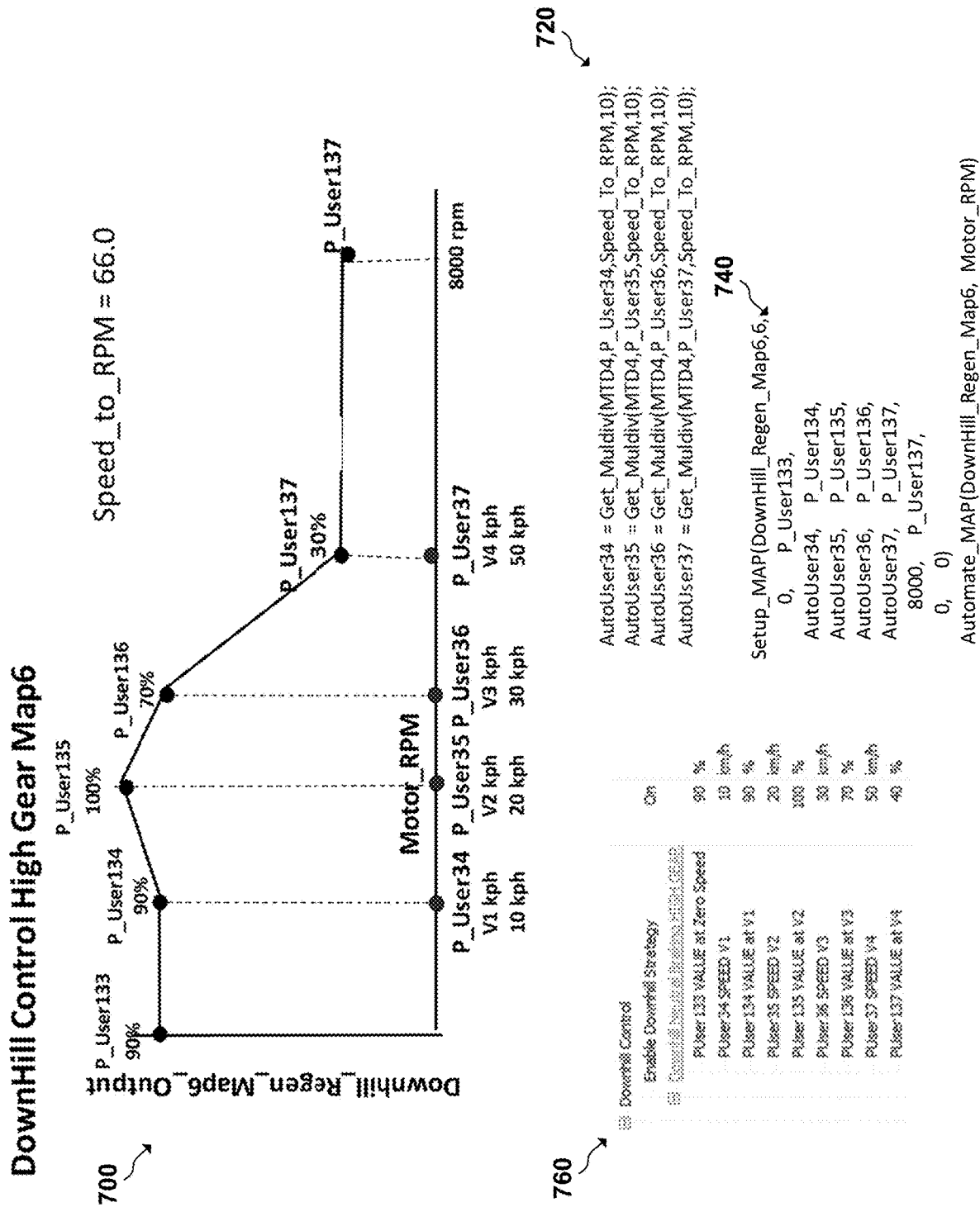
FIG. 7 is a conceptual diagram of a neutral braking torque curve.
Figure 8:
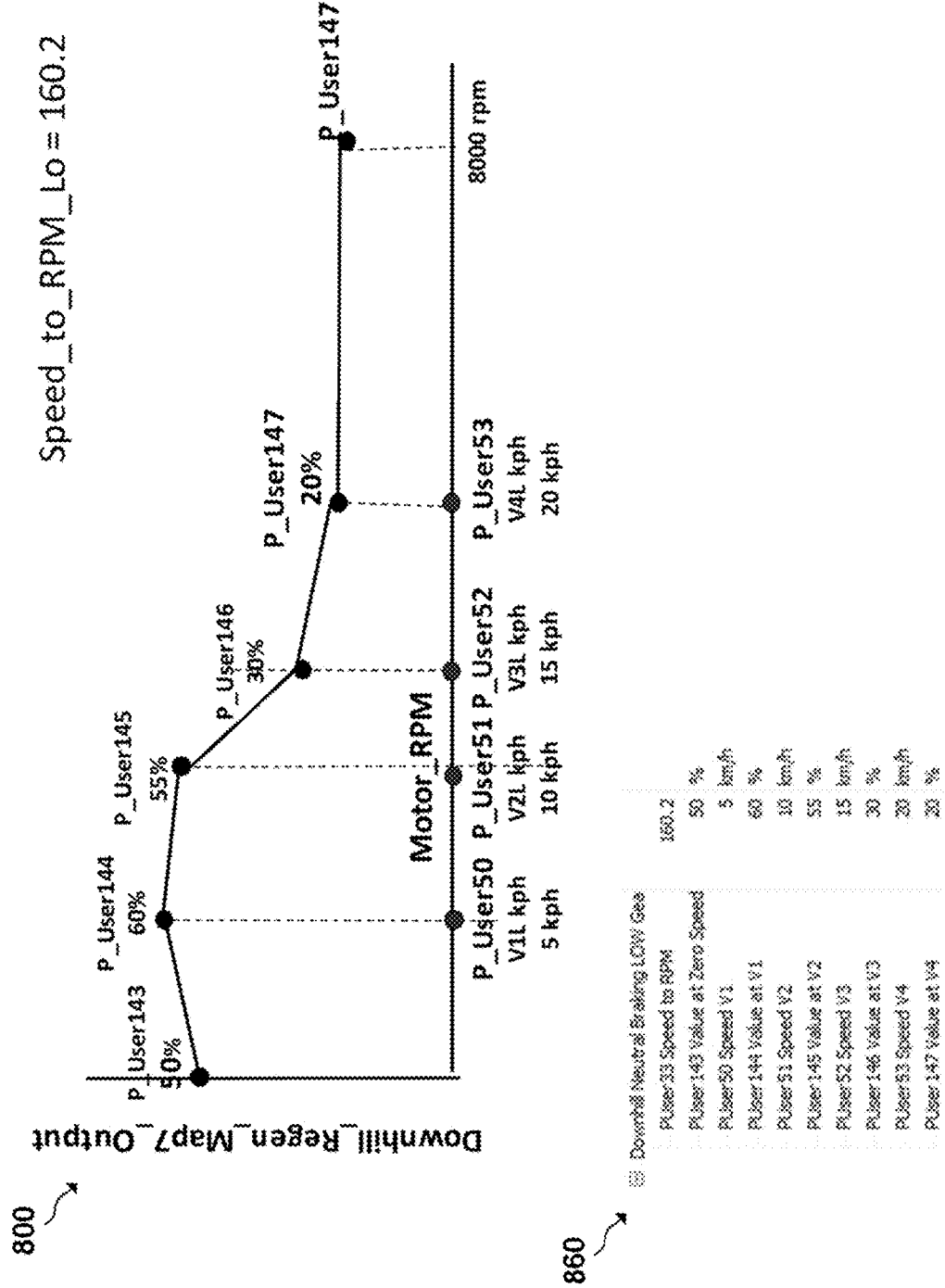
FIG. 8 is a conceptual diagram of a neutral braking torque curve.

It will be apparent that the numerical values used to establish the neutral braking torque curves 700 and 800 of FIGS. 7 and 8 will be different for the AWD vehicle configuration of FIG. 3.

Turning now to FIG. 4, FIG. 4 illustrates is conceptual diagram of various inputs and outputs of the dual motor controllers of vehicle configuration 300. It should be understood that according to various embodiments the motor controllers illustrated in FIG. 4 may comprise Curtis Motor controllers. However, the motor controllers of FIG. 4 may take various other forms as well.

The accelerator pedal and the brake pedal of the driver controls of FIG. 4 may also be electrically connected to the throttle pot and brake pot inputs of Curtis Drive Controller 2 for purposes of redundancy. Alternately, the values of the throttle pot and brake pot may be transmitted to the drive controller 2 over the CANbus. Note that the CANbus is not shown in FIG. 4.

It is also noted that the On/Off status of all of the switches connected to Curtis drive controller 1 are transmitted to Curtis Drive Controller 2 via the CANbus. It will be apparent therefore that drive motor 1 and drive motor 2 may provide propulsion power to all four drive wheels.

Figure 5:
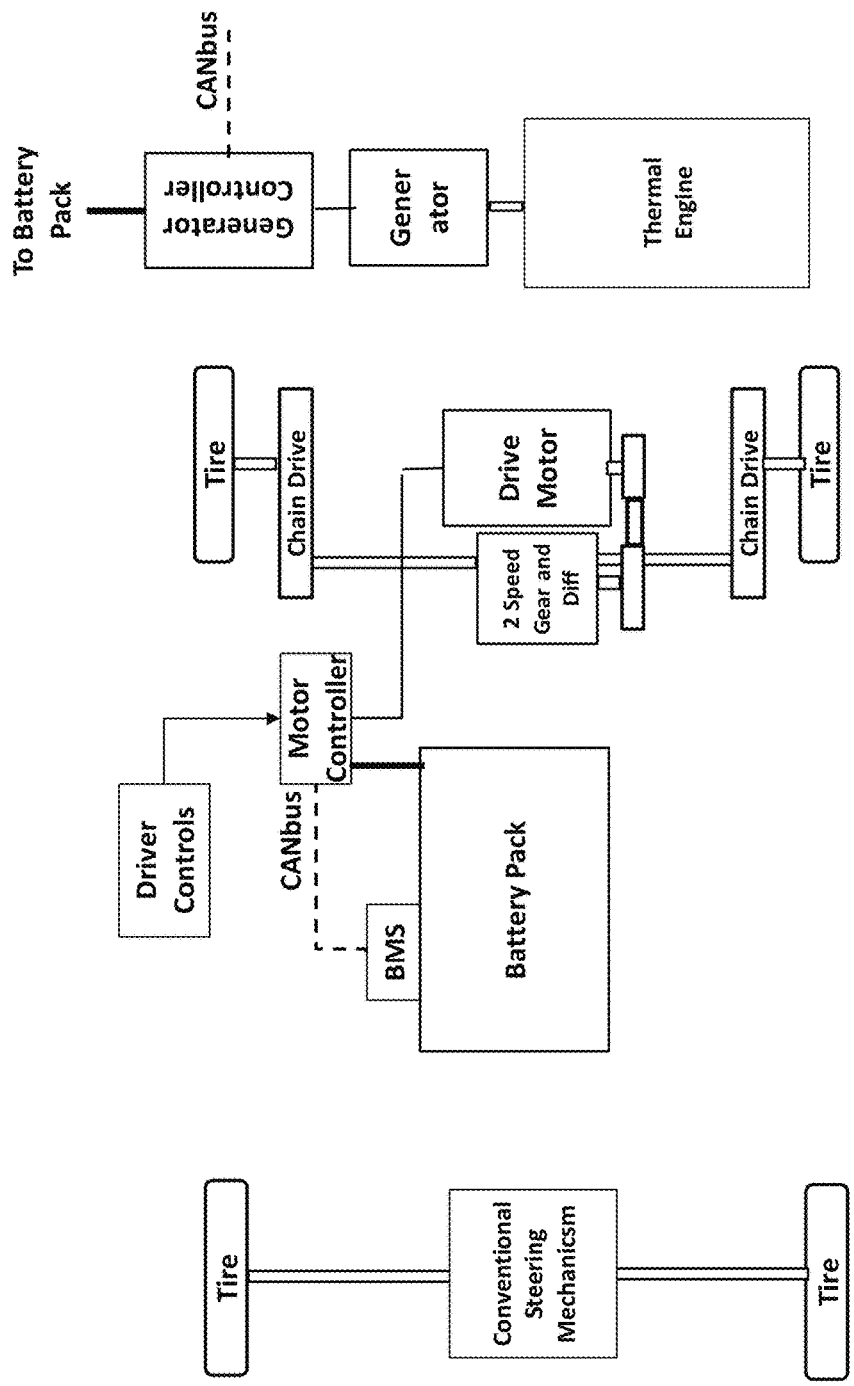
FIG. 5 is a conceptual diagram of a vehicle configuration.

FIG. 5 illustrates a third vehicle configuration 500. Vehicle configuration 500 may be generally similar to vehicle configuration 100 in that vehicle configuration 500 may be a single axle-drive vehicle that include a motor controller. However, vehicle configuration 500 may differ from vehicle configuration 100 in that vehicle configuration 500 is a hybrid-vehicle that includes an engine, a generator and a generator controller and a drive motor rather than solely an electric drive motor as described with respect to vehicle configuration 100 of FIG. 1.

Vehicle configuration 500 also comprises a range extender comprising a thermal engine, an electric generator and a generator controller. It is a feature of the embodiment of vehicle configuration 500 that the first control method described with reference to 1 for operation in the High Gear and the second control method for operation in the Low Gear are operable for controlling vehicle deceleration and downhill operation of vehicle configuration 500.

A-2. Regenerative Braking Control

A first embodiment of this disclosure relates to regenerative braking systems and more particularly to controlling regenerative braking systems in various contexts. According to various implementations, the techniques of the present embodiment may be applicable to various vehicle configurations such as vehicle configurations 100, 300, and 500.

Such fully electric and hybrid-electric ("hybrid") vehicle configurations 100, 300 and 500, utilize energy recovery systems are being employed for various applications. Vehicles that implement energy recovery systems may have several benefits as compared to vehicles that lack such energy recovery systems.

Vehicular energy recovery systems take various forms, one of which is a regenerative braking system, which may also take various forms. One form of a regenerative braking system utilizes a motor and motor controller that are configured to act as a generator that converts mechanical energy generated from the braking process to electrical energy which may be stored in various forms. In the context of vehicle configurations 100, 300, and 500, the braking process may store energy in a chemical form, such as in a battery pack.

This embodiment is directed to solving problems related to optimizing the behavior of regenerative braking in various scenarios. More particularly, this embodiment is directed to: (1) determining amounts of torque to apply during a neutral braking mode; (2) maintaining a desired speed and thereby maintaining vehicle stability while performing regenerative braking; (3) allowing regenerative braking of a vehicle to occur without requiring a driver of a vehicle to depress the brake pedal; and (4) limiting use of service brakes in vehicles undergoing regenerative braking.

Referring back now to vehicle configuration 100, drive motor 104 is equipped with a regenerative braking system. Drive motor 104 may cause the regenerative braking system to apply regenerative braking torque, which may cause drive motor 104 to produce a regenerative braking current, which may in turn be supplied to battery pack 106 to regenerate the charge stored in battery pack 106.

Motor controller 102 may be in charge of various functions related to the operation of vehicle configuration 100 including functions related to regenerative braking. At a high level, motor controller 102 may comprise a configurable computing device that may be configured to (e.g., periodically) obtain inputs, execute a control loop and other functions based on the obtained inputs, and finally generate one or more outputs based on the output of the executed functions.

FIG. 6 illustrates, pseudocode 600 for an example control loop and a subroutine 640 for controlling regenerative braking torque. At a high level, the control loop is an outermost or top-level loop that executes repeatedly, for instance approximately 250-250 times per second. The example control loop of FIG. 6 may be written in VCL (vehicle control language) that is executable by a motor controller 102 such as, for example, a Curtis motor controller such as motor controller 102 according to a preferred implementation.

It should be noted that all of the CANbus communications, function evaluations, map computations, etc. are executed in the background and run continuously. All functions that deal with processing information sent over the CANbus from the BMS are handled in a BMS_Control module. This includes handling and processing of fault messages and exception states as well as dealing with other performance limits that may be imposed. The BMS_Control module is also responsible for setting up the BMS Charge Current Limiting Map as described hereinabove with reference to FIG. 600.

At a high level, the main control loop calls three subroutines: (1) a battery management system control subroutine (BMS_Control), (2) a vehicle control subroutine (VehicleControl_T4), and (3) a drive current limit handling subroutine (Handle_Drive_Current_Limit), which is discussed in greater detail with respect to FIG. 11. The main control loop 600 is but one example and may include more or fewer function calls or take various other forms as well.

The VehicleControl_T4 subroutine handles functions that deal with processing information from the vehicle and driver controls 110. Among the functions carried out in this module deal with handling of the Curtis VCL_Throttle and VCL_Brake commands that control the actual torque provided or absorbed by drive motor, various safety functions, forward and reverse handling and other functions normally required to operate a vehicle safely.

As part of executing the main control loop, motor controller 102 may receive inputs from, and may control various components and systems of a vehicle configuration, such as vehicle configuration 100, 300, 500, etc. As examples, motor controller 102 may be communicatively coupled to control drive motor 104, battery pack 106, and driver controls 110, as some non-limiting examples.

This embodiment may apply to scenarios in which a vehicle is engaged in a particular mode, such as a neutral braking mode, and even more particularly a downhill neutral braking mode, as some examples. In the particular mode, motor controller 102 may be configured to automatically determine an amount of neutral braking torque to apply to slow the vehicle to a more or less constant speed. Also while in the engaged neutral braking mode, motor controller 102 may be configured to perform the functions of optimizing the amount of energy recaptured during the process of regenerative braking and avoiding operation of the service brakes during the engaged mode. The process of applying a determined amount of regenerative braking torque and performing various other functions related to braking may take various forms.

One such input that the motor controller may receive may indicate a mode in which the vehicle is engaged. For instance, the motor controller may receive a value from a component coupled to the motor controller indicating the vehicle is engaged in a neutral braking mode. After the motor controller determines that the vehicle is engaged in a given neutral braking mode, the motor controller may execute various subroutines associated with the given neutral braking mode.

More particularly, after determining that the vehicle is engaged in a given neutral braking mode, the motor controller may be configured to execute (e.g., periodically) the neutral braking subroutine, which may comprise one or more subroutines, that are dedicated to managing the vehicle while in the neutral braking mode. For instance, while in the neutral braking mode, the neutral braking mode subroutine may cause the motor controller to manage various components of the vehicle, such as a drive motor, battery pack, etc.

At a high level, the one or more neutral braking subroutines may be configured to repeatedly (e.g., periodically) determine and apply an amount of regenerative braking torque to apply to the drive motor 104 to generate a regenerative braking current. In some implementations, motor controller 102 may be configured to determine an amount of torque to apply to the motor 104 to cause the vehicle to maintain an approximately constant speed and such that the regenerative current supplied by drive motor 104 to battery pack 106 is maximized. Motor controller 102 may determine an amount of torque to apply to drive motor 104 when the vehicle is engaged in a regenerative braking mode in various manners.

In a particular implementation, motor controller 102 may be configured to access a set of neutral braking torque curves and use the curves to determine and apply regenerative braking torque to drive motor 104 when the vehicle is engaged in a neutral regenerative braking mode, such as a downhill neutral braking mode. A neutral braking mode occurs when a vehicle undergoes neutral braking. Neutral braking occurs when the vehicle is moving and the throttle (e.g., the accelerator pedal) is reduced towards the neutral position. In a more particular case of neutral braking, such as the downhill neutral braking mode, the vehicle is both moving downhill and is undergoing neutral braking.

The neutral braking torque curves of the neutral braking mode may have been predefined or may be determined and defined dynamically by motor controller 102. Each curve (also be referred to as a "map") may consist of a set of points, and each given point of the curve may specify an amount (e.g., a percentage) of regenerative braking torque to apply to drive motor 104 based on a parameter of the vehicle, such as the vehicle's speed, a rotational velocity of drive motor 104, etc. The conditions associated with selecting a given neutral braking torque curve and with determining the amount of torque to apply to the drive motor may take various forms.

In one implementation, motor controller 102 may select a regenerative torque curve based on a gear in which the vehicle is engaged. For example, motor controller 102 may select a first regenerative torque curve if the vehicle is in a first gear (e.g., a high gear) and may select a second regenerative torque curve if the vehicle is engaged in a second, different gear (e.g., a lower gear relative to the first gear).

According to another implementation, motor controller 102 may be configured to select a neutral braking torque curve depending on a mode in which the vehicle is engaged. For example, motor controller 102 may be configured to select a first neutral braking curve if the vehicle is engaged in a downhill neutral braking mode, a second neutral braking mode if the vehicle is engaged in a different mode, such as a maximum range mode or a maximum performance mode. A vehicle may be equipped with other driving modes and may be configured to select regenerative torque curves in various other manners as well.

Motor controller 102 may be configured to determine that the vehicle is engaged in a neutral braking mode based on a signal received from a component coupled to motor controller 102. As an example, driver controls 110 that may comprise switches, pedals, knobs, etc. The driver may activate a control such as a switch to engage the neutral braking mode. The neutral braking mode may be activated in various other manners as well.

Motor controller 102 may be configured to determine an amount of neutral braking torque to apply to the drive motor of the vehicle based on a variety of factors. Such factors may include a speed of the vehicle, a rotational velocity of a drive motor, or various other factors.

FIG. 6 also includes an example of code 640. The example code 640 comprises a subroutine of the one or more neutral braking subroutines that may be executed by motor controller 102. More particularly, code 640 is a neutral braking torque handling subroutine that handles some of the functions of determining and applying neutral braking torque to drive motor 104. At high level, the neutral brake torque handling subroutine determines whether the vehicle is engaged in a high gear or a low gear, and whether the vehicle is engaged in a downhill neutral braking mode.

A Curtis variable, EnableDownhillStrategy, may be set if it becomes necessary to cancel operation of the mode. If EnableDownHillStrategy is OFF, a value of 5% is assigned to the My_Neutral_Braking_TrqM, which specifies the maximum amount of regenerative braking torque that motor controller 102 should supply to drive motor 104. Specifying a low value such as 5% regenerative braking torque substantially prevents any charging current from entering the battery and the vehicle can only be stopped through application of the vehicle's service brakes.

If the vehicle has the high gear engaged and the downhill neutral braking mode is engaged (as indicated by switch 16 being off and switch 6 being on, respectively), then motor controller 102 determines and applies regenerative braking torque for the downhill neutral braking mode in the high gear based on a neutral braking torque curve for the high gear in the downhill neutral braking mode. If the vehicle has the low gear engaged and the downhill neutral braking mode is engaged (as indicated by switch 16 being on and switch 6 being on, respectively), then the motor controller determines neutral braking torque for the downhill neutral braking mode in the low gear based on a neutral braking torque curve for the low gear.

According to some other implementations, motor controller 102 may select a given neutral braking torque curve based on a type of the vehicle, which motor controller 102 may be programmed to determine or may determine dynamically (e.g., at run-time). Motor controller 102 may select a neutral braking torque curve in various other manners as well.

Referring back to pseudocode 640, after determining that the vehicle is engaged in a particular mode and determining an engaged gear of the vehicle, the neutral braking torque handling subroutine executed by motor controller 102 may determine and apply amount of regenerative braking to drive motor 104. In turn, applying the determined amount of regenerative torque to drive motor 104, results in a regenerative current being generated by drive motor 104.

After selecting a regenerative torque curve, motor controller 102 may use the selected neutral braking torque curve to determine an amount of regenerative braking torque to apply to the drive motor. According to an implementation, motor controller 102 may determine the amount of regenerative braking torque to apply to drive motor 104 based on the selected neutral braking torque curve by using the selected neutral braking torque curve to map an input value to the curve to determine an output amount of regenerative braking torque as that is specified by the selected neutral braking torque curve.

According to an implementation, the input to the input to the neutral braking torque curve may be a rotational velocity, such as a number of RPMs or the speed of the vehicle, which may be expressed in terms of kilometers or miles per hour, as some examples. The output of the neutral braking torque curve may be expressed in terms of a percentage of regenerative braking torque to apply to the drive motor or in various other manners as well.

To map an input value to an output value based on the selected neutral braking torque curve, the neutral braking torque handling subroutine may utilize one or more mapping functions. Such a mapping function may perform the task of mapping input value such as a rotational velocity to the selected curve and generating an output in the form an amount of regenerative braking torque based on the selected neutral braking torque curve. In some examples, the amount of regenerative braking torque that drive motor 104 may apply may be expressed as a percentage of a maximum amount of regenerative braking torque that the drive motor may apply. The amount of regenerative braking torque may be expressed in various other forms as well.

Turning now to FIG. 7, a neutral braking torque curve and corresponding functions and definitions related to the torque curve are illustrated. FIG. 7 includes a neutral braking torque curve 700, code blocks 720 and 740 for defining neutral braking torque curve 700 and includes a listing 760 of inputs corresponding outputs used to define neutral braking torque curve 700.

At a high level, neutral braking torque curve 700 comprises a series of points. The x-axis value of each point on neutral braking torque curve 700 corresponds to a rotational velocity of drive motor 104. Each input rotational velocity that neutral braking torque curve 700 is a variable beginning with the prefix "P_User3x," where "x" is some number. Each of the "P User" variables are stored may be stored non-volatile memory such that their values persist even when motor controller 102 is not powered.

The y-axis value of each point on neutral braking torque curve 700 is an amount of regenerative braking torque that is determined based on the "P_User13x," variables, where "x" is some number, that define neutral braking torque curve 700. Each of these "P_User" variables stored in non-volatile memory that may be set by a programmer offline (i.e., while motor controller 102 is not executing) using a programming tool as described in greater detail herein with respect to programming interface 760.

In some examples, the output amount of regenerative braking torque that drive motor 104 may apply based on neutral braking torque curve 700 may be expressed as a percentage of a maximum amount of regenerative braking torque that motor controller 102 may apply to drive motor 104. The amount of regenerative braking torque may be expressed in various other forms as well.

Turning now to code block 720, code block 720 may be executed once during initialization of motor controller 102 to convert speed values to RPM values that may be used to define neutral braking torque curve 700. At a high level, each line of code block 720 takes a speed variable stored in a variable (in this case 10, 20, 30, and 40 kilometer per hour respectively) and converts the speed of a given the variable into an RPM value based on the constant Speed to RPM (equal to 66), which may be predefined by motor controller 102 and in particular a Curtis motor controller.

More particularly, each line of code block 720 inputs a speed in kilometer per hour stored in a given P_Userx variable, multiplies the speed in kilometers per hour by the Speed_to_RPM constant (equal to 66 in FIG. 7), and then divides the result by 10, all of which is accomplished using a multiply and divide function, which in turn multiplies two inputs to the function and divides the resulting product by the third input to the function.

According to the illustrated implementation in FIG. 7, the VCL Get_Muldiv function may comprise such a multiply and divide function that motor controller 102 may use to perform the multiplication and division operations. According to the example of FIG. 7, the output values of these multiply and divide operations take the form of variables named AutoUser3x, where x is some number. Each AutoUser3x variable represents a number of RPMs of drive motor 104 that corresponds to the speed stored in a given P_User3x variable. For instance, the value of the AutoUser3x variable represents the number of RPMs of drive motor 104 that corresponds to the speed in kilometers per hour stored in the P_User34 variable. It should be understood that other functions or code, which may be expressed in other programming languages may produce a similar result.

More particularly, motor controller 102 may execute code block 720 to convert the speed of drive motor 104 into RPMs thereby avoiding having to determine RPM values that correspond to vehicle speeds during execution of the main control loop. After determining the RPMs corresponding to a set of vehicle speeds, the programmer may then use the RPMs in conjunction with functions of code block 740 to define neutral braking torque curve 700.

Once RPM values corresponding to respective vehicle speeds have been determined, for instance using code block 720, code block 740 may be used to create a map that conforms to neutral braking torque curve 700.

At a high level, code block 740 takes a set of input values and maps them to a set of output values. In the example of FIG. 7, the input values are each RPM values contained in the AutoUser3x variables, and the corresponding output values are amounts of regenerative braking torque stored in the P_User13x variables.

The implementation illustrated with respect to code block 740 uses a Setup_MAP function provided by a VCL library to create the mapping between the input and output values. However, any function in any programming language may be used to construct such a mapping between vehicle speed (in this instance RPM) and an amount regenerative braking torque.

After defining map, code block 740 finally automates the indexing into the map by calling the VCL_Automate_MAP function, which periodically, and separately from the main control loop, inputs the built-in motor controller 102 variable (Motor_RPM) value as an index into the curve to determine an amount of neutral braking torque to apply to the drive motor. The Automate_MAP function continuously and in the background: (1) takes the RPM value stored in the variable Motor_RPM as input, (2) determines the two closest points on the curve to the Motor_RPM value, (3) interpolates between the two closest points, and (4) outputs the interpolated value two closest points as an amount of torque, which is stored in the Donwhill_Regen_Map6_Output variable While the Automate_MAP function is used in the example of code block 740, other functions in other languages could be used to accomplish a similar purpose.

As an example, at a given point in time, the input rotational velocity stored in the variable Motor_RPM may be 15 kph, which may correspond to 99 rpm, and which falls halfway between points P_User134 and P_User135. In such a case, Automate_MAP map function first determines the two closest points, to the 99 rpm value, which in this case are P_User134, which corresponds to 90% regenerative braking torque, and P_User135, which corresponds to 100% regenerative braking torque. The Automate_MAP function then linearly interpolate between the two closest points: (1) P_User134, which corresponds to 90% regenerative braking torque, and (2) P_User135, which corresponds to 100% regenerative braking torque, to arrive at a final output value of 95% regenerative braking torque that should be applied to drive motor 104, which is stored in the Downhill_Regen_Map6_Output variable. It should be understood that motor controller 102 may be configured to determine output values that fall within two points used that are used to define a neutral braking torque curve in various other manner as well.

Motor controller 102 may generally execute code blocks 720 and 740 once, as part of the startup routine of motor controller 102 that occurs before the main control loop begins executing. However, the Automate_MAP function continues to occur continuously and in the background (e.g., in parallel with the main control loop) once it is called. By executing code blocks 720 and 740 only once at startup and not during the main control loop, motor controller 102 avoids the overhead of repeatedly defining neutral braking torque curve 700 during each main control loop iteration. Avoiding repeated definition of the neutral braking torque curve in turn reduces execution time of each main control loop, which improves the execution performance of the main control loop.

FIG. 7 also includes a conceptual diagram 760 of a programming interface that a programmer may use to set the values of variables, such as the P_User13x variables of motor that are used to define amounts of regenerative braking torque, and P_User3x variables that define a speed of the vehicle.

To summarize, conceptual diagram 760 of the programming interface specifies that the neutral braking torque curve 700 only applies if the downhill neutral braking mode is engaged and the vehicle is engaged in its high gear. For the downhill neutral braking mode, from 0 km/h to 10 km/h non-inclusive, 90% regenerative braking torque is to be applied; from 10 km/h to 20 km/h (non-inclusive), 90% regenerative braking torque that is to be applied; from 30 km/h to 50 km/h (non-inclusive), 70% regenerative braking torque that is to be applied, and from 50 km/h and above, 40% regenerative braking torque that is to be applied.

Conceptual diagram 760 further specifies that each of the P_User3x variables store each x-axis point that defines neutral braking torque curve 700 and that the P_User13x variables store each of the y-axis regenerative torque values that define neutral braking torque curve 700.

It further should be understood that the points that define the ranges of neutral braking torque curve 700 may have been determined using trial and error methods based on a particular vehicle on which the neutral braking mode is implemented. It should also further be understood that applying neutral braking torque curve 700 may result in the vehicle maintaining approximately constant speed during operation on a downgrade, assuming there is no wheel slippage.

Turning now to FIG. 8, a neutral braking torque curve and corresponding functions and definitions related to the torque curve are illustrated. FIG. 8 illustrates a neutral braking torque curve 800 and includes a conceptual diagram 860 of an interface for programming variables used to define neutral braking torque curve 800.

At a high level, neutral braking torque curve 820 comprises a series of points that each correspond to an amount of regenerative braking torque to apply to drive motor 104 while the vehicle is engaged in a low gear and in a downhill neutral braking mode while undergoing neutral braking.

In the example of FIG. 8, the input to the neutral braking torque curve 800 is a rotational velocity of drive motor 104 expressed as the variable Motor RPM, which may be expressed in RPMs or various other forms. The output of neutral braking curve 800 is an amount of regenerative braking torque that is stored in the Downhill_Regen_Map7 Output variable.

Neutral braking torque curve 800 is defined by a series of input points and output points. The input points of neutral braking curve 800 are stored in the variables P_User5x, where x is some number and which represent RPM values. The output values of neutral braking torque curve 800 are defined by variables "P_User14x," where "x" is some number that represent regenerative braking torque values.

In some examples, the amount of regenerative braking torque that motor controller 102 may cause drive motor 104 to apply may be expressed as a percentage of a maximum amount of regenerative braking torque that motor controller 102 can apply to drive motor 104. The amount of regenerative braking torque may be expressed in various other forms as well.

In general, a programmer may define a neutral braking torque curve such as neutral braking torque curve 800 using VCL code similar to code blocks 720 and 740 described with respect to FIG. 7 with some small changes. Generally, the VCL code used to define neutral braking torque curve 800 may use a different constant, Speed_to_RPM_Lo (equal to 160.2) in the example of FIG. 8, instead of Speed_to_RPM (equal to 66), to convert the vehicle's speed to RPMs but may otherwise be similar with the exception of using differently-named variables (e.g., using P_User143 instead of P_User133) and using P_User50 instead of P_User30, etc.)

Finally, FIG. 8 also includes a conceptual diagram 860 of a programming interface for motor controller 102 that allows a programmer to set the values of the input variables and corresponding output variables used to define neutral braking torque curve 800. To summarize the conceptual diagram 860 of the programming interface, neutral braking torque curve 800 only applies if the downhill neutral braking mode is engaged and the vehicle is engaged in its low gear.

For the downhill neutral braking mode, from 0 km/h to 5 km/h (non-inclusive), motor controller 102 is configured to apply 50% regenerative braking torque to drive motor 104. From 5 km/h to 10 km/h (non-inclusive), motor controller 102 is configured to apply 60% regenerative braking torque to drive motor 104. From 10 km/h to 15 km/h (non-inclusive), motor controller 102 configured to apply 55% regenerative braking torque to drive motor 104. From 15 km/h to 20 km/h (non-inclusive), motor controller 102 is configured to apply 30% regenerative braking torque to drive motor 104, and from 20 km/h and above, motor controller 102 is configured to apply 20% regenerative braking torque to drive motor 104. Conceptual diagram 860 further specifies that each of the P_User5x variables store each x-axis point that defines neutral braking torque curve 800 and that the P_User14x variables store each of the y-axis regenerative torque values that define neutral braking torque curve 800.

While FIGS. 7 and 8 illustrate respective neutral braking torque curves that output an amount of regenerative torque that motor controller 102 may apply to a drive motor such as drive motor 104 based on an input RPM, it should be understood that such neutral braking torque curves may take various other forms, which may include different range bounds and different amounts of torque to be applied.

After determining the amount of regenerative torque to apply to drive motor 104, motor controller 102 may apply the determined amount of regenerative braking torque to drive motor 104. Motor controller 102 may apply the determined amount of regenerative braking torque in various manners.

According to an implementation, to apply neutral braking torque, motor controller 102 may execute a braking command, such as the Curtis Brake_Command, which controls regenerative braking of drive motor 104 by controlling the phase voltage and phase current generated by motor controller 102 and thereby the phase current generated by drive motor 104. As a more particular example, the Brake_Command may generate the determined amount of phase current such that phase difference between the phase voltage and the phase current generates a phase current equal to Drive_Current_Limit*Neutral_Braking_TrqM. As an example, if the value of Drive_Current_Limit*Neutral_Braking_TrqM is 50%, motor controller 102 will absorb 50% of the maximum rating of the controller.

As a result of motor controller 102 applying the determined amount of phase current and phase voltage, a regenerative braking current is generated by drive motor 104. A drive current limit handling subroutine (such as the Handle_Drive_Current_Limit subroutine illustrated in FIG. 10) may cause motor controller 102 to in turn supply the regenerative braking current to battery pack 106 of the vehicle. The functions involving motor controller 102 supplying the regenerative braking current to battery pack 106.

At a high level, the drive current limit handling subroutine may cause motor controller 102 to supply the regenerative braking current to battery pack 106 based on an amount of charge that battery pack 106 can accept. Battery management system 108, which may be in communication with the motor controller 102 and battery pack 106 via a suitable communications protocol, such as a CANbus, may provide various data to motor controller 102 related to the operation of battery pack 106, which may include an amount of charge that battery pack 106 can accept at a given time. The amount of charge that battery pack 106 can accept at a given time is but one example of data that BMS 108 may provide to motor controller 102. BMS 108 may provide other data related to the operation of the battery pack 106 and to the motor controller 102 as is well known by those normally skilled in the art.

As described in the above-mentioned Curtis manual incorporated by reference, the value of the Regen_Control_Limit variable determines the maximum value of the RMS regenerative current that motor controller 102 can absorb from the drive motor 104. As will be understood by those normally skilled in the art, the regenerative torque applied to the output shaft of the drive motor 104 depends on the motor magnetic characteristics, motor speed, motor efficiency and the phase difference between a phase voltage and a phase current that is actually applied by motor controller 102. The actual values of the phase current and phase voltage are calculated by motor controller 102 to optimize motor performance over the entire motor operating range.

During regeneration, the regenerative torque is in the direction opposite to that of the rotational direction of drive motor 104. Consequently, during regeneration, drive motor 104 operates as a generator thereby absorbing kinetic energy from the vehicle and causing the vehicle to decelerate. If the vehicle is on a downgrade the regenerative torque may be operable to maintain the vehicle speed at a substantially constant value.

By way of example, if the value of the variable Regen_Current_Limit is 100%, and a Curtis controller, such as, for example, the Curtis 1238E-76 controller is used, the maximum RMS phase current that motor controller 102 can absorb is approximately 650 amperes, which represents the rated short-term RMS current motor controller 102 can provide or absorb to or from drive motor 104. Similarly, if the value of Regen_Current_Limit is 75%, the controller will absorb about 487 Amps phase current, thereby reducing the regenerative torque by three quarters.

Further as described in the above-mentioned Curtis manual, the value assigned to the Neutral_Braking_TrqM variable may further reduce the regenerative torque that motor controller 102 applies to drive motor 104 when the accelerator pedal is reduced toward the neutral position. Thus, if the vehicle is moving forward, and the vehicle operator removes his foot from the accelerator pedal, the vehicle enters the neutral braking mode and the RMS regenerative current will be reduced to Regen_Current_Limit*Neutral_Braking_TrqM.

Figure 9:
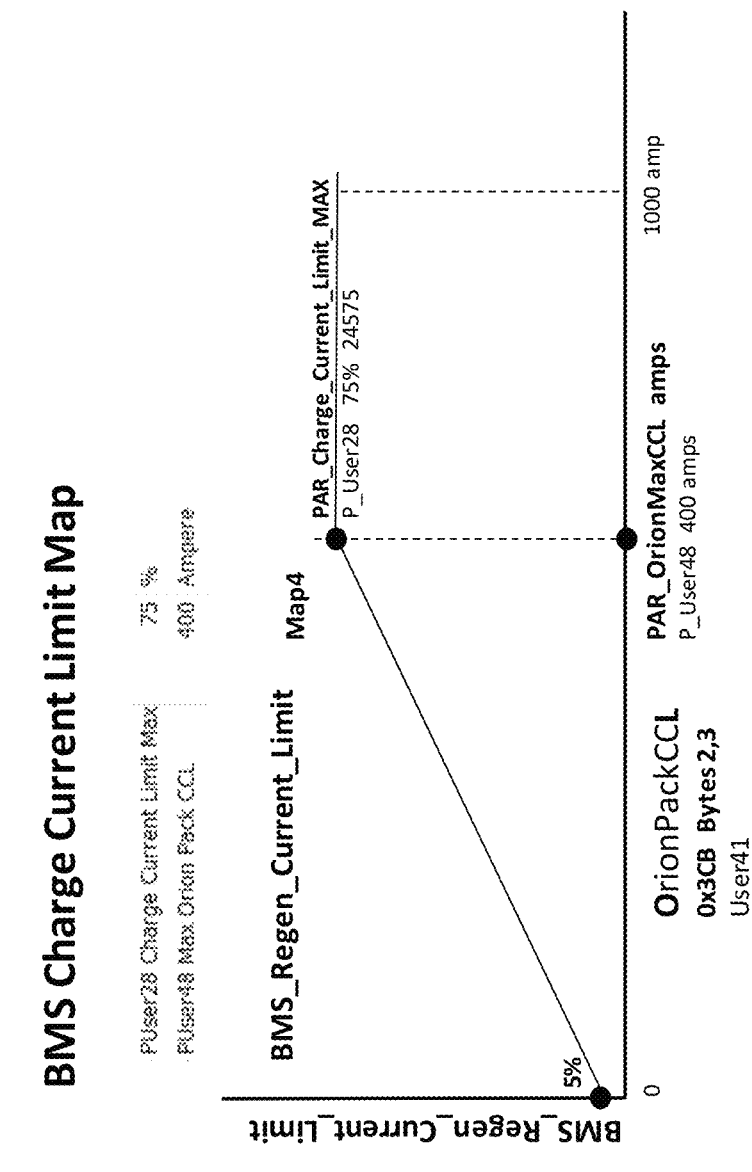
FIG. 9 is a conceptual diagram of a charge current limit map.

Turning now to FIG. 9, a graph 900 illustrates a relationship between a DC current that battery pack 106 can accept (denoted as OrionPackCCL) at any given time, and a variable, BMS_Regen_Current_Limit, that represents a maximum percentage of RMS current that may be generated by drive motor 104 during regeneration.

According to an implementation, BMS 108 continuously calculates a value for OrionPackCCL in amperes, which represents the maximum DC current battery pack 106 can accept at any given time. The numerical value for OrionPackCCL is transmitted to motor controller 102 over the CANbus. In some implementations, the. BMS_Regen_Current_Limit variable may comprise a Curtis variable to which a programmer may assign a value. After the BMS_Regen_Current_Limit Curtis variable is assigned a value, motor controller 102 may automatically limit any RMS current during regeneration to the percentage specified by BMS_Regen_Limit_Current.

In general, the BMS_Regen_Current_Limt variable may be based on the value of the OrionPackCCL variable. According to the exemplary values shown in FIG. 9, when the value of OrionPackCCL is 400 amperes or higher, the value of BMS_Regen_Current_Limit may be fixed to the value of 75% of the rated short-term RMS current limit of motor controller 102, thereby limiting the maximum DC regenerative current supplied to battery pack 106 during regeneration to 75% of the rated short-term RMS current. Limiting the maximum DC regenerative current that may be supplied to battery pack 106 may prevent supplying extremely high regenerative currents to battery pack 106 and may thereby avoid damaging battery pack 106.

At lower values of OrionPackCCL, which may occur for example if battery pack 106 is in a high state of charge, the value of BMS_Regen_Current_Limit will decrease, thereby reducing the chance of overcharging the battery pack 106. In an implementation, if battery pack 106 is close to a full charge, the OrionPackCCL variable will decrease towards zero and the value assigned to BMS_Regen_Current_Limit will be reduced to 5% of the rated short-term RMS current, thereby protecting battery pack 106 from receiving any substantial current. It will be apparent to one normally skilled in the art that these predefined values may be adjusted to conform to the capacity of battery pack 106.

The techniques referenced with respect to FIG. 9 for limiting the maximum RMS current during regen is well known to users of Curtis motor controllers and may be implemented by using a VCL Map function which may be setup to run in the background and continuously provide a value for BMS_Regen_Current_Limit as the values of OrionPackCCL changes.

Referring now to graph 900 of FIG. 9, while the charge level of battery pack 106 is higher, (represent as being near the origin on the x-axis), the BMS_REGEN_CURRENT_LIMIT and OrionPackCCL variables have lower values. When the maximum amount of DC current acceptable by battery pack 106 represented by the OrionPackCCL variable is at or near zero, BMS_Regen_Current_Limit may be equal to 5%. The BMS_Regen_Current_Limit may be set to a relatively low percentage, such as 5%, to protect battery pack 106 from receiving substantial amounts of current.

As the battery pack has less charge (i.e. moving to the right along the x-axis of graph 900), and OrionPackCCL indicates that battery pack 106 can accept more current, BMS_Regen_Current_Limit increases up until the point at which battery pack 106 can accept 400 amps of regenerative current, at which point BMS_Regen_Current_Limit reaches a maximum of 75% of the rated short-term RMS regenerative current of motor controller 102.

As another potential implementation relating to limiting regenerative current supplied to battery pack 106, the drive current limit handling subroutine executed by motor controller 102 may compare the amount of regenerative current battery pack 106 can accept with the amount of regenerative current produced by the neutral braking torque that motor controller 102 may apply to drive motor 104. If motor controller 102 determines that the amount of regenerative braking current is less than or equal to the amount of regenerative current battery pack 106 can accept, the drive current limit handling subroutine may cause motor controller 102 to supply the regenerative current to battery pack 106 by converting the regenerative current, which is an alternating (AC) current, to a direct current (DC) form and then supplying the converted DC current to regenerate the charge level of battery pack 106.

Alternatively, if motor controller 102 determines that the amount of regenerative braking current exceeds the current the battery pack 106 can accept, the drive current limit handling subroutine may cause drive motor 104 to reduce the amount of regenerative current supplied to the battery pack 106 regenerate the charge level of battery pack 106. Motor controller 102 may reduce the amount of regenerative current supplied to battery pack 106 in various manners. For instance, the motor controller may reduce an amount of regenerative current supplied to battery pack 106 by reducing an amount of root mean squared (RMS) AC current allowed during regeneration, thereby reducing the amount of DC regenerative current supplied to the battery pack 106. The motor controller 102 may reduce the amount of regenerative current supplied to battery pack 106 in various other manners as well.

Turning now to FIG. 10, an example code block 1000 of a drive current limit handling subroutine is illustrated.

At a high level, the example code block of FIG. 10 is a drive current limit handling subroutine "Handle_Drive_Current_Limit," which is executed by the main control loop 600 that was described with respect to FIG. 6.

To begin, at line 2 of the Handle_Drive_Current_Limit subroutine first determines the RMS regenerative current limit from BMS 108 as described with respect to FIG. 10 and assigns the determined RMS regenerative current limit to the Regen_Current_Limit variable, which is a Curtis variable that causes motor controller 102 to generate the specified percentage amount of maximum RMS regenerative current.

After assigning the value of Regen_Current_Limit, the Handle_Drive_Current_Limit subroutine sets the Brake_Current_Limit variable, which sets the maximum amount of RMS current during a braking command (i.e. when the brake pedal is depressed) equal to the Regen_Current_limit variable. Finally, the Handle_Drive_Current_Limit subroutine sets the Curtis variable Neutral_Braking_TrqM, which determines an amount of regenerative braking torque from a neutral braking curve as described with respect to FIGS. 7 and 8 and causes motor controller 102 to apply the percentage of maximum regenerative braking torque determined from the neutral braking torque curve to drive motor 104.

Finally, after applying the specified amount of regenerative braking torque, the subroutine of code block 1000 calls a return statement, which causes motor controller 102 to exit the subroutine.

Turning now to FIGS. 11A-11B and FIGS. 12A-12E, a first graph 1110, a second graph 1120, a third graph 1230, a fourth graph 1240, and a fifth graph 1250 are illustrated. First graph 1100 illustrates the application of neutral braking torque resulting using a given neutral braking torque curve as described above. The data in FIGS. 11A-11B and 12A-12E represent a single deceleration event from a relatively high vehicle speed, as shown in Point of graph 1230.

Figure 11A:
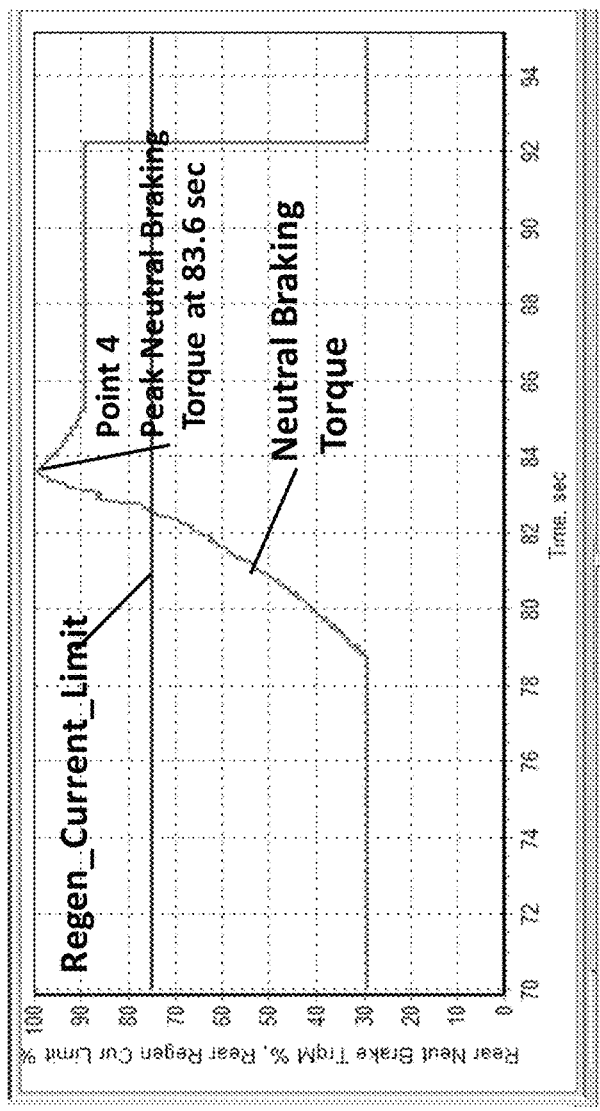
FIGS. 11A-11B are graphs of a deceleration event.
Figure 11B:
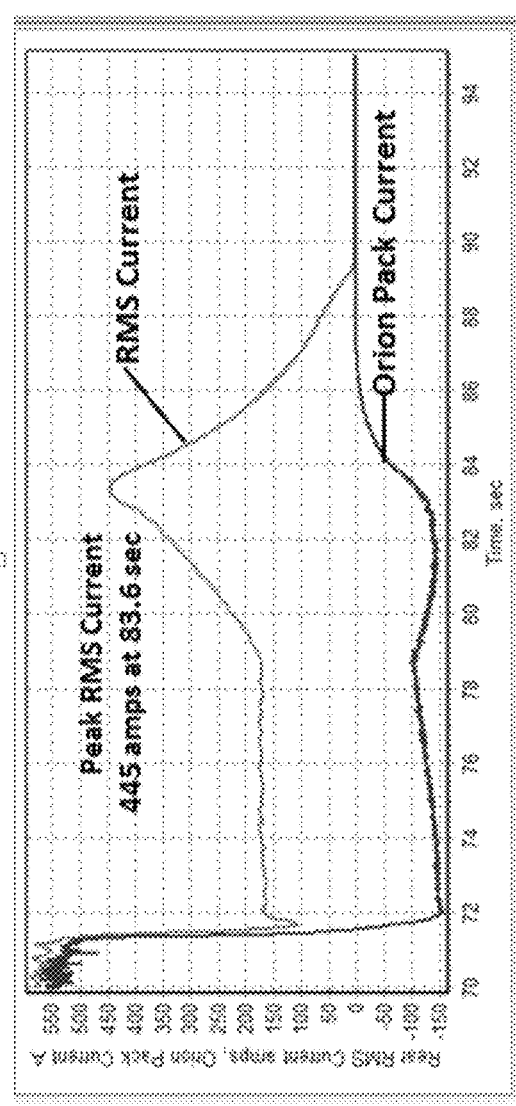

Turning to graph 1110 of FIG. 11A, during the deceleration event, a peak amount of 100% neutral braking torque is reached at 83.6 seconds when the vehicle has a speed of approximately 20 km/hr as shown in point 4 of graph 1110. Graph 1110 also illustrates that the Regen_Current_Limit corresponds to roughly 75% of maximum regenerative braking torque, which is constant throughout the deceleration event.

Turning now to second graph 1120, second graph 1120 illustrates the RMS current resulting from applying the Neutral_Braking_Torque of 100% illustrated at Point 4 in first graph 1100 and the corresponding battery pack current (referred to in second graph 1120 as "Orion Pack Current") that is supplied to battery pack 106 by motor controller 102.

Turning now to graph 1230 of FIG. 12A, graph 1230 illustrates the motor RPM of a vehicle during the deceleration event. The vehicle's motor RPMs decrease over time as a result of the application of regenerative braking torque to drive motor 104.

Turning now to graph 1240 of FIG. 12B, graph 1240 illustrates the transition between releasing a throttle command (which ends at point 1) and engaging the neutral braking mode (which begins at point 2). More particularly, at about t=72 sec (corresponding to Point 2), the throttle command is reduced to the neutral position of zero percent as the vehicle operator removes all pressure from the accelerator pedal. At or after Point 2, all of the conditions are now satisfied for beginning neutral braking.

Turning now to graph 1250 of FIG. 12C, graph 1250 illustrates application of service brakes, which occurs at point 5 when the vehicle has reached substantially zero speed and at which point the driver has activated the brake pedal. It should be noted that the brake command is zero during the entire deceleration process until the vehicle reaches zero speed at Point 5.

There are a number of notable occurrences illustrated in graphs 1110, 1120, 1230, 1240, and 1250. For instance, in graph 1120, it should be noted that while a peak RMS current of 445 amps is reached at 83.6 seconds as a result of applying the peak value of 100% neutral braking torque, the Orion Pack Current illustrated in graph 1120 decreases at this time due in part to the application of the Regen_Current_Limit and also due to the decreasing speed of the vehicle, which in turn results in a lower efficiency of conversion of the RMS current to the Orion Pack Current. Additionally, as vehicle speed decreases so too does the voltage produced by drive motor 104. This lower voltage is converted to a higher voltage that is acceptable by batter pack 106, and the conversion from lower to higher voltage further reduces the amount of DC current supplied to battery pack 106.

It will be also be appreciated by one normally skilled in vehicle mechanics that the deceleration profile of the Motor RPM of FIGS. 11A-B and 12A-C is generated by inertia of the vehicle and the rotational inertia of the drive line components. The particular shape of the Motor RPM profile depends on friction losses and inefficiencies of all drive line components and the torque absorbed by drive motor 104. It will also be apparent that the torque absorbed by the drive motor may also be used to maintain a substantially constant vehicle speed on downgrades.

FIGS. 11A-B and 12A-12C are illustrative of but one example of a deceleration event that involves regenerative braking. It should be understood that the various currents, speeds, braking torques, etc., involved in neutral braking in accordance with this disclosure may take various other forms as well.

Figure 13:
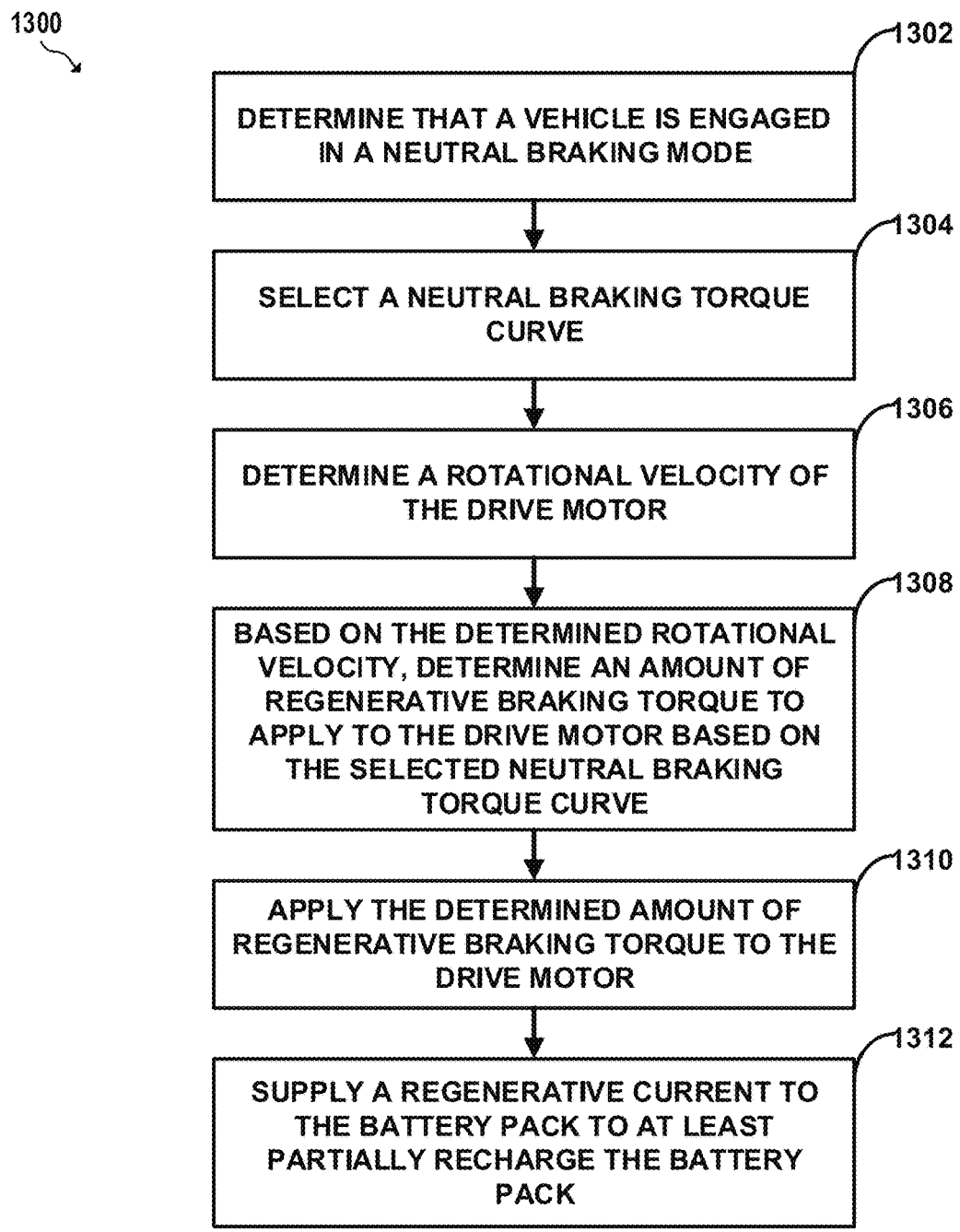
FIG. 13 is a flowchart of a method for performing regenerative braking during a neutral braking mode.

Turning now to FIG. 13, a flowchart illustrating a method 1300 corresponding to the regenerative braking embodiment is illustrated.

The method of FIG. 13 begins as block 1302 at which point motor controller 102 may determine that a vehicle is engaged in a neutral braking mode.

At block 1304, after determining that the vehicle is engaged in a neutral braking mode, motor controller 102 may select a neutral braking torque curve.

At block 1306, motor controller 102 may determine a rotational velocity of the drive motor, such as drive motor 104.

At block 1308, motor controller 102 may, based on the determined rotational velocity, determine an amount of regenerative braking torque to apply to drive motor 104 based on the selected neutral braking torque curve.

At block 1310, motor controller may apply the determined amount of regenerative braking torque to drive motor 104, wherein applying the determined amount of regenerative braking torque to the drive motor results in a regenerative current generated by drive motor 104.

At block 1312, motor controller 102 may supply the regenerative current to a battery pack (e.g., battery pack 106) of the vehicle to at least partially recharge the battery pack.

According to some examples, motor controller 102 may apply the determined amount of regenerative braking torque to drive motor 104 and may supply the regenerative current to the battery pack by setting the values of variables that cause motor controller 102, and/or drive motor 104 to perform the functions described with respect to method 1300, such as the functions of blocks 1310, 1312, etc.

As an example, to apply the determined regenerative braking torque to drive motor 104, motor controller 102 may set the value of the Neutral_Braking_TrqM variable equal to the determined amount of regenerative braking torque. As another example, motor controller 102 may update the Regen_Current_Limit variable and the BMS_Regen_Current_Limit variable.

It may generally be understood that motor controller 102 may execute method 1300 repeatedly for instance in a loop.

It should further be understood that method 1300 may include more or fewer blocks, which may occur in orders other than those specified with respect to FIG. 13.

Various implementations and examples associated with the present embodiment related to regenerative braking have been described. However, it should be understood that the present embodiment may take various other forms as well.

1. Traction Control of Dual Motor all-Wheel Drive Electric Vehicles

A second embodiment is related to traction control of dual motor, all-wheel drive electric vehicles. The traction control system of the present embodiment is intended for dual motor all-wheel drive off-road electric drive vehicles and improves traction at low speeds under difficult road conditions of high grades and unfavorable terrain. According to various implementations, the traction control system may be used in battery-only vehicles and hybrid electric vehicles.

Figure 14:
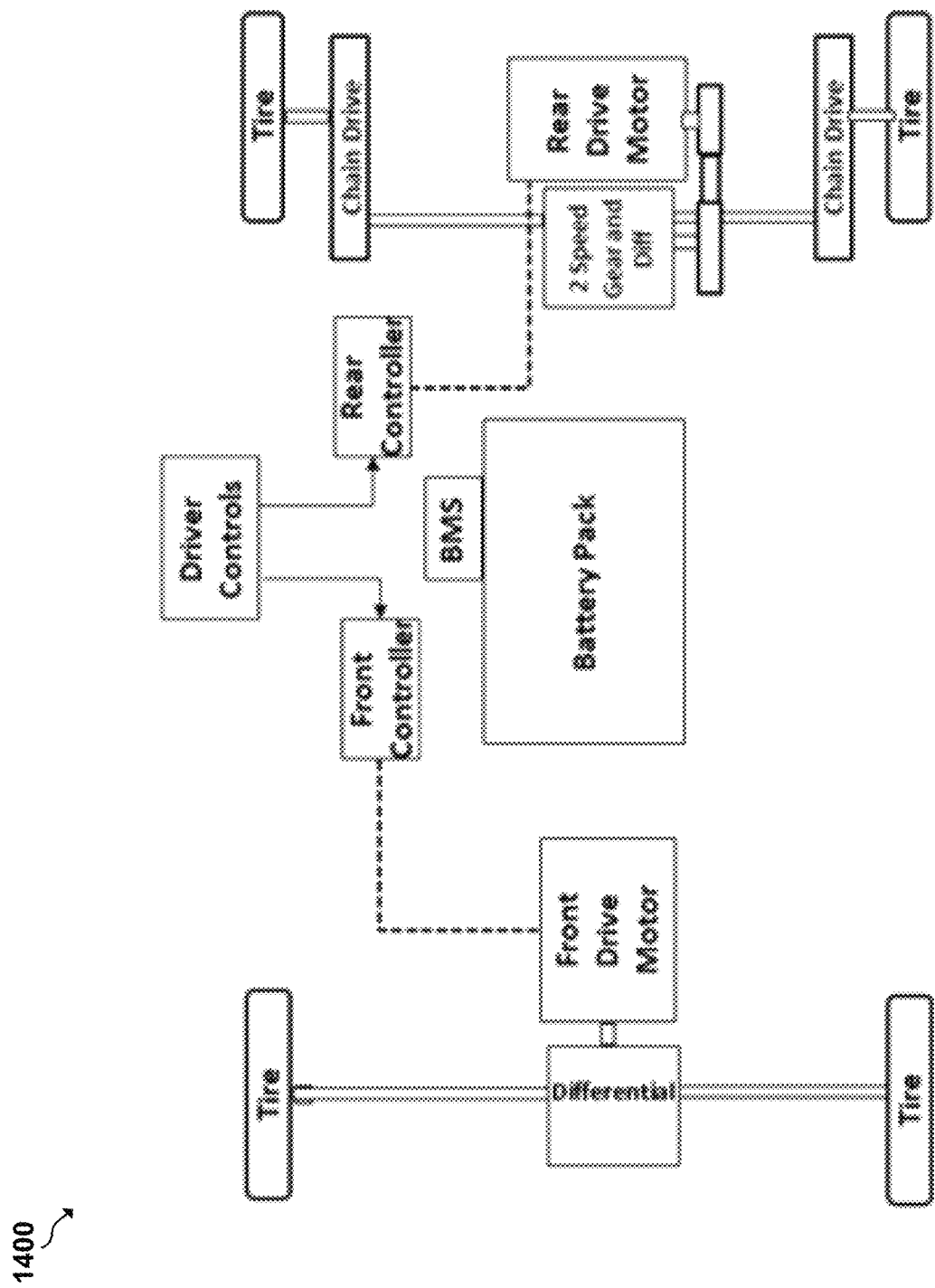
FIG. 14 is a conceptual diagram of a vehicle configuration.

An exemplary powertrain of a dual motor all-wheel drive electric vehicle is shown in block-diagram form FIG. 14, which shows the electrical connections and driver controls for the front controller and rear controller of the dual motor all-wheel drive electric vehicle of the present invention.

The traction control embodiment may present various advantages. Examples of some such advantages may include: (1) maximizing traction between front and rear axles on conditions of high grade and poor terrain, (2) minimizing spin and energy loss of spinning wheels, (3) automatically adjusting for forward and reverse drive on uphill grades, (4) preventing of digging-in of spinning wheels on loose sand or snow, (5) allowing untrained drivers to maneuver effectively over the most difficult terrain, (6) providing driver-selectable means to cancel the traction control, (7) providing a controllable differential, (8) providing a minimum speed for activation of traction control, and (9) utilizing a comparison between Front_RMS_Current and Rear_RMS_Current to detect cases when one wheel of the vehicle is in the air. The traction control embodiment may provide various other advantages as well. The traction control embodiment will now be described in greater detail.

At a high level, the traction control embodiment may be relevant to a 4-wheel electric drive vehicle implementation, comprising a front drive motor and a rear drive motor, a front controller and rear controller. In one implementation, the front drive motor is connected via a fixed ratio gear to a differential for driving the front axle. The rear drive motor drives are connected via a fixed ratio belt and a 2-speed gear and differential box. The differential box drives a left trailing arm and a right trailing arm via the axle, and each of the trailing arms is a construction including a chain for driving the rotation of the wheel based on the rotation of the axle. The trailing arm itself is a movable and pivotable well-known construction in the mechanical art. The trailing arm suspension is a known construction and provides the electric vehicle with a very large travel of the rear wheels with respect to the body, with respect to the frame, and this travel is useful in off-road conditions and gives the vehicle tremendous maneuverability.

The system according to this traction control system embodiment also includes a battery compartment and battery management system, the battery compartment delivers the electric power for the drive motors. The front controller and the rear controller obtain their power from the battery compartment by direct connection. The battery management system is connected to various individual battery cells to monitor their individual capacities and storage and can provide information to the front and rear controllers about which cells are usable for drawing power.

The front and rear controllers are power controllers, generally known as inverters, for converting DC power to AC power to drive the front and rear drive motors which are AC 3-phase motors. In addition to the power conversion function of the power controllers, they are computerized, therefore programmable, to enable them to control the torque on the AC drive motors, through techniques including voltage, current and phase control.

An example of a front and rear controller is an AC induction motor controller, by Curtis Instruments, the controller features an indirect field orientation (IFO) vector control, which enables controlling the torque and efficiency across the entire speed range. The controllers are adapted for receiving inputs such as temperature and speed at the motor shaft, and for integrating this information and enabling control of the drive motor. The programming language for this controller is known as VCL, which is a vehicle control language, and is a programming language for Curtis controllers.

One of the problems which needs to be addressed in the design of an off-road electrical vehicle, is the possibility that the vehicle is travelling on a steep incline and climbing in its direction of movement. The accelerator pedal for the vehicle, which will be monitored, outputs an electrical signal that may be used for controlling the controller's outputs to the wheels. On a level road, these controls would comprise a certain torque command, but once the vehicle is moving not on a level road, but is instead climbing, there may a weight shift to the rear wheels. In such a case involving a non-level road, the torque command must be modified in order to achieve proper torque distribution. Otherwise, there may be slippage of the wheels during this movement.

Depending on the motion of the vehicle, this slippage can occur either on the front wheels or the rear wheels, if the vehicle is climbing in its normal direction where the front wheels are going to slip, or if it is backing out of a ditch where the rear wheels are pulling the vehicle. Since most of the weight is on the front wheels of the vehicle the rear wheels will slip because the front wheels do not have enough torque to push the vehicle up the slope on reverse motion. Once the rear wheels are slipping, even depressing the accelerator pedal for introducing more torque wastes energy. This problem of wasting energy and loss of traction is also experienced in the case where the vehicle is traveling on loose sand, in which case both axles may slip, and without the necessary intervention through the control system, the vehicle will not make progress, and therefore the control system must provide some sort of control to overcome these loose ground or slipping conditions.

A solution to this problem as described in this embodiment involves monitoring the speed of the front and rear motors. A differential is provided for enabling the wheels to turn at different speeds upon turning of the vehicle. In the case of a locked differential, the speed of rotation of the wheels is the same. However, in the locked differential case, the torque on the individual wheels can be different while the speeds are identical. The present embodiment provides traction control, and when the vehicle is moving forward, the traction control system applies traction control to the front axle to maximize traction on the front axle. In a climbing situation, using the traction control system of the present invention, the front wheel torque is adjusted by a PID (Proportional Integral Differential) controller, so as to control the slippage and thereby maximize the torque delivered by the front axle. When reversing the vehicle motion, by backing up a hill, the traction control system operates in reverse, which provides the rear wheels with a controlled range of slippage.

Figure 15:
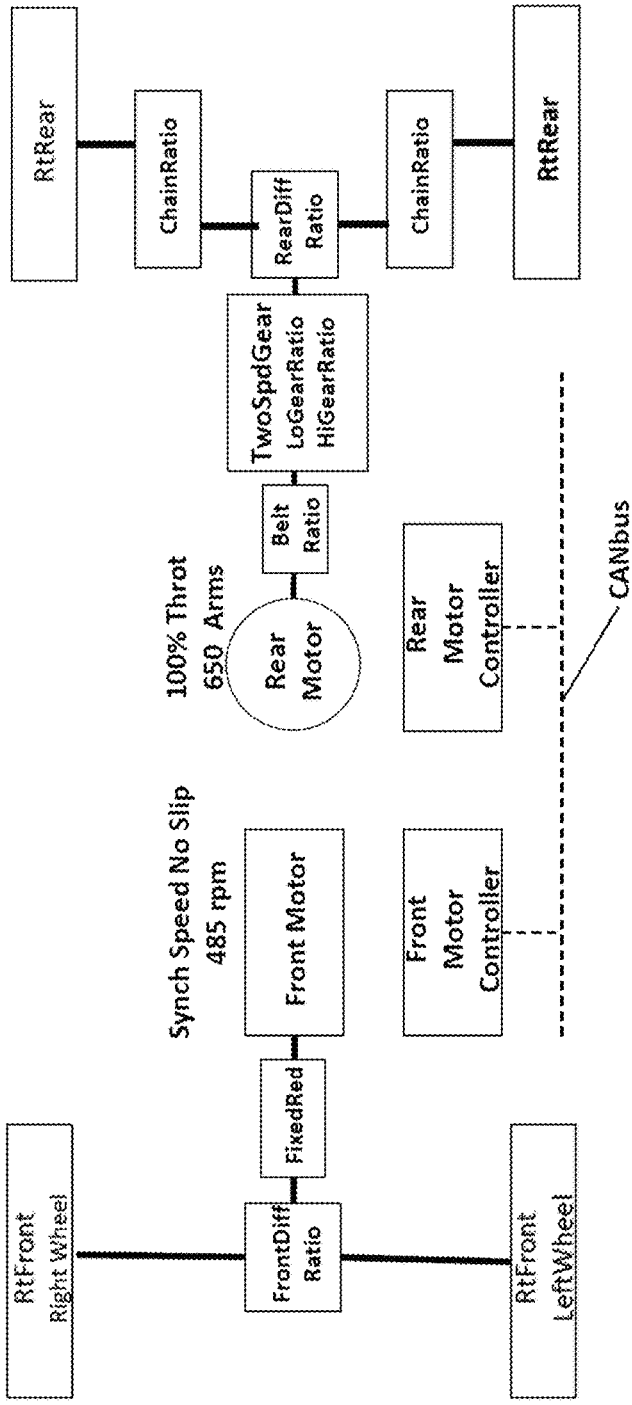
FIG. 15 is a conceptual diagram of a vehicle configuration configured to implement traction control.

Reference is now made to FIG. 15 wherein the vehicle is moving forward and attempting to climb an uphill grade. In this example, both rear wheels are in contact with the ground and there is no slippage between either of the rear tires and the ground. In this example, the vehicle is operating in the All-Wheel Drive (AWD) mode wherein driving traction is provided by both the Front Motor and the Rear Motor.

If the Two Speed Gear is set for operation in the HiRatio, $$NFrontSynchHi = \left\{ \frac{FrontDiffRatio * FixedRed}{RtFront} * \frac{RtRear}{ChainRatio * RearDiffRatio * HiRatio} \right\} NRear,$$

where NFrontSynchHi is the no-slip speed of the front motor when the Two Speed Gear is in the HiRatio and NRear is the speed of the rear motor in rpm, as reported over the CANbus from the Rear Motor controller and RtRear and RtFront are the effective rolling radii of the rear and from tires respectively in meters. Also, according to the above equation, FrontDiffRatio and RearDiffRatio are the speed ratios of the front and rear differentials; FixedRed is the speed ratio of the fixed gear reduction between the Front Motor and the Front Differential; ChainRatio is the speed ratio of the chain drive drivingly connected between Rear Diff and the rear tire; BeltRatio is the speed ratio between the Rear Motor output shaft and the input shaft of the two-speed transfer case. As used herein, speed ratios represent the input shaft speed divided by the output shaft speed for each component.

In an implementation of the present embodiment, the Front Motor and the Rear Motor are controlled by Torque Control wherein the respective motors are given a Throttle Command which causes the respective motors to generate an RMS current which is proportional to the Throttle Command. Thus, in an exemplary embodiment of the present invention, a Throttle Command of 100% will cause the RMS current in both Front Motor and Rear Motor to develop 650 amps RMS. This is the maximum torque the motors can generate in this example.

It is well known in the art that when motor torque is specified by the controller, the rotational speed of the motor is dependent on the load on the motor.

Referring again to FIG. 15, operation of the traction control system is now described for a number of different terrain conditions. These examples are intended for descriptive purposes only. For the sake of clarity, the 2Speed Gear is in the HiGear ratio and the Throttle Command from the vehicle operator is 100%.

Example 1—the Front Wheels do not Slip

The Front Controller is operative to generate maximum torque by the Front Motor. The terrain conditions are such that the front wheels do not slip and the maximum possible tractive effort is generated on all wheels. Since there is no slippage, the speed of the front motor is NFrontSynchHi rpm.

Example 2—Traction Control when Front Wheels Slip

Irregular terrain conditions and acceleration of the vehicle may cause weight transfer from the front wheels to the rear wheels. If the tractive effort developed by the front motor exceeds the traction limit between the front wheels and the ground, the speed of the front motor will increase, and the front wheels will slip.

It is well known in the art that maximum traction between a tire and the ground is achieved when a certain amount of slip is present. Typical values for maximum friction between the tire and road is about 10% slip for dry road surfaces and about 5% for wet road surfaces. If the wheel slip is higher than these values, the friction actually decreases, thereby reducing the traction of the vehicle.

The Traction Control system of the present invention is operative to limit the speed of the Front Motor according to the following equation:

MaxSpeedTrq$M$=AllowedSlip*$N$FrontSynchHi, where AllowedSlip is a parameter that may be adjusted by the operator of the vehicle. In a preferred embodiment of the invention, this maximum speed of the Front Motor is limited by a conventional PID feedback control loop wherein the Throttle Command to the Front Motor is reduced thereby decreasing the torque developed by the Front Motor.

As used herein, a parameter refers to a value that may be set in the motor controllers by various means provided by the manufacturers of the controller. A parameter may be changed only when the vehicle is at rest and the parameter change does not take effect until the controller is reset.

Values of AllowedSlip are preferably greater than 1.02 and less than 1.2 and more preferably 1.1, depending on the terrain and weather conditions. In an alternative implementation, the value of AllowedSlip may be set by switch means activated by the vehicle operator to adjust to changing conditions. In yet another additional implementation of the present embodiment, the value of AllowedSlip may be set by potentiometer means activated by the vehicle operator.

In an implementation, a lower bound may be placed on the value of MaxSpeedTrqM. Thus, if the calculated value of MaxSpdTrqM, which depends on the value of the speed of the Rear Motor NRear, is less than a parameter TractCtrlMinMtrSpeed, the value of MaxSpeedTrqM may be set equal to TractCtrlMinMtrSpeed. In some examples, values of TractCtrlMinMtrSpeed are preferably greater than 100 rpm and less than 1200 rpm and more preferably 750 rpm.

Example 3: Canceling Traction Control at Driver Request

Under certain terrain conditions wherein the traction coefficient between the driving wheels and the ground are unusually low, it may become advantageous to override the traction control system and allow both front and rear wheels to slip. A typical example of such conditions may occur when the vehicle is traversing very loosely packed sand dunes.

If the driving wheels are allowed to slip, some of the sand is flung rearwards and at least some vehicle traction is generated by both front and rear wheels.

Driver-selectable switch means are therefore provided which are operative to cancel the traction control algorithm and allow the Front Motor to reach speeds above MaxSpdTrqM.

It will be apparent that this type of driving is wasteful of energy and should be used for very short periods of time.

Example 4: Preventing Front Wheel Slip Completely

As described hereinabove, the traction control system of the present invention typically limits the speed of the front motor so that the speed of the front wheels do not exceed the speed of the rear wheels by more than typically 10%-15%.

Under certain terrain conditions, even this 10%-15% slip may be excessive. A typical example of such terrain conditions occur in very rocky conditions wherein one of the front wheels for example is in not in contact with the ground. As is well known to one skilled in the art, a typical open differential always applies the same amount of torque to each wheel. Since one of the front wheels is in the air and thereby unloaded, substantially zero torque will be provided to the loaded front wheel that is in contact with the ground. The speed of the loaded wheel will be zero, but the speed of the unloaded wheel will be double the value when the vehicle is moving straight ahead.

Free-wheeling of the unloaded wheel is normally not a problem unless someone is walking close to the unloaded spinning wheel. Any rocks or dirt thrown up by intermittent contact of the unloaded rapidly spinning wheel with the ground may cause injury.

It will be apparent to one normally skilled in the art that if one of front wheels is freely rotating, the total torque required by the front drive motor will be very low and hence the RMS current provided by the front drive motor will very low.

The RMS current provided by the rear drive motor, which will be providing all of the torque propelling the vehicle, will be substantially higher than the RMS current of the front drive motor.

It is a purpose of this alternate embodiment of the present invention to monitor the Rear Motor RMS current and the Front Motor RMS current. When there is a larger than expected difference between the RMS Motor Torques the traction control system will be operative to limit the Front Motor RMS torque to almost zero, thereby preventing the unloaded motor from spinning rapidly.

Operation of the traction control system described herein when the TwoSpdGear is in the LoGearRatio is identical to operation in the HiGearRatio except that the Front Motor speed is controlled by the value of NFrontSynchLo as defined by the following $NFrontSynchLo$ $$\left\{ \frac{FrontDiffRatio * FixedRed}{RtFront} * \frac{RtRear}{ChainRatio * RearDiffRatio * LoRatio} \right\}$$

$NRear$.

It will be apparent to one normally skilled in the art that the traction control method described hereinabove will be operative to control vehicle traction if the vehicle is moving in reverse while climbing a grade. In this case, the maximum speed of the Rear Motor is calculated as a function of the speed of the Front Motor.

In an alternate embodiment of the present invention, the traction control means are operative to run in a front Wheel Only mode of operation. Operation of the Front Wheel Only mode is identical to operation in the AWD Mode except that the torque command of the rear motor controller is limited to small values which are sufficient to overcome the spin loss of the Rear Motor and associated drive line components.

In another alternate embodiment of the present invention, the traction control means are operative to run in a Rear Only mode of operation. Operation of the Rear Only mode is identical to operation in the AWD Mode except that the Torque Command of the Front Motor Controller is limited to small values which are sufficient to overcome the spin loss of the Front Motor and associated drive line components.

It is well known in the art that the motor controllers used to control operation of the vehicle comprise a number of manufacturer-provided safety features which are required to assure safe operation of the vehicle. A description of these safety features may be found in the Troubleshooting chart of the relevant Curtis Instruments Manuals.

In accordance with another implementation of the present embodiment, the Front motor controller and the rear motor controller also comprise at least one error override means for overriding faults detected by the motor controllers and allowing reduced performance of the vehicle.

It should be understood that this embodiment may take various other forms as well.

2. Performance Optimization for Dual Motor all-Wheel Drive Electric and Hybrid Vehicles Another embodiment is related to performance optimization of dual motor, all-wheel drive electric and hybrid vehicles.

As an introduction, driver-selectable mode changing means for limiting the performance of an electric vehicle are known in the prior art. Typical modes include high performance, normal performance, and limp home modes. These methods typically restrict the maximum current drawn by the drive motor(s) and/or limit maximum vehicle speeds.

The embodiment relates to means for controlling the division of torque between the front axle and the rear axle to accommodate different vehicle speed ranges and varying terrain conditions. Reference is now made to FIG. 14.

At low vehicle speeds and difficult terrain both front and rear motors can operate at full torque for maximum traction. At higher vehicle speeds, maximum traction is no longer required and it is beneficial to reduce the torque generated by the front motor. At still higher vehicle speeds it may be desirable to reduce the front motor contribution to zero.

The torque division means may also comprise driver selected means for propelling the vehicle by the Front Drive Motor only. These driver-selected means may also be operable to propel the vehicle by the Rear Drive Motor only.

These driver-selected means may also be operable to allow the driver to select the desired torque division between front and rear axles at will, even when the vehicle is moving at high speed.

The torque division means may also comprise means for automatically limiting the current drawn from the battery to safe levels commensurate with the state of the battery.

Figure 16:
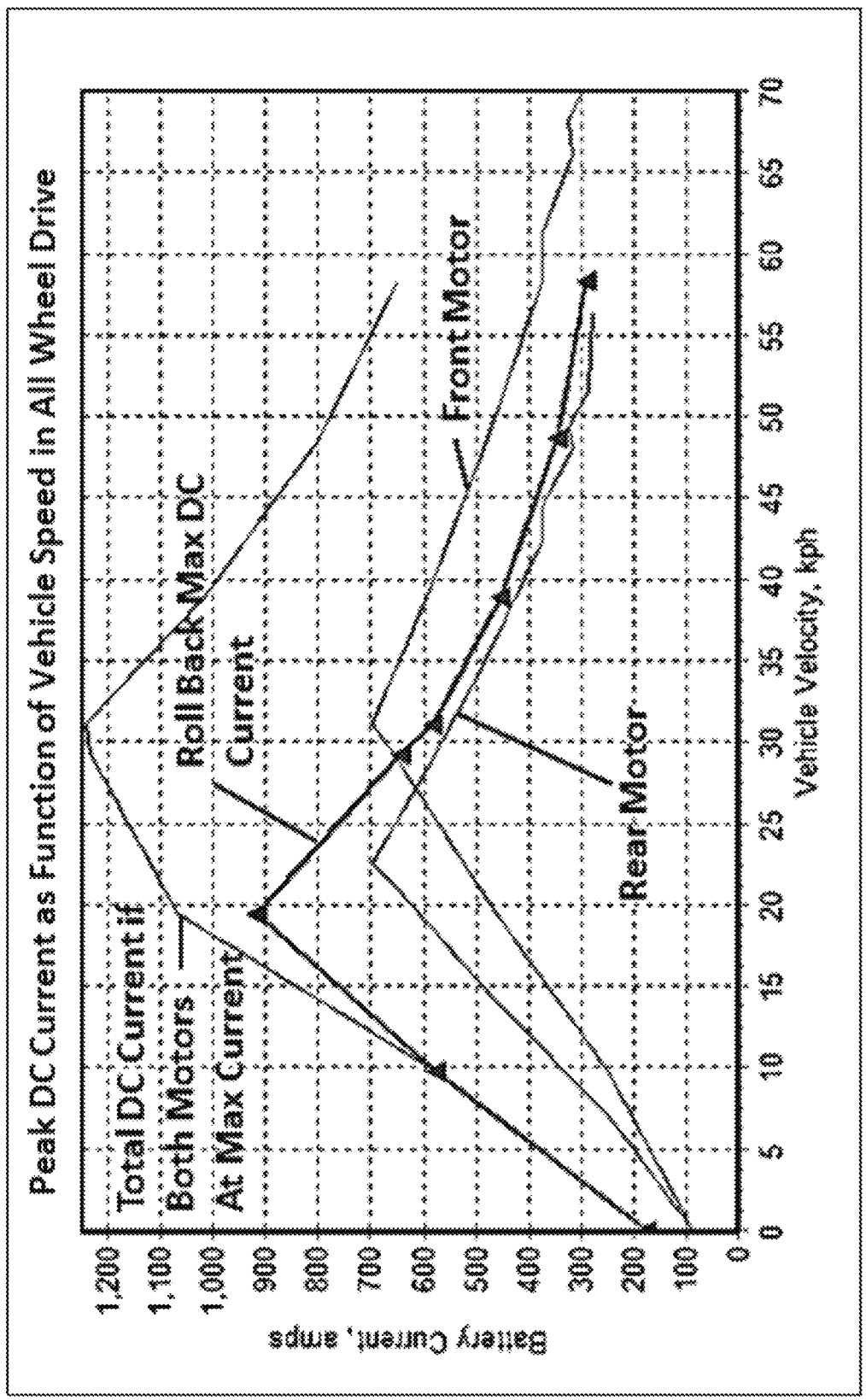
FIG. 16 is a graph of peak DC current as a function of vehicle speed.

Reference is now made to FIG. 16 which shows the peak battery current as a function of vehicle velocity.

The Rear Motor and the Front Motor curves represent the peak battery current that may be drawn from each of the motors at a driver command requesting full torque as a function of vehicle velocity.

It will be apparent that if both motors are allowed to operate at maximum torque, the battery current may reach excessive levels as shown by the curve. Total DC Current if Both Motors at Max Current. If this continues for more than a few tens of seconds overheating and damage to the battery may result.

Figure 72A:
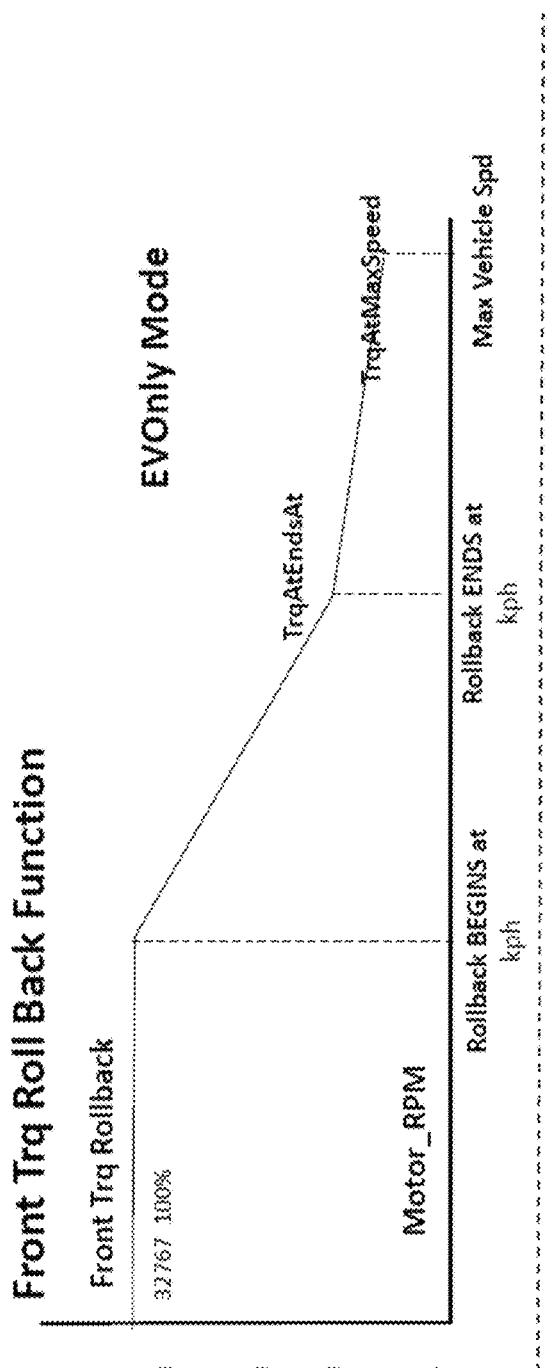
FIGS. 72A-72B are conceptual diagrams illustrating the operation of a torque rollback means.
Figure 72B:
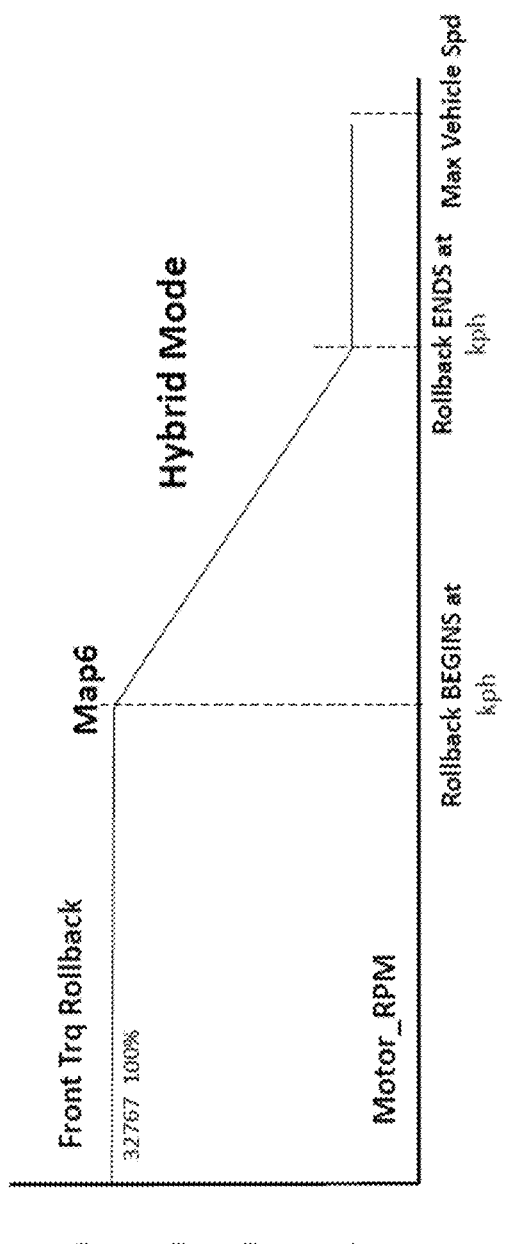

To prevent possible damage to the battery and preserve the battery capacity, front torque rollback means are provided to reduce the torque provided by the Front Motor as a function of vehicle speed. As illustrated in FIG. 72A-B. the front torque rollback means are operable to limit the battery current drawn by the front controller to the values shown generally by the curve Front Trq Rollback.

Preferred values of the parameter Rollback BEGINS at is greater than 10 kph and less than 50 kph and more preferably about 20 km/hr.

Preferred values of the parameter Rollback END at is at least 15 kph and less than 60 kph and more preferably about 35 km/hr.

Preferred values of the parameter TrqAtEndAt is at least 5% and less than 100% and more preferably about 20%.

Preferred values of the parameter TrqAtMaxSpd is at least 5% and less than 100% and more preferable about 19%.

The percentage values for the torque rollback function represents the percentage of the maximum rated RMS current of the front controller.

It will be appreciated that if the values of TrqAtEndAt and TrqAtMaxSpd are set to 100%, the both motors will provide the maximum possible torque at all vehicle speeds.

It will further be appreciated that the Front Torque Rollback Function has the tendency to provide full torque from both front and rear controllers at low vehicle speeds and gradually reduce the contribution of the front controller as the vehicle speed increases.

In an alternate implementation of the present embodiment, the torque rollback method is operative to vary as a function of the battery SOC.

In an alternate implementation of the present embodiment, the torque division means is operable to transfer torque in a continuous manner between the front motor and rear motor to equalize the temperature of the respective motor and/or controllers.

In another implementation of the present embodiment, the torque division means is operable to issue an alarm to the vehicle operator if one or both of the motors or controllers are approaching dangerous temperature levels. This allows the vehicle operator to reduce the demand for power or activate the driver selected means and remove the load completely from the higher temperature device.

In an alternate implementation of the present embodiment, the torque division means may also be operable to take advantage of different torque-multiplications provided by the front motor, rear motor in high gear and rear motor in low gear. This is analogous to having three different transmission ratios in a conventional vehicle.

Figure 17:
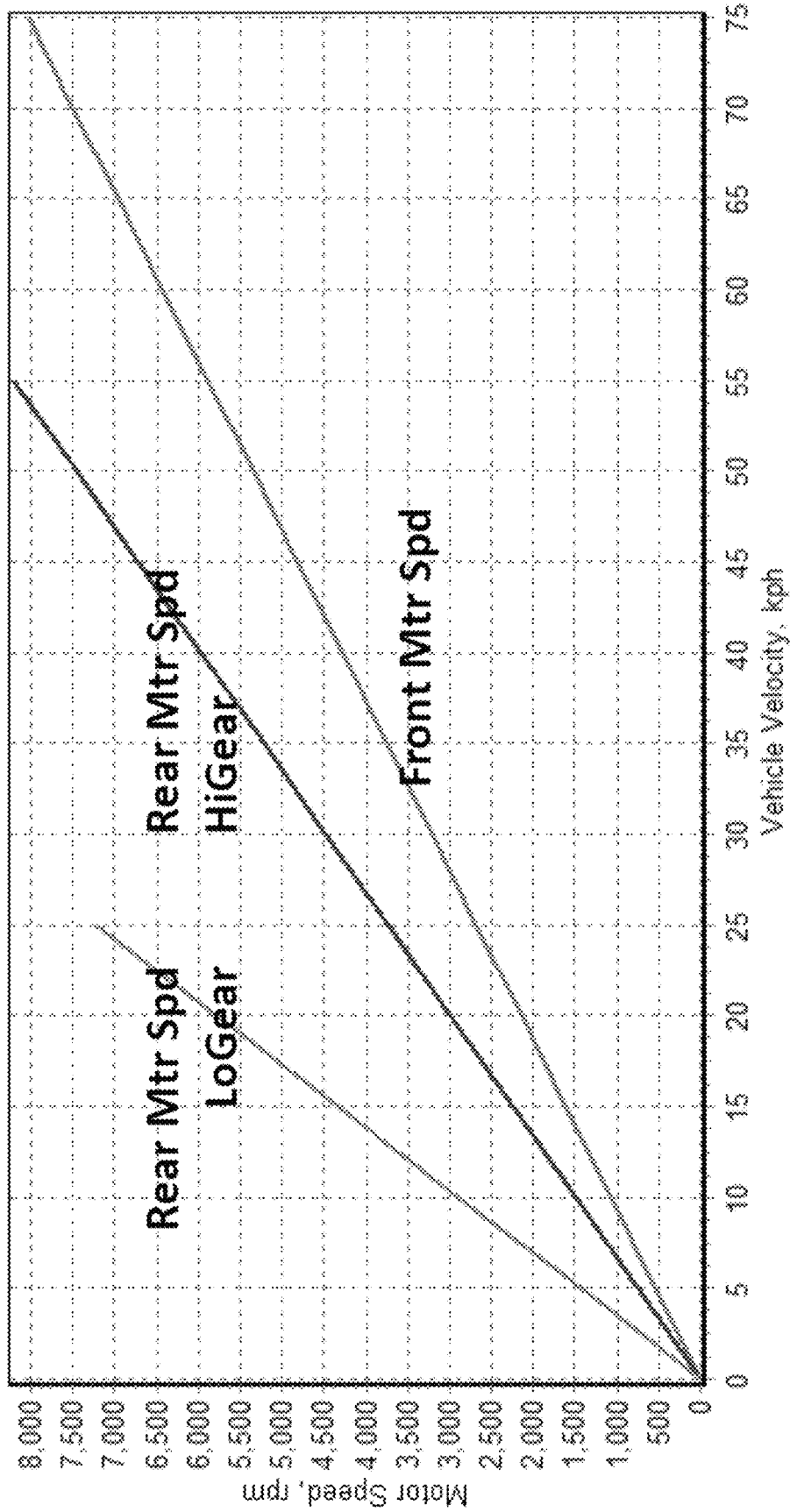
FIG. 17 is a graph of motor speeds.

Referring now to FIG. 17, the curve Rear Mtr Spd Lo Gear shows the rear motor speed as a function of vehicle speed when the 2 Speed Gear is in a Low Gear ratio. This is analogous to a first gear ratio in a conventional vehicle transmission wherein maximum driving torque is required.

The curve Rear Motor Spd HiGear shows the rear motor speed as a function of vehicle speed when the 2 Speed Gear is in a High Gear ratio. This is analogous to the 2nd gear of a conventional vehicle transmission wherein an intermediate level of driving torque is required but a higher vehicle speed is desired.

The curve Front Motor Spd shows the speed of the Front Motor as a function of vehicle speed. This is analogous to the 3rd gear of a conventional transmission wherein a high vehicle speed is required but less driving torque is required.

In an alternative implementation of the present embodiment, range control means are provided to allow the vehicle operator to select between Front Wheel Only (FrontOnly), Rear Wheel Only (RWD) and All Wheel Drive (AWD) modes of operation while the vehicle is in motion. The range control means override the vehicle operator requests if an inappropriate range is selected and allow the selected range to be operative when the motor speed reaches an appropriate level.

Figure 18:
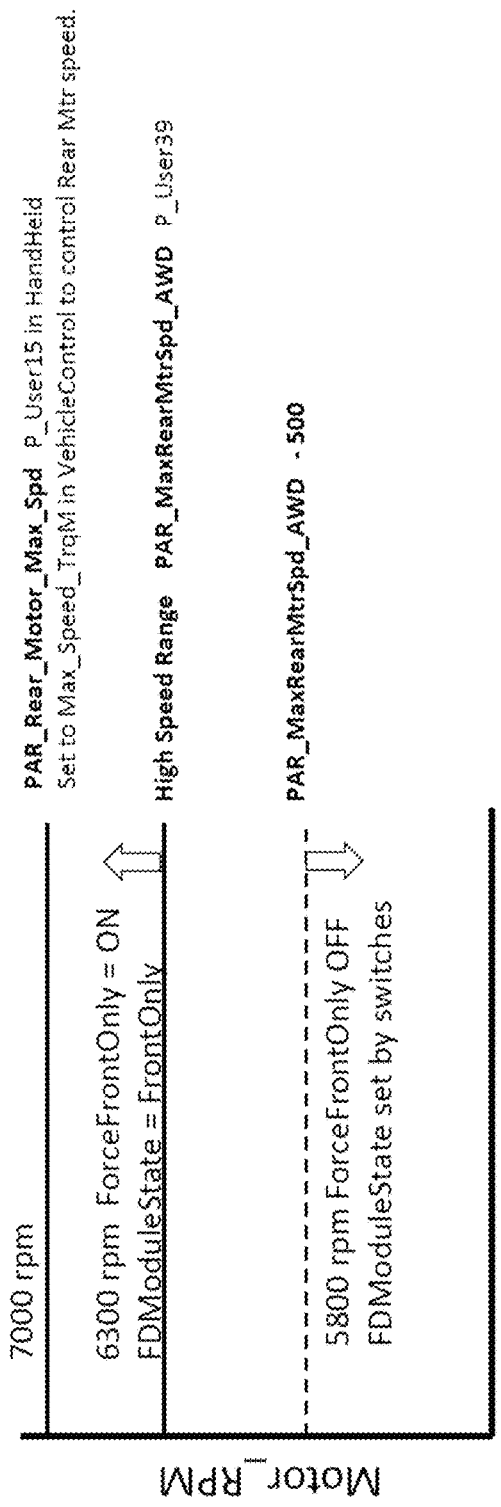
FIG. 18 is a conceptual diagram of a front only mode of vehicle operation.

Reference is now made to FIG. 18 which shows an exemplary method used in the Rear Controller to send a message to the Front Controller that the Rear Motor has reached a high-speed range. This message forces the Front Controller to operate in the Front Only mode of operation whereby the Front Controller provides substantially all of the driving torque to propel the vehicle.

In another alternative embodiment of the present invention, the range control means are operative to reduce the maximum armature current to low values at high motor speeds.

As described in the publications of Curtis Instruments, the maximum possible operating speed of the motors is less than 8000 rpm and it is advisable to operate at speeds substantially lower than this to avoid operation at very low efficiency of the motors and controllers.

In an alternative embodiment of the present invention, the range control means are operative to electrically disconnect the power transistors of the Rear Motor Controller at rotational speeds above about 7000 rpm thereby allowing the front motor to propel the vehicle to very high speeds.

This alternative embodiment of the ranges control means also comprises means for electrically reconnecting the power transistors of the rear motor controller at a rotational speed of the rear motor substantially below 7000 rpm thereby providing adequate hysteresis and preventing rapid transitions of connecting and reconnecting the power transistors.

In yet another alternative embodiment of the present invention, the range control means also comprise means for electrically disconnecting the power transistors of the Rear Motor Controller and the Front Motor Controller at high rotational speeds. This range control method is particularly suitable for parallel hybrid electric vehicles which are provided with an additional source of mechanical power such as a heat engine.

3. Regeneration and Braking Control

This disclosure also describes a regeneration and braking control embodiment. The braking and regeneration control embodiment optimizes and simplifies control of electric and parallel hybrid vehicles during extended downhill and braking operation.

Some example advantages of the regeneration and braking control embodiment comprise switch-selectable regeneration means for extended downhill operation so vehicle speed can be maintained without depression of brake pedal. The switch-selectable regeneration means eliminates heating of service brakes and maximizes recovery of energy, allows optimized regeneration of energy during braking between front and rear wheels while maintaining vehicle stability, and controls rate of response of the brake pedal in front and or rear controller to respond rapidly at high vehicle speeds and more slowly at lower vehicle speeds. Thus, the regeneration and braking control embodiment prevents instability in the controller at very low speeds while providing required rapid response at high speeds.

To assure vehicle stability under all road conditions, separate controls are provided for the Front Controller and the Rear Controller.

Reference is now made to FIG. 19 which shows how regenerative braking is limited in the Front Controller by assigning values to the Curtis variables Neutral_Braking_Torque and Regen_Current_Limit.

Figure 20:
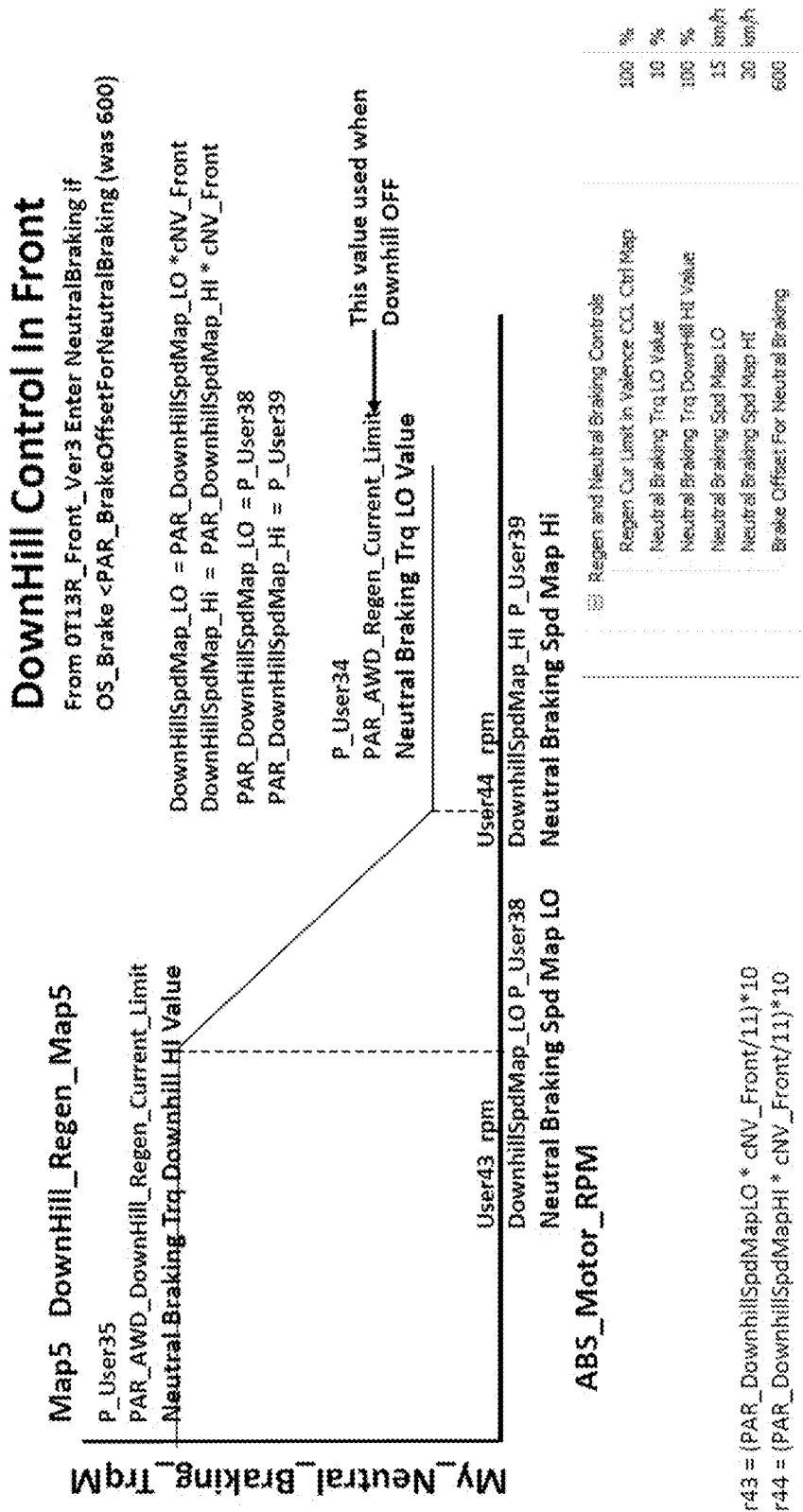
FIG. 20 is a graph of an example relationship between a neutral braking torque variable and vehicle speed.

Reference is also made to FIG. 20 which shows an exemplary functional relationship between a My_Neutral_Braking_TrqM variable and the vehicle speed as represented by the speed of the front motor.

Reference is also made to FIG. 21 which shows an exemplary method operative to control vehicle braking for normal driving when there is no request for application of the vehicle service brakes, when there is a low request for braking, and when the request for application of the service brakes is high enough generate hydraulic pressure in the service brakes.

Figure 23:
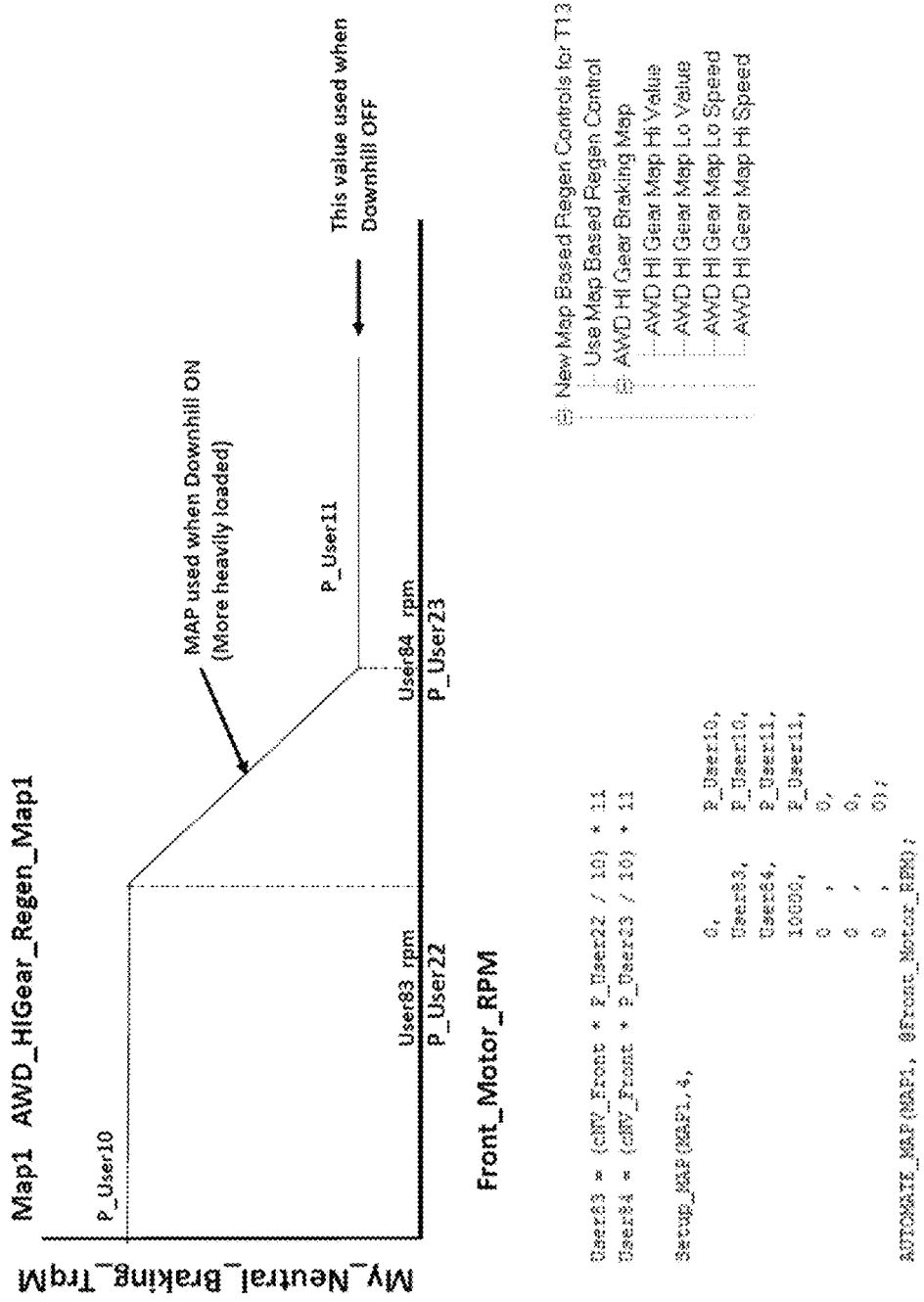
FIG. 23 is a graph related to limiting regenerative braking in a rear motor controller.

Reference is now made to FIG. 22 which summarizes an exemplary method operative to limit regenerative braking in the Rear Controller. Five separate cases are considered:

Reference is also made to FIG. 23 which shows an exemplary method operative to limit regenerative braking in the Rear Controller when the vehicle is operating in an All-Wheel Drive Mode and the 2 Spd Gear is in the High Gear ratio.

Figure 24:
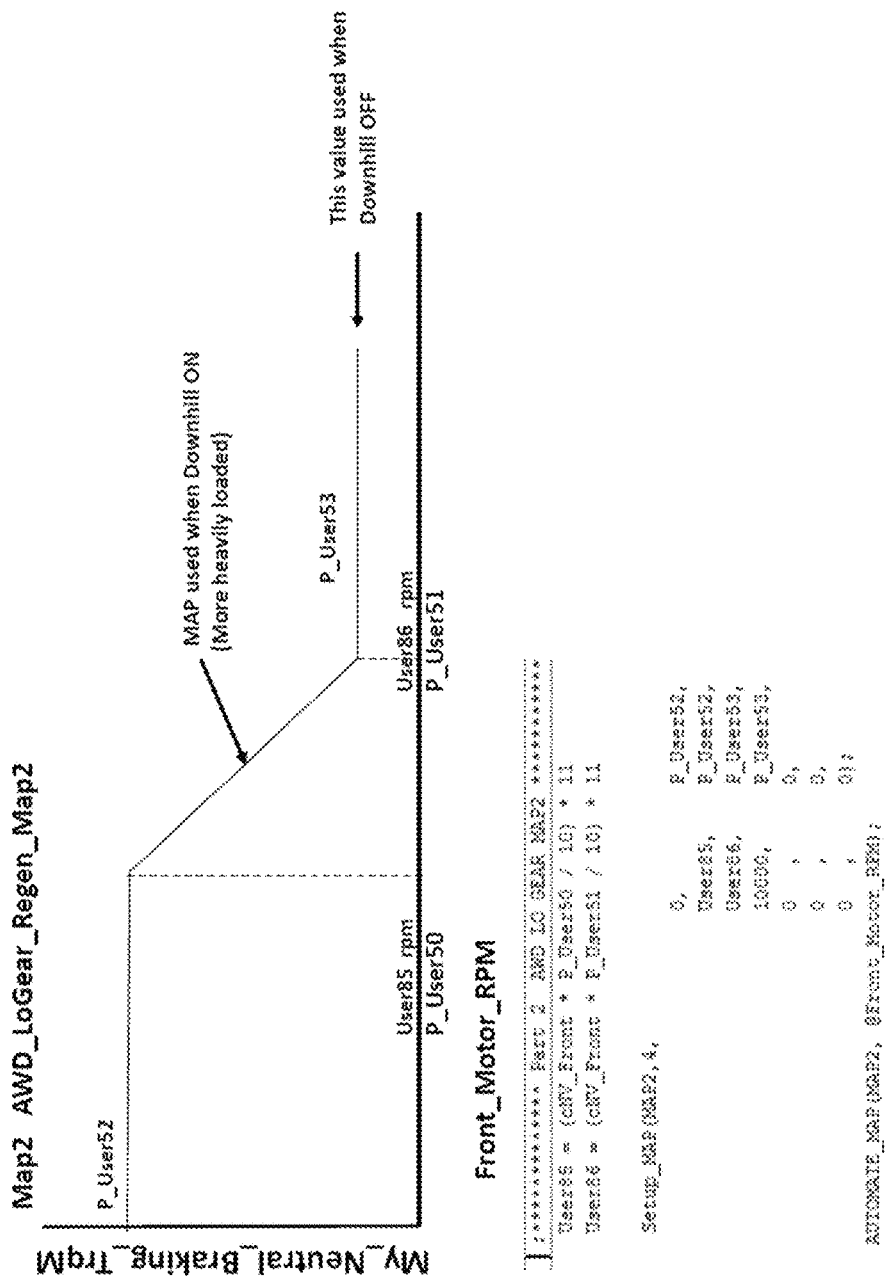
FIG. 24 is a graph related to limiting regenerative braking in a rear motor controller.

Reference is also made to FIG. 24 which shows an exemplary method operative to limit regenerative braking in the Rear Controller when the vehicle is operating in an All-Wheel Drive Mode and the 2 Spd Gear is in the Low Gear ratio.

Figure 25:
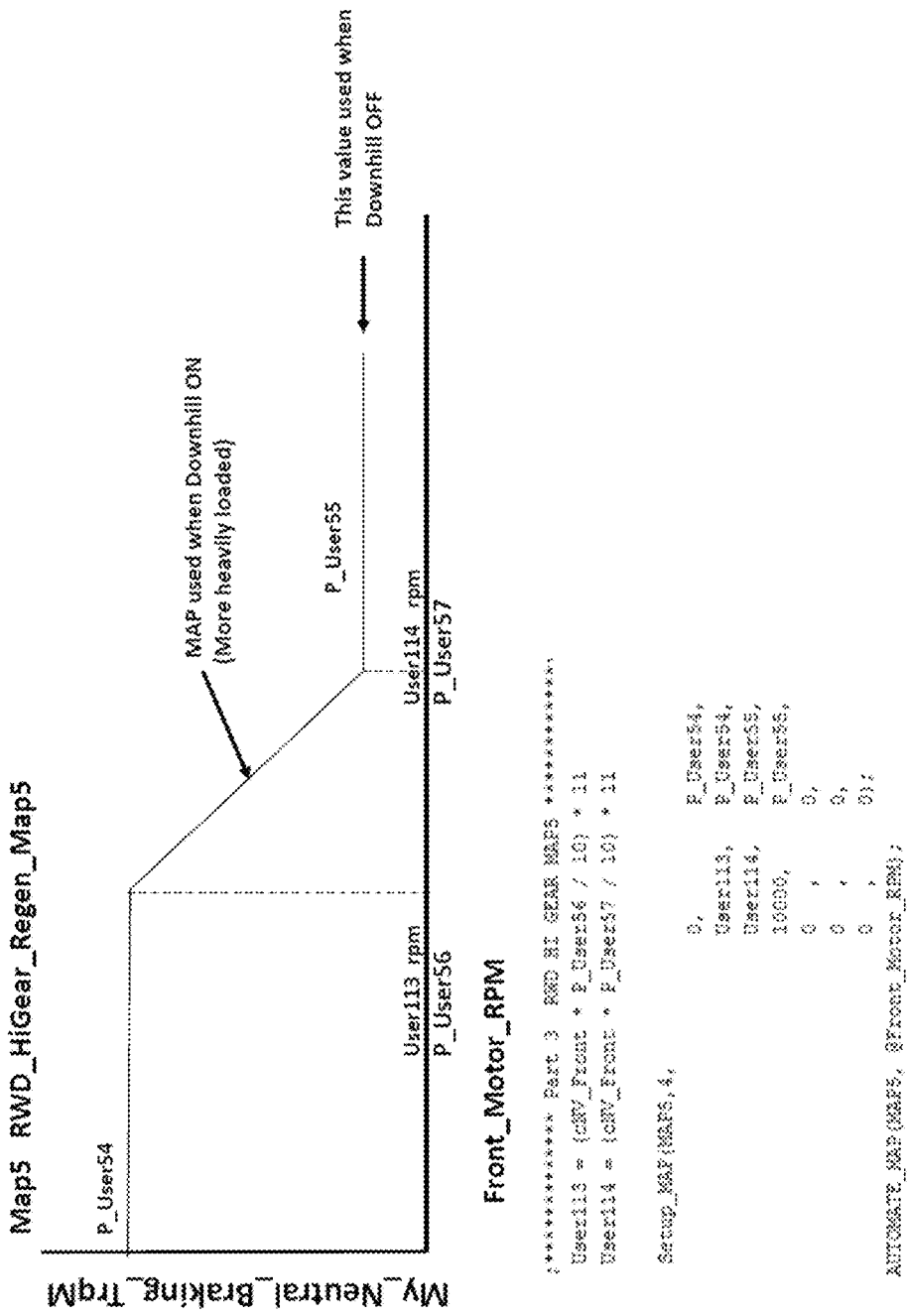
FIG. 25 is a is a graph related to limiting regenerative braking in a rear motor controller.

Reference is also made to FIG. 25 which shows an exemplary method operative to limit regenerative braking in the Rear Controller when the vehicle is operating in a Rear Wheel Drive Mode and the 2 Spd Gear is in the High Gear ratio.

Figure 26:
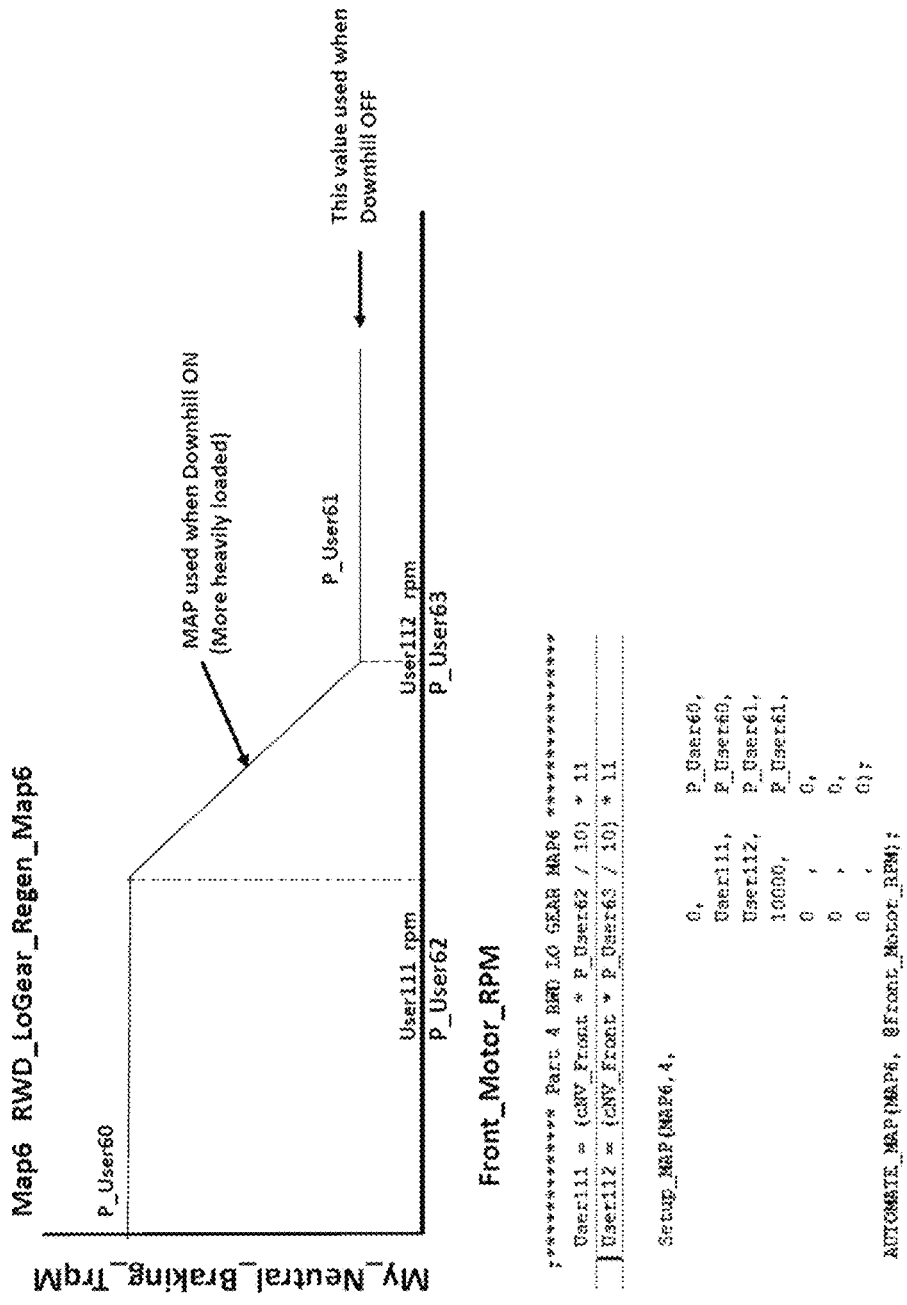
FIG. 26 is a is a graph related to limiting regenerative braking in a rear motor controller.

Reference is also made to FIG. 26 which shows an exemplary method operative to limit regenerative braking in the Rear Controller when the vehicle is operating in a Rear Wheel Drive Mode and the 2 Spd Gear is in the Low Gear ratio.

In each case, the Neutral Braking Torque of the Curtis Vehicle Control Language is dynamically adjusted as a function of vehicle speed as represented by the speed of the Front Motor.

It will be apparent that the techniques described with respect to FIGS. 19-26 are applicable to the Series Hybrid Range Extender for All-Wheel Drive Electric Vehicles and the Parallel Hybrid with CVT vehicles described herein below.

Figure 27:
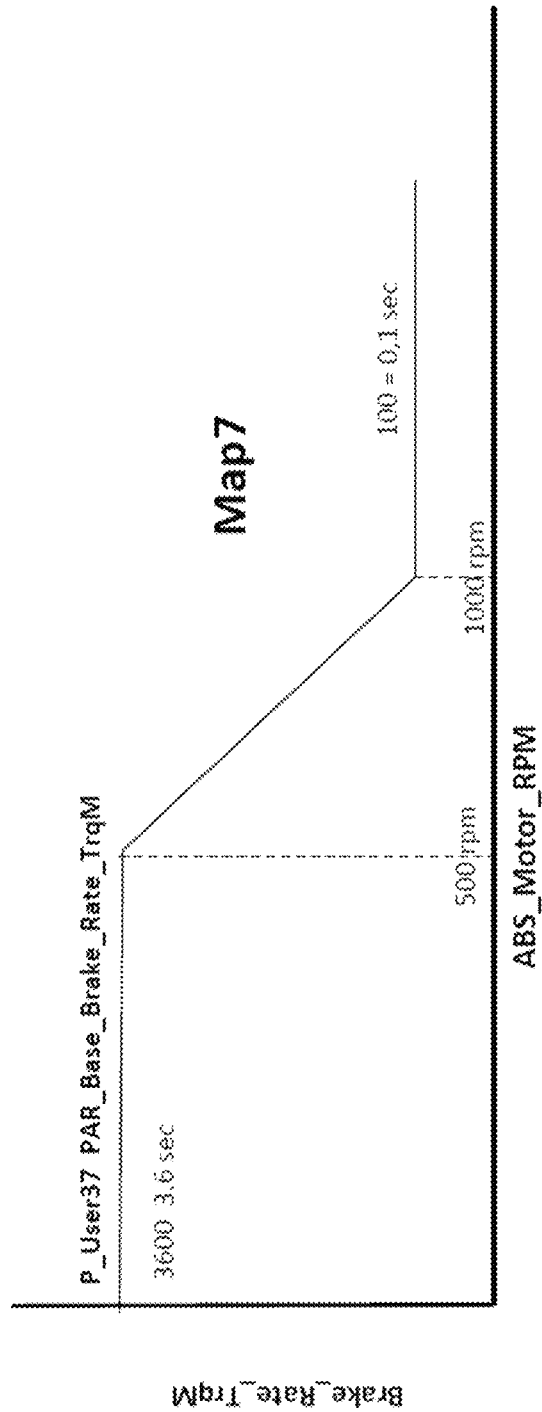
FIG. 27 is a conceptual diagram illustrating adjusting neutral braking torque based on vehicle speed.

Reference is now made to FIG. 27 which shows a method operable to change the maximum rate of increase of regenerative torque in the Front Controller as a function of vehicle speed. This method allows rapid buildup of regenerative braking at moderate and high vehicle speeds while preventing instability at low vehicle speeds.

4. Optimizing Performance of 4WD Electric Drive Vehicles by Equalizing Component Temperatures Another embodiment disclosed herein relates to optimizing performance of 4WD electric drive vehicles by equalizing component temperatures. More particularly, in an all-wheel electric drive system, one of the drive axles inevitably assumes more of the load than the other axle. For example, while climbing a steep grade for extended periods, the rear drive motor and controller may tend to overheat thereby limiting vehicle performance.

The present embodiment provides temperature equalization methods that are operative to automatically adjust the division of power between front and rear axles depending on component temperatures.

This embodiment provides numerous advantages. The advantages of this embodiment include: (1) improving vehicle performance by reducing effects of automatic cutbacks of motor load, and (2) extension of vehicle component life by reducing load on higher temperature components, as some non-limiting examples.

5. Optimizing Electric Vehicle Performance while Preserving Required Range

Another embodiment of this disclosure relates to optimizing electric vehicle performance while preserving a required range.

More particularly, for any electric vehicle, the expected operating range depends on the amount of stored energy remaining in the vehicle energy storage system, the road and terrain conditions that the vehicle must traverse, and the required route including and range for a safe return if desired. Electric vehicles are particularly sensitive to this issue because of the limited energy stored in the vehicle energy storage system; however, but the functions related to this embodiment are applicable to hybrid-electric vehicles as well.

The purpose of the present embodiment is to provide a predictive or look-ahead method that takes into account details of the remainder of the route, including the return if desired, and advises the vehicle operator accordingly.

In a preferred implementation of the present embodiment, means are provided for operating with the Curtis Instruments controllers and a computationally intensive computer (Vehicle Management Unit or VMU) in a co-processor mode. Detailed computations are carried out in the co-processor and the results of these computations are communicated to the Curtis controllers which control the current supplied to the vehicle motors.

In an alternative implementation of the present embodiment, the predictive functions will also comprise means for automatically reducing the current or power drawn from the energy storage system to preserve the amount of energy required to return (e.g., return-to-base in military operations). Similarly, the allowed maximum performance or the vehicle may be enhanced if substantially more energy than expected remains in the battery.

In another alternative implementation of the present embodiment, override means are provided to allow the vehicle operator or a remote controlled operator to apply maximum vehicle propulsion power to escape an unexpected predicament. As soon as the emergency condition is over, the override means can be operative to recalculate the remaining portion of the mission.

In another alternative implementation of the present embodiment, that is applicable to an electric-hybrid vehicle, predictive means are provided for unscheduled charging of the battery if a long uphill region is expected in the near future. Similarly, the battery could be partially depleted if a long downhill region is expected thereby improving overall fuel consumption and remaining range.

This embodiment addresses two problems: (1) the mission profile mapped according to this embodiment has been carefully mapped so the terrain and road conditions of the remaining mission are known or estimated in advance, and (2) details of the terrain and road conditions are not known in advance but the return-to-base location is known. This algorithm requires may use map-based GPS data of the geography and terrain conditions.

The system provides various advantages in that the embodiment (1) automatically provides for maximum instantaneous vehicle performance while ensuring return-to-base capability, and (2) reduces the training level required of the vehicle operator.

6. Optimizing Range of 4WD Electric Vehicles and Hybrid-Electric Vehicles Based on Control Tables This disclosure also describes an embodiment is related to optimizing range of vehicles, such as 4WD electric vehicles, and hybrid-electric vehicles based on control tables.

The performance of complex electric and hybrid-electric drive systems may be optimized by preparing control tables based on, for example, detailed simulation analysis of typical vehicle duty cycles. These control tables may then be downloaded to the Vehicle Management Unit computer (VMU) so that operation of the various power sources (e.g., battery power, or engine and battery power) can be optimized to obtain, for example, maximum range or minimum fuel consumption.

These algorithms often require a VMU with extensive computational capabilities which may be in excess of the capability of the control computers, such as Curtis control computer, used in the vehicles of the present disclosure. As described elsewhere herein, motor controllers (e.g., Curtis controllers) communicate vehicle, battery and motor component data to the VMU. The VMU may also carry out the numerically intensive computation based on the various control tables stored therein and then communicate the best solution to the (e.g., Curtis) controller(s). The controller(s) may then issue appropriate commands to the motors to provide the required power in the most efficient way possible.

This embodiment provides several advantages. As examples, this embodiment enables use of advanced vehicle control techniques while retaining the advantages of the unique functionality of the (e.g., Curtis) motor control unit(s), and (2) reduces the training level of vehicle operators. This embodiment may provide various other advantages as well.

7. Series Hybrid Range Extender for all-Wheel Drive Electric Vehicles

Figure 28:
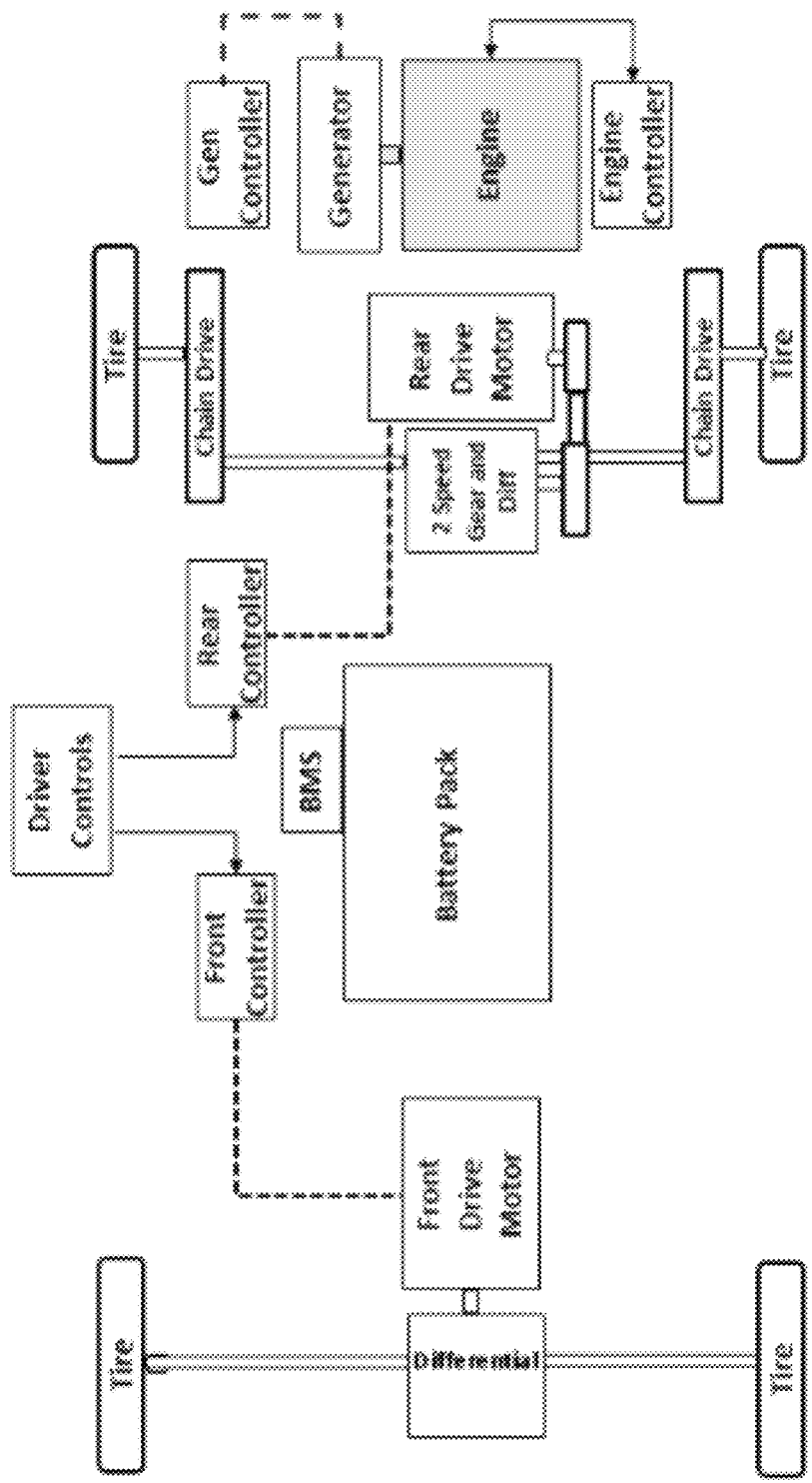
FIG. 28 is a conceptual diagram of a vehicle configuration.

Another embodiment according to this disclosure is related to a series hybrid range extender for all-wheel drive electric vehicles. According to the present embodiment, the all-wheel drive electric vehicle may also comprise an engine, an engine driven generator and a generator controller in a series hybrid architecture to substantially increase the range of the vehicle, as shown in FIG. 28.

In an alternative embodiment of the present invention, the series hybrid also comprises engine control means operable to take advantage of the drivability and energy management features described herein for an all-wheel drive electric vehicle. It is a particular feature of this embodiment that the engine control means can be seamlessly integrated into the control software for the all-wheel drive electric vehicle.

8. Parallel Hybrid Output Power Assist with Improved Performance and Silent Capability Another embodiment of this disclosure related to parallel hybrid output power assist with improved performance and silent capability. This embodiment may comprise sub-embodiments 8.1 and 8.2

8.1 Improved Shift Gradeability in Output Power Split Hybrid Mode

Figure 29:
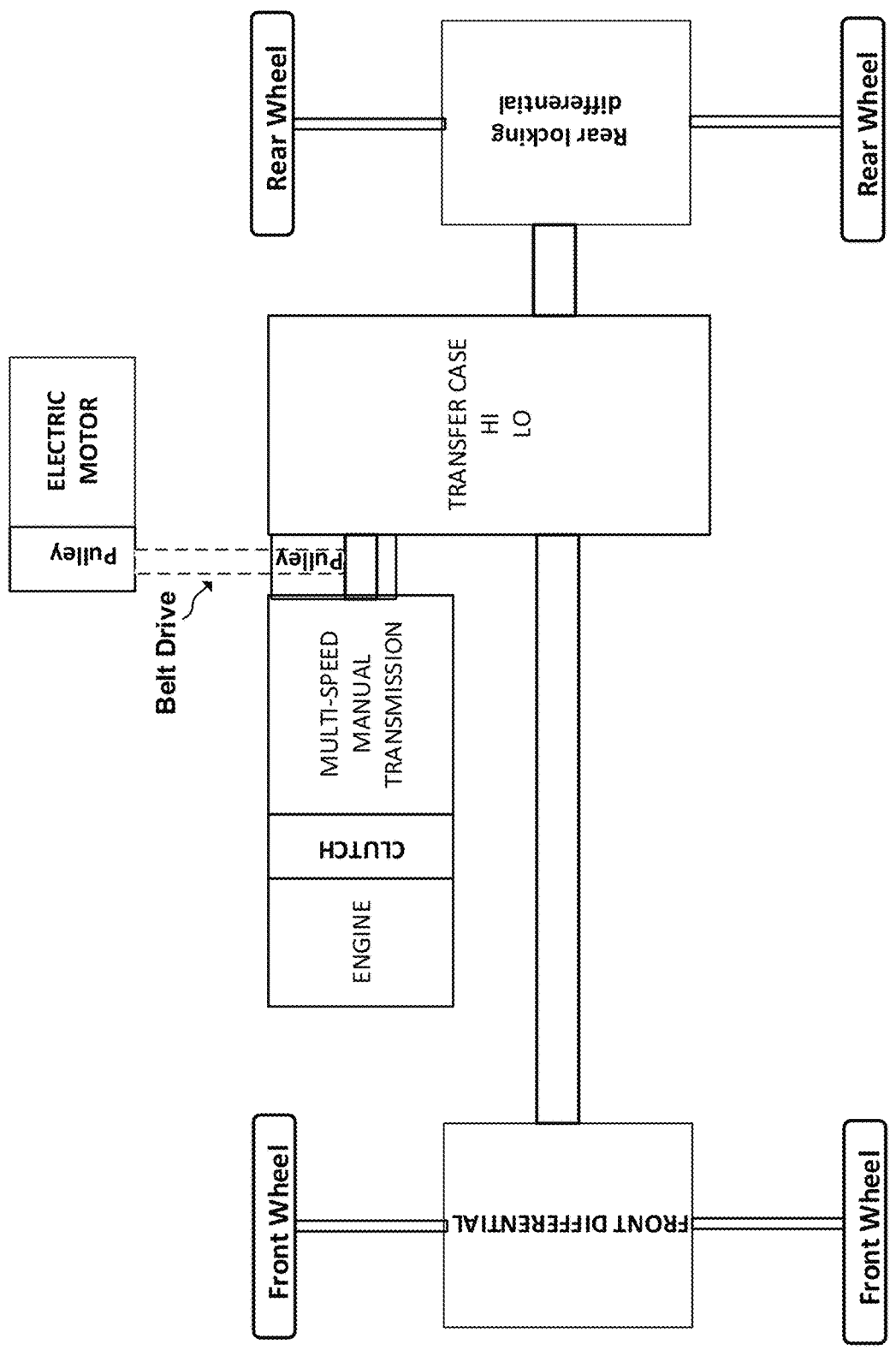
FIG. 29 is a conceptual diagram of a post-transmission hybrid powertrain.
Figure 30:
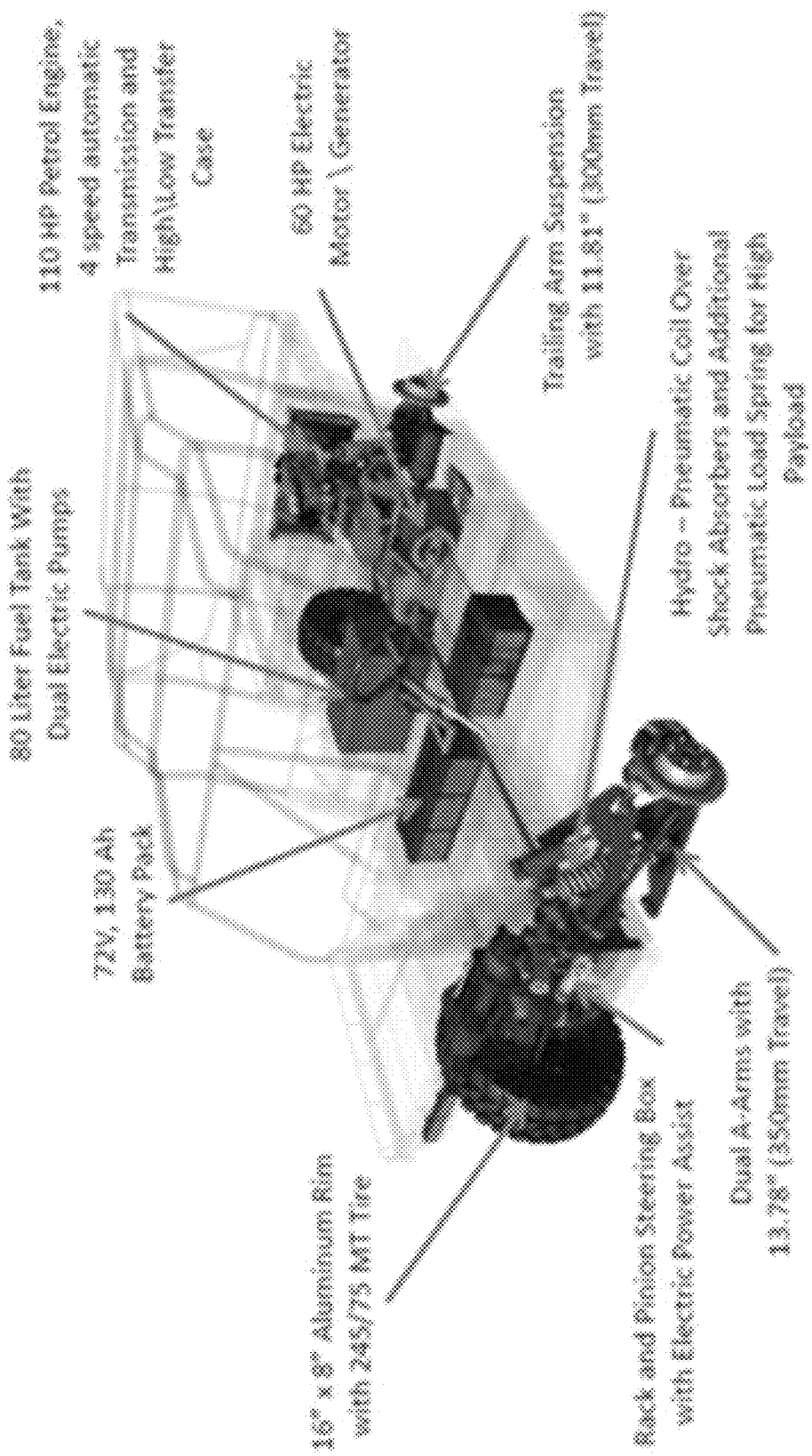
FIG. 30 is a 3-dimensional representation of a powertrain.

This sub-embodiment relates to a hybrid-electric vehicle driven by a conventional combustion engine and an electric drive motor. In such a vehicle, the drive train is may be a post-transmission hybrid powertrain wherein the electric motor is located after the multi-speed transmission. Such a post-transmission hybrid powertrain is illustrated in FIG. 29. The multi-speed transmission may be a manual shifted transmission and where a 2-speed reduction gear is located between the transmission output and the vehicle drive axles.

Various problems are associated with the type of powertrain described with respect to this sub-embodiment. One of the problems associated with such a powertrain occurs during the 1-2 shift on difficult terrain at low vehicle speeds. In such cases, the interruption of torque transfer from the engine to the vehicle may prevent engagement in the 2nd gear without the engine stalling.

The transfer case may use a dog-clutch to engage a "Hi Gear" and a dog-clutch to engage a "Lo Gear." When neither dog clutch is engaged the transfer case is in neutral. This neutral state of the transfer case allows the engine to charge the battery at vehicle standstill in any desired gear and allows the engine to rotate rapidly at standstill to recharge the battery.

One benefit of this embodiment is to provide functions for using the electric motor torque during the gear shift to prevent the vehicle from decelerating during the power interruption of the gear shift. The invention may also be used to allow the engine to recharge the battery during standstill in the most efficient transmission gear.

8.2 Output Power Assist with Combustion Engine and Automatic Transmission

Another sub-embodiment relates to a hybrid electric vehicle driven by a conventional combustion engine and an electric drive motor. The drive train may be a post-transmission hybrid powertrain wherein the electric motor is located after the multi-speed transmission. The multi-speed transmission may be a conventional automatic transmission with a torque converter and a 2-speed reduction gear that is located between the transmission output and the vehicle drive axles. Various flows may be used in various circumstances such as, for example, rough terrain, for silent operation, for use with a hybrid mode that involves battery charging, operation in a "charge in park" mode, and/or various other modes.

In yet another embodiment disclosed herein, the Output Power Assist hybrid powertrain of the present invention wherein the powertrain also comprises a second drive motor and second motor controller may be configured to provide enhanced performance in the hybrid and silent modes of operation.

Figure 31:
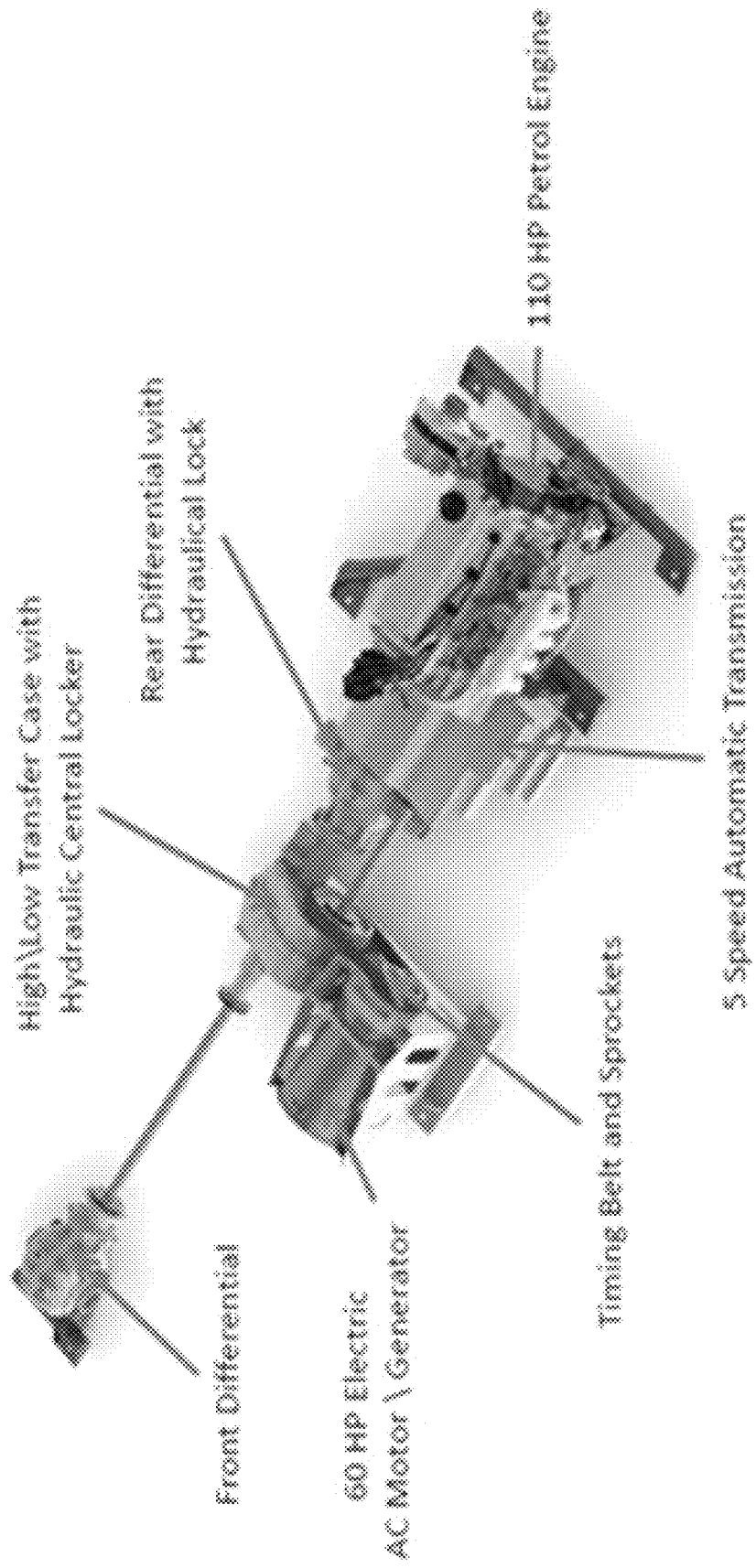
FIG. 31 is a 3-dimensional representation of a powertrain.

The FIG. 31 shows more clearly the major drive line components of the Output Power Assist hybrid powertrain of the present invention.

Figure 32:
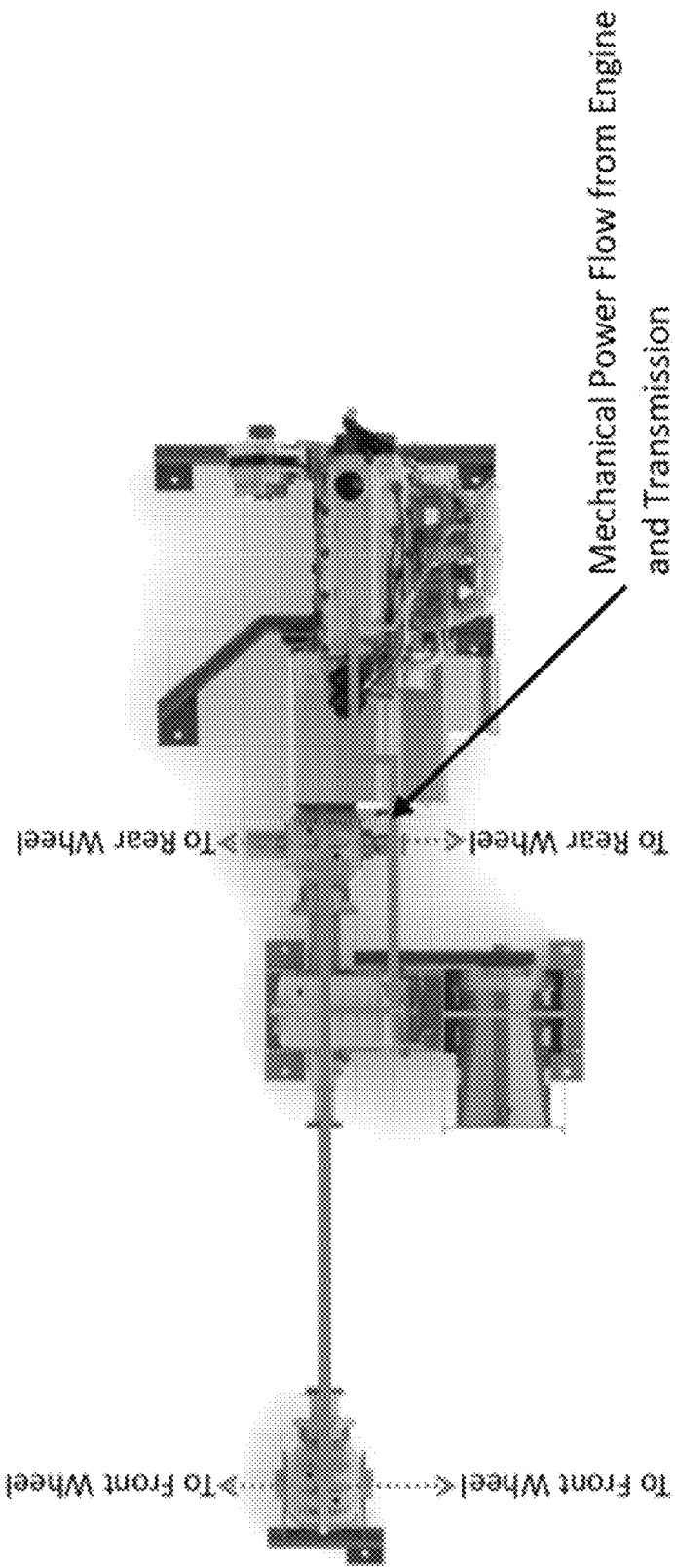
FIG. 32 is a conceptual diagram illustrating an example flow of power in a standard drive operating mode.

FIG. 32 shows the flow of power in a Standard Drive operating mode. In such a mode: (1) power is provided by the internal combustion engine, and (2) the electric motor rotates freely without affecting the output.

Figure 33:
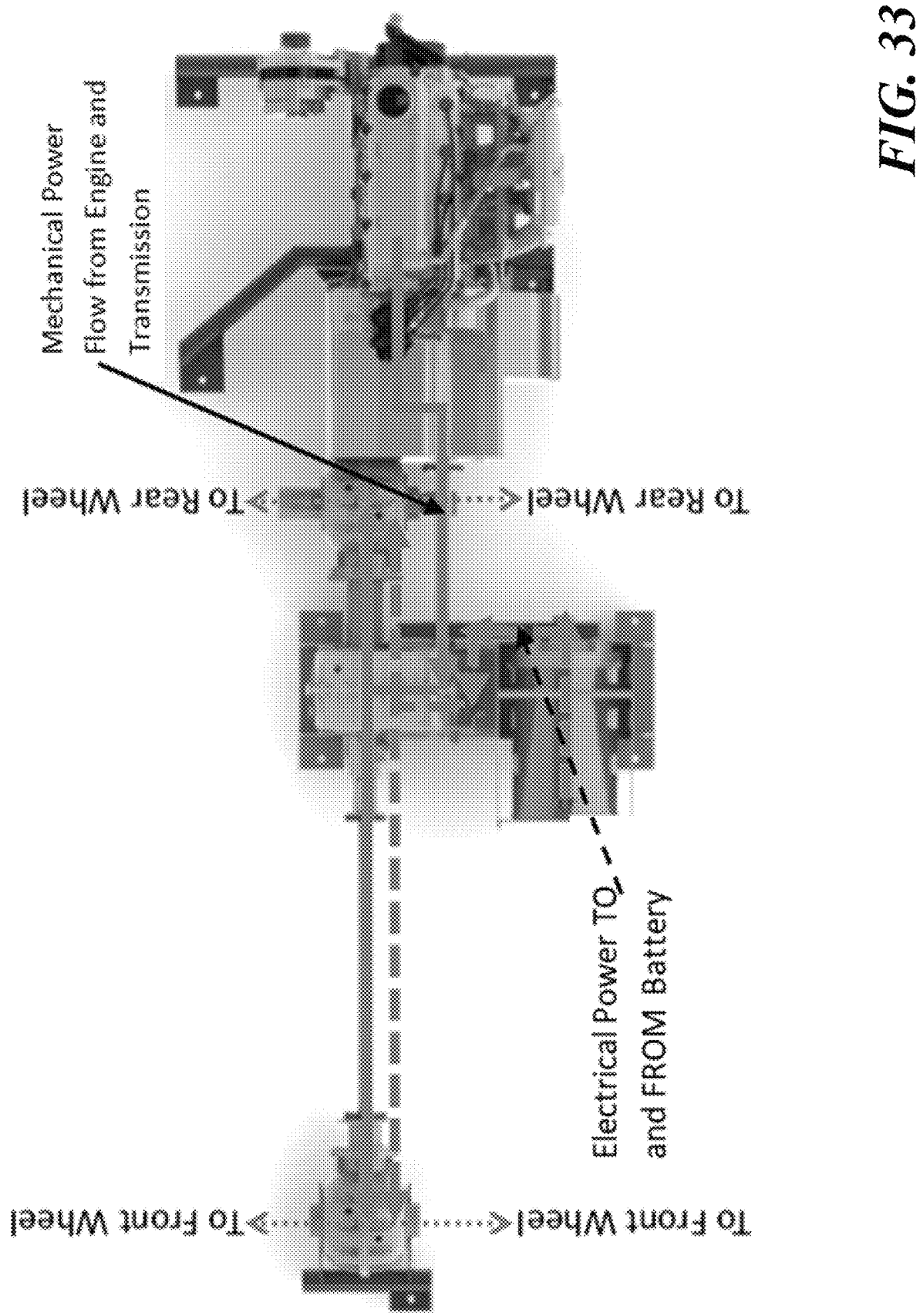
FIG. 33 is a conceptual diagram illustrating an example flow of power in a fuel saver operating mode.

The flow of power in a Fuel Saver operating mode of the present embodiment is shown in FIG. 33. The Fuel Save operating mode may provide several advantages in that the Fuel Saver configuration may: (1) achieve maximum fuel efficiency and range, (2) provide power by the internal combustion engine, and (3) the electric motor adds power at high vehicle load and absorbs power during periods of low driving load to improve efficiency of the engine.

Figure 34:
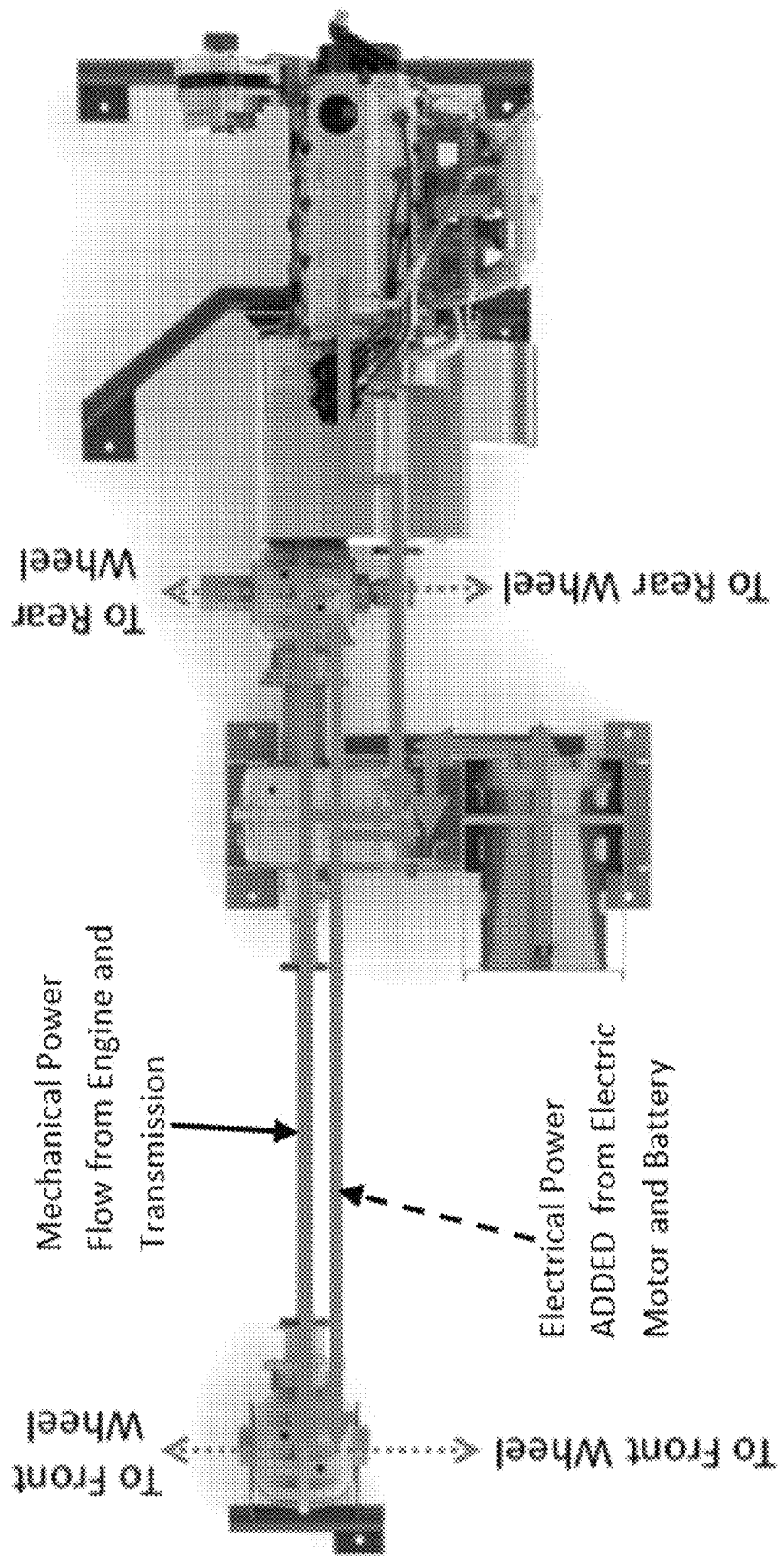
FIG. 34 is a conceptual diagram illustrating an example flow of power in a hybrid combine drive operating mode.
Figure 35:
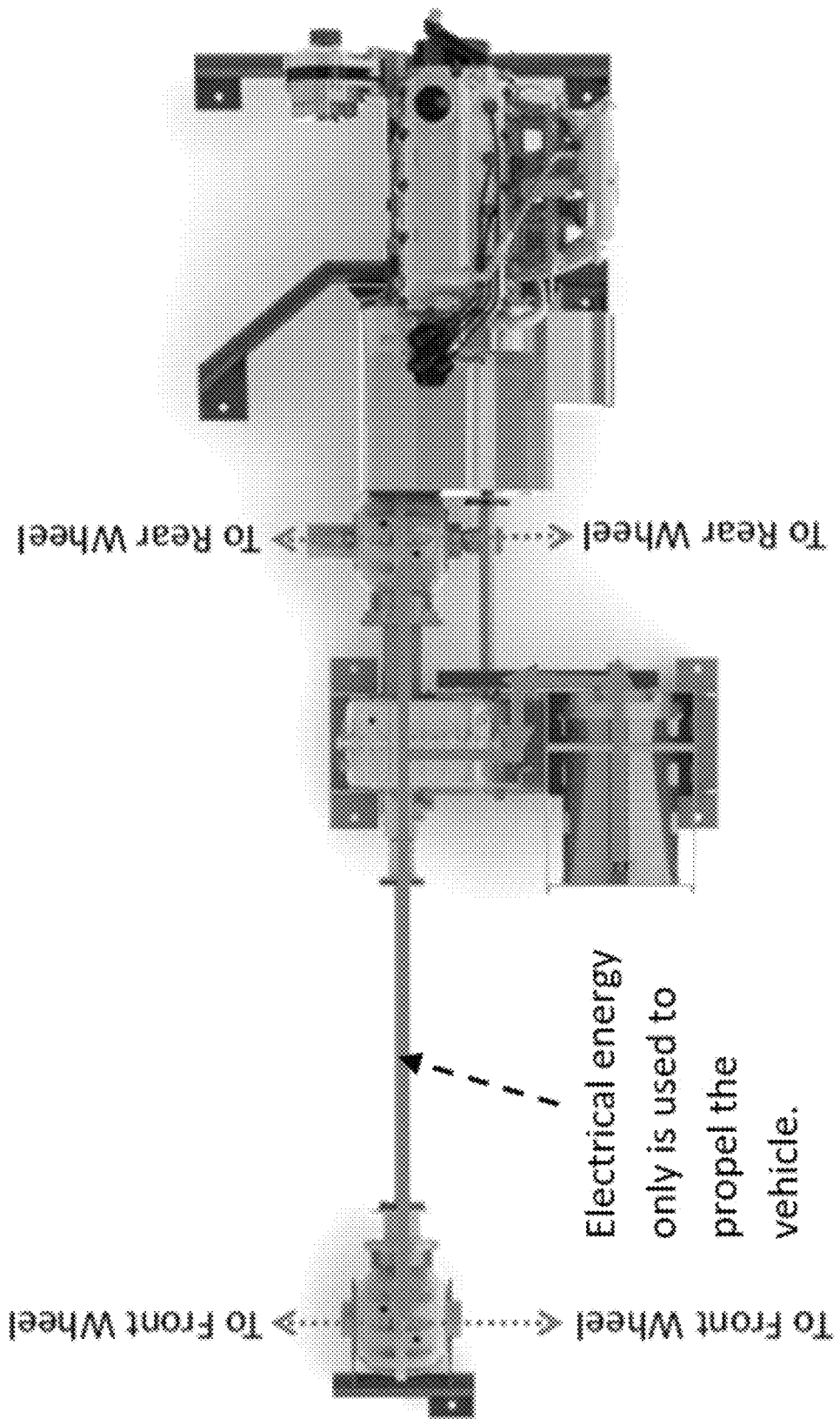
FIG. 35 is a conceptual diagram illustrating an example flow of power in a silent operation mode.

A flow of power in a Hybrid Combined Drive operating mode is shown in the FIG. 34. The Hybrid Combined Drive Mode may: (1) be used when extra power is required for rough terrain, (2) provided power by the internal combustion engine and the electric motor simultaneously, (3) control the electric motor output torque with the motor controller. The electric motor torque output may be adjusted according to the demand for driving power by the vehicle operator. The flow of power in a Silent Mode of operation in shown in the FIG. 35. The Silent Mode is used to achieve silent operation with minimal engine exhaust. Additionally, in while the vehicle is engaged in the Silent Mode, power is provided only by the electric motor and battery. It should be understood that the transmission must be in neutral in the Silent Mode.

Figure 36:
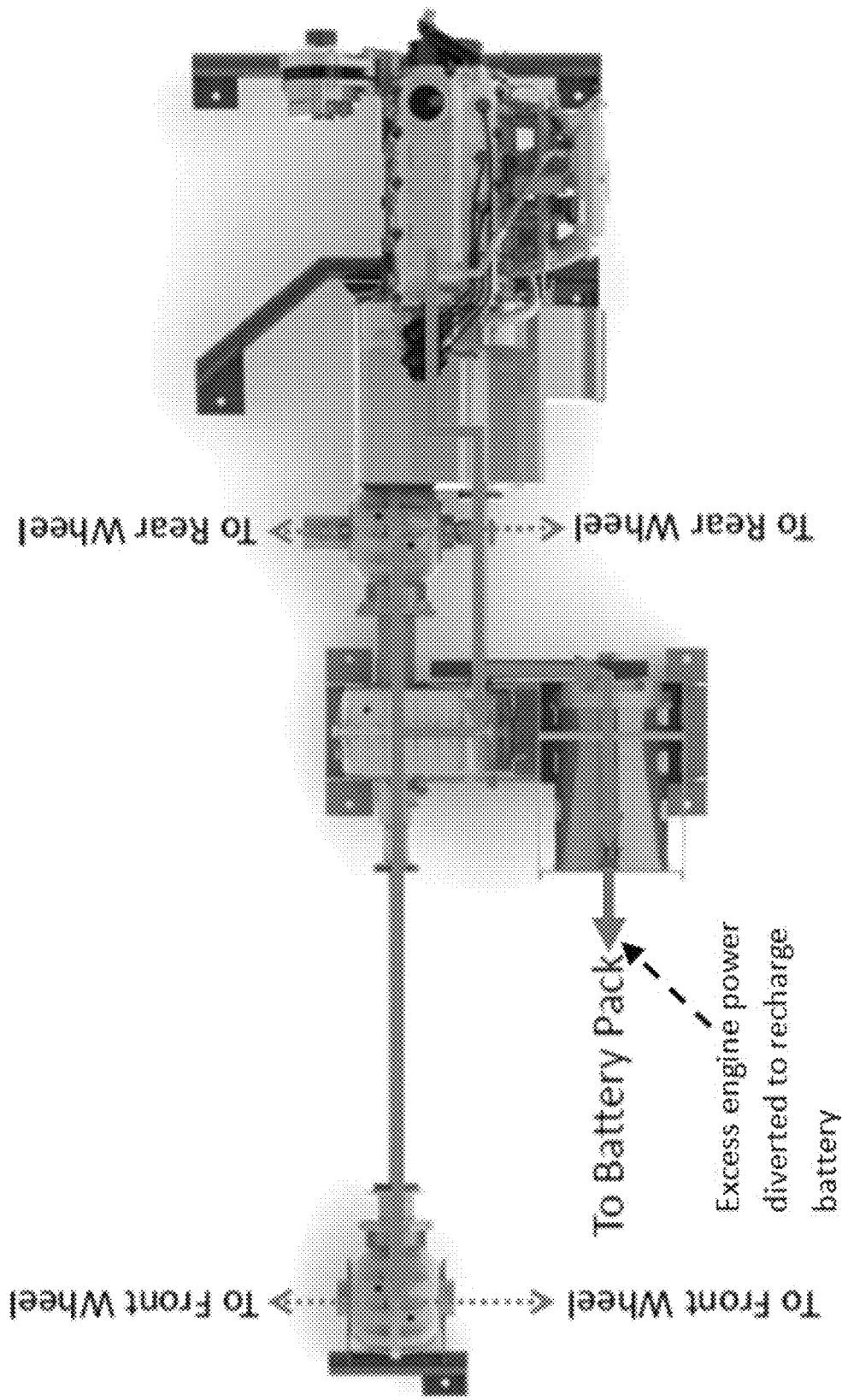
FIG. 36 is a conceptual diagram illustrating an example flow of power in a hybrid mode.

The flow of power in a Hybrid Mode w/Battery Charging operating mode is shown in FIG. 36. The Hybrid Mode is used to charge the vehicle's batteries while driving. In the Hybrid Mode, power is provided by the internal combustion engine to drive the vehicle and the electric motor. Further, in the Hybrid mode, the electric motor acts as a generator and charges the battery pack.

Figure 37:
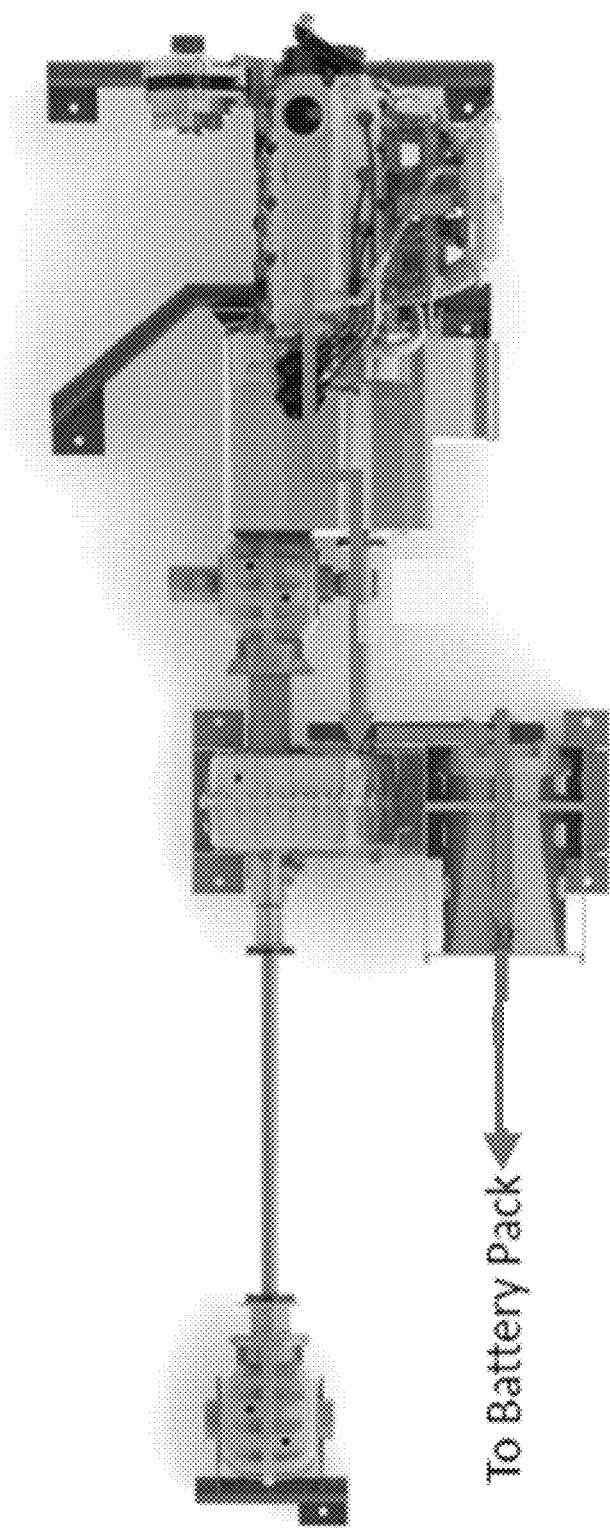
FIG. 37 is a conceptual diagram illustrating an example flow of power in a charge in park operating mode.

The flow of power in a Charge in Park operating mode is shown in FIG. 37. This mode is used to charge the batteries while vehicle is stationary. In the Charge in Park mode, power is provided by the internal combustion engine to drive the electric motor. The Electric Motor acts as a generator and charges the battery pack while the vehicle is in the Charge in Park mode. It should be understood that the transfer case must be in neural and the transmission engaged in the Charge in Park mode.

Figure 38:
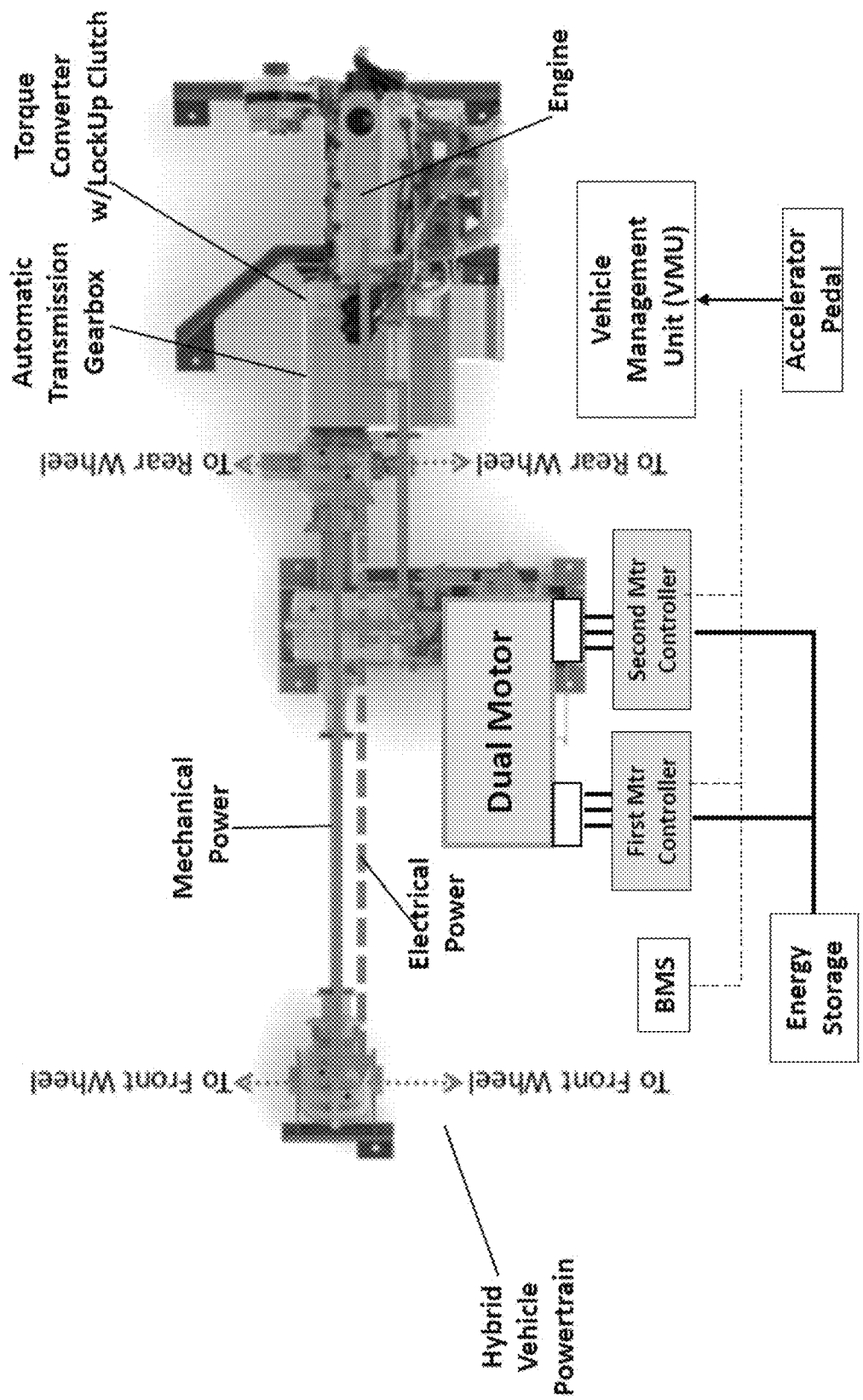
FIG. 38 is a conceptual diagram of an output power assist hybrid powertrain.

Reference is now made to FIG. 38 which shows a preferred embodiment of the Output Power Assist hybrid powertrain of the present invention wherein the powertrain also comprises a second drive motor and second motor controller to provide enhanced performance in the hybrid and silent modes of operation.

Also in accordance with an implementation of the present embodiment, the hybrid vehicle powertrain also comprises a Vehicle Management Unit (VMU) which coordinates operation of all aspects of the conventional drive components.

Also in accordance with an implementation of the present embodiment, the hybrid vehicle powertrain also comprises an Energy Storage system with sufficient energy storage and power capacity to propel the vehicle with electrical energy only in a battery only or silent mode of operation and to assist the power delivered by the engine to enhance the maximum performance capability of the vehicle.

In accordance with yet another preferred embodiment of the invention, the Energy Storage system may comprise a battery and supercapacitor.

Figure 39:
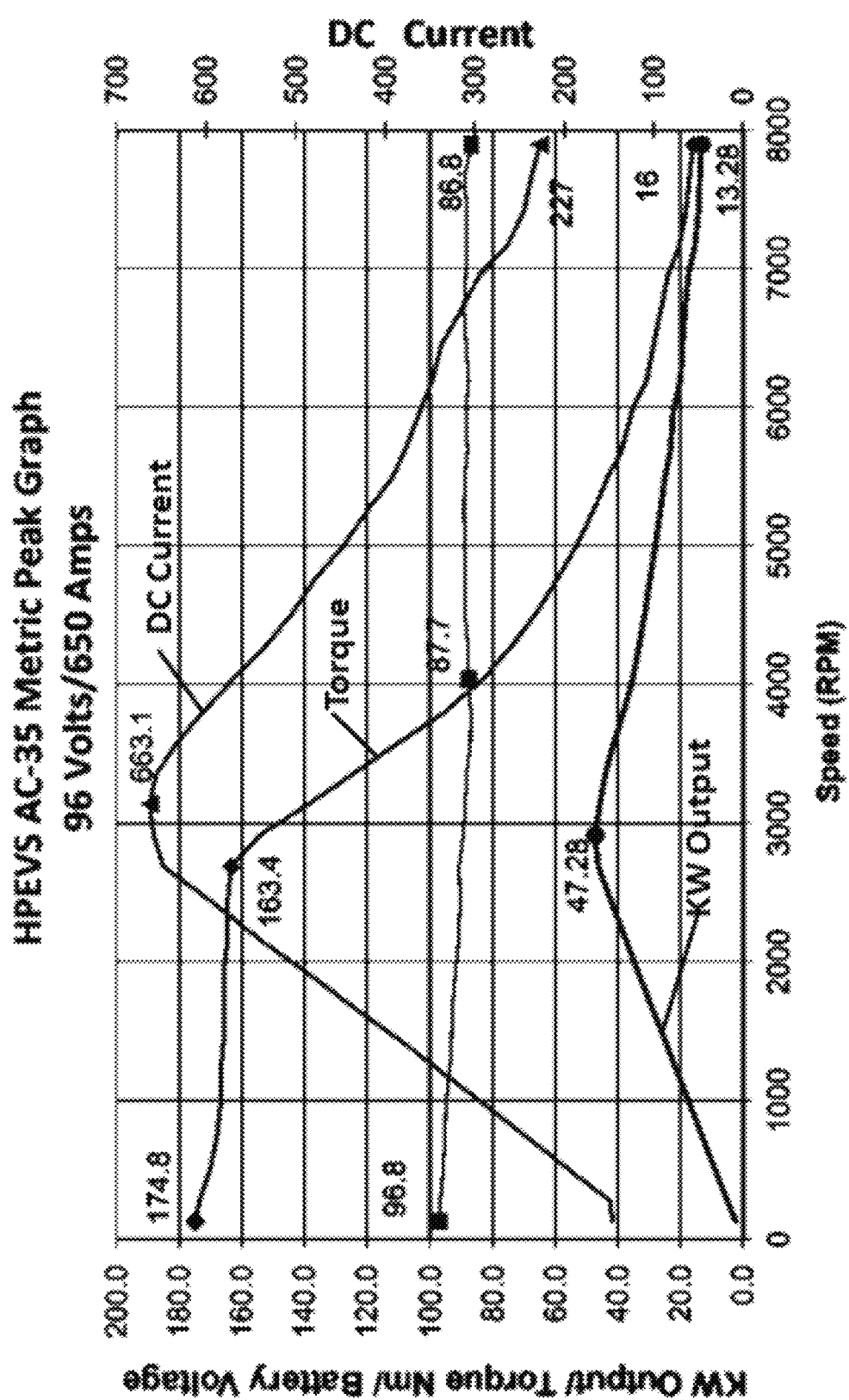
FIG. 39 is a conceptual diagram of performance curves of a motor/generator.

The performance curves of a typical motor/generator are shown in the drawing below, corresponding to FIG. 39. The performance characteristics shown are for a single unit of the motor. It will be understood that the Dual Motor system is capable of providing twice the torque and power and consume twice the battery DC as shown in FIG. 39.

Various control means of the present embodiment are also described herein. The control means may: (1) provide full torque from both motors at low motor speeds until the peak discharge current limit (DCL) from the BMS is reached, (2) Reduce the torque from both motors to prevent excessive battery discharge current, (3) control the current provided by each of the drive motors so as to minimize the overall losses of each motor thereby reducing the current provided by the batteries. Additionally, the control means may comprise: (1) first override means to reduce the motor torque by limiting motor speeds and field weakening in the event of a message from the BMS and (2) second override means to ignore all warnings and messages and to record each event and length of time of occurrence in the memory of the controllers. The control means may control the torque provided by both motors to favorably affect the transmission shift schedule and the torque converter clutch lock up schedule.

Figure 40:
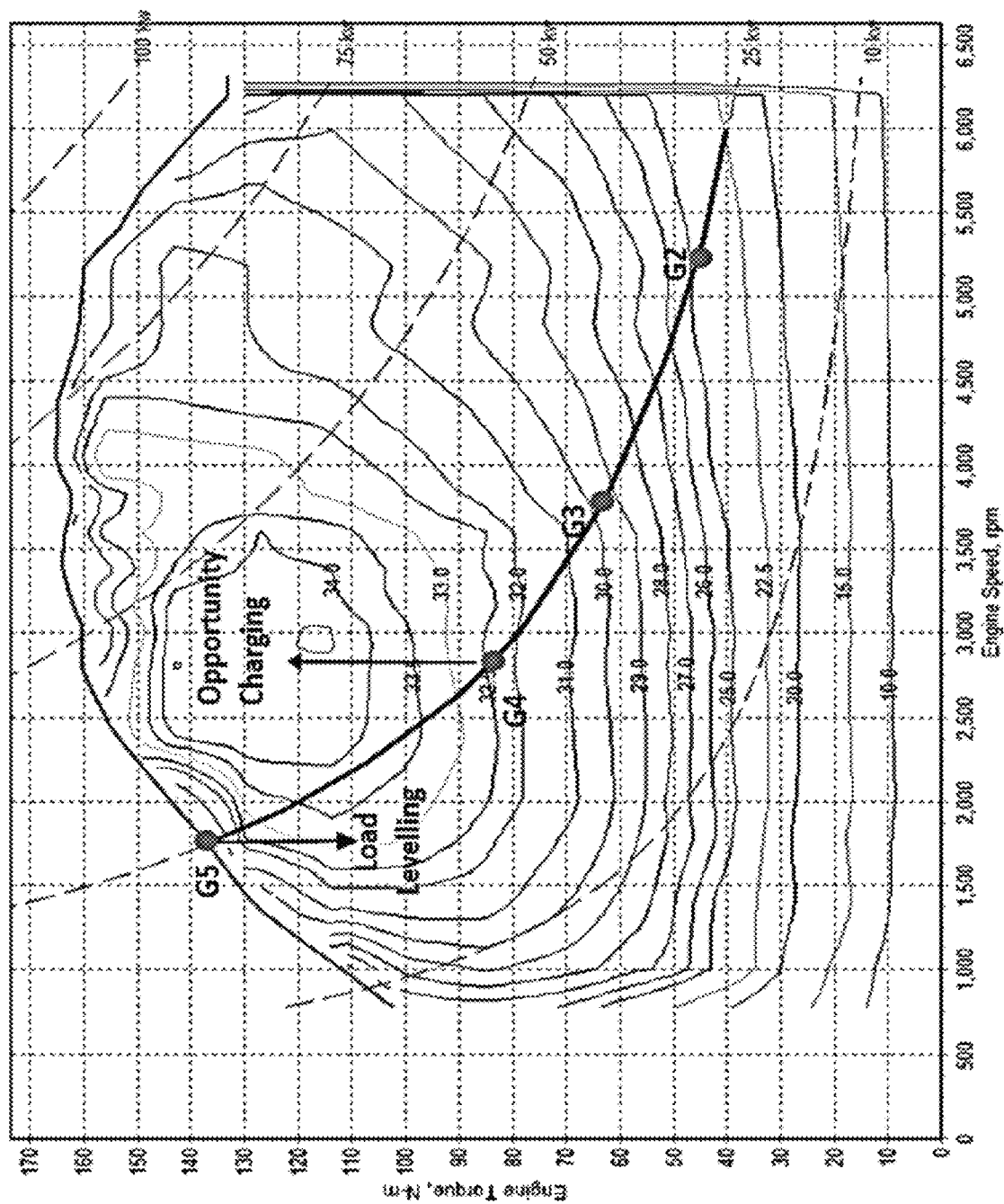
FIG. 40 is a conceptual diagram of a fuel map.

Referring now to FIG. 40, there is shown a fuel map of a typical gasoline engine. The vertical axis shows engine shaft torque and the horizontal axis represents the speed of the engine. The dashed lines represent curves of constant power and the contour curves show loci of constant engine efficiency.

Assume for the purpose of example that the current road load and driver commands are such that 25 kw at the transmission output shaft are required to propel the vehicle. Assume further that the vehicle is equipped with a 5-speed transmission so that 5 different engine operating points may be selected at each vehicle speed. For the sake of clarity in this description, it is assumed that the transmission efficiency and vehicle accessory loads are the same in each transmission gear.

The 25 kw of power required by the vehicle may be provided at a relatively high engine speed at point G2 representing 2nd gear. At this point the efficiency of the engine is about 25%. The required 25 kw can also be provided if the transmission is in 3rd gear (G3) wherein the engine operates at a more favorable operating point with an efficiency is about 29.5%.

It will be apparent that the best operating point of the engine will be in 4th gear (G4) wherein the engine efficiency is about 32.5%. This represents the highest engine efficiency that can provide 25 kw to the transmission output shaft.

If, however, the load (torque) on the engine were increased for example to about 120 N-m, the engine efficiency would increase to about 35%. The engine loading can be increased without affecting the vehicle speed by causing the motor to act as a generator. The electrical output generator is used to recharge the battery. The extra energy that is stored in the battery may be used at a later time to allow the engine to provide less power than would normally be used to propel the vehicle thereby saving fuel.

This type of operation is often termed Opportunity Charging because advantage is taken of the opportunity to improve the overall operating efficiency of the vehicle. Opportunity Charging is a well-known method of improving fuel consumption and requires a relatively sophisticated vehicle control computer.

In a preferred implementation of the present embodiment, indirect engine control means are provided to favorably affect the transmission shift schedule and torque converter lock-up clutch schedule by controlling the armature current of at least one of the electric drive motors.

It is also purpose of the present invention to provide advanced fuel saving techniques that are implemented using the relatively limited computing capability of Curtis Motor Controllers.

Referring again to FIG. 38 which shows the main powertrain components of the hybrid vehicle powertrain.

The TCC Lockup Schedule, the Transmission Gear Shift Schedule and all of the electronic and software controls required to operate the engine are implemented in the Vehicle Management Unit (VMU) which is operative to control all aspects of vehicle operation.

Figure 41:
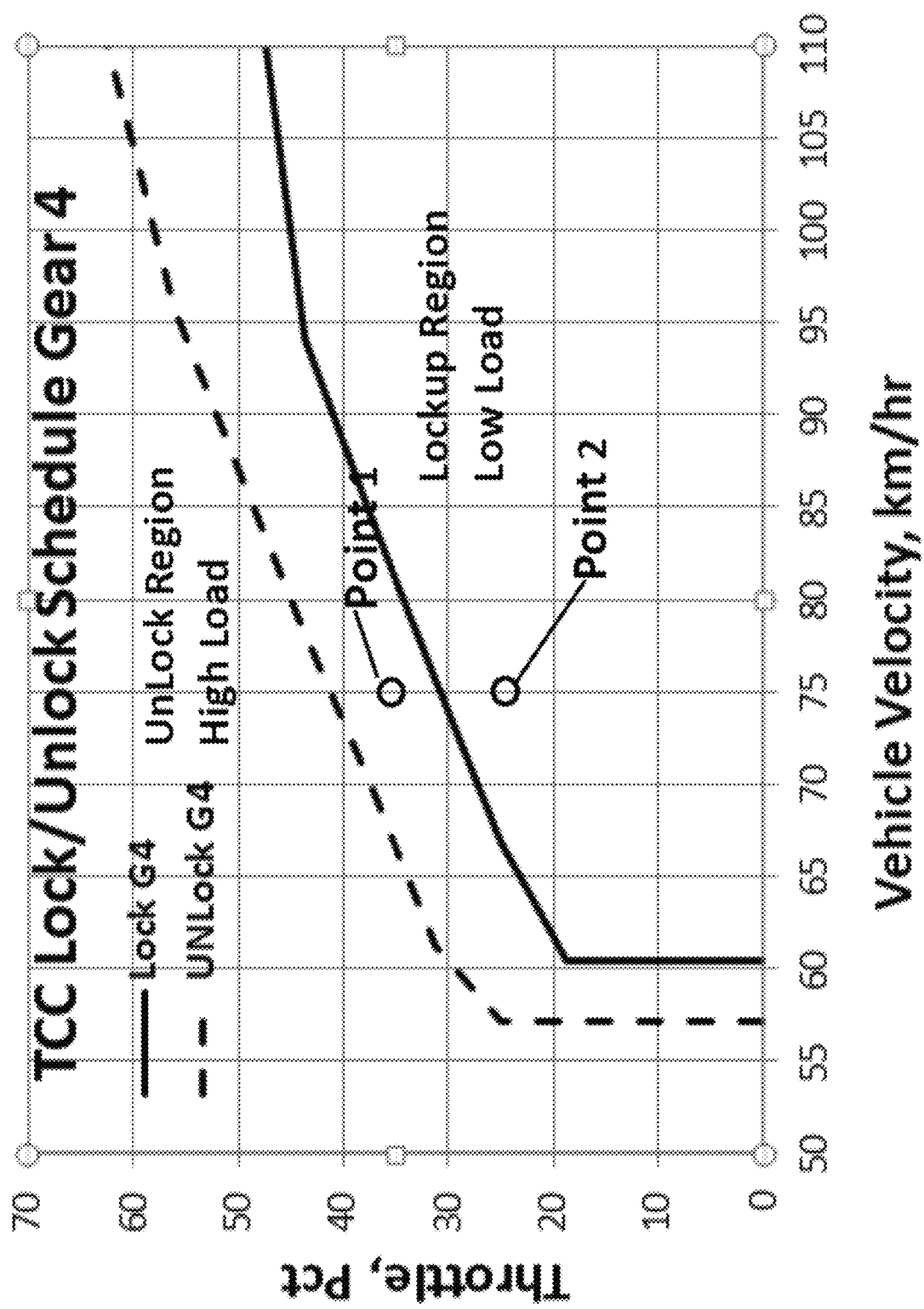
FIG. 41 is a conceptual diagram of an example torque converter clutch lockup schedule.

Reference is also made to FIG. 41 which shows an exemplary torque converter clutch (TCC) lockup schedule.

The region below and to the right of the solid curve in FIG. 41 represents the Lockup Region, a region of relatively low engine load, wherein the vehicle requirements can be met with the TCC locked, thereby avoiding the losses associated with hydrodynamic operation of the torque converter. Similarly, the region above the dashed curve represents the Unlocked Region, a region of relatively high engine load, wherein higher available engine torque and torque multiplication of the torque converter allows the instantaneous vehicle performance requirement to be met. It will also be apparent to one normally skilled in the art that the region between the solid Lockup curve and the dashed Unlock curve is provided for hysteresis between the locked and unlocked torque converter clutch state.

As is well known by one normally skilled in the art, the lockup schedule is calibrated by the vehicle manufacturer to achieve a compromise between vehicle performance and fuel consumption in all gears and different lockup schedules are provided for each transmission gear.

The lockup schedule is often calibrated in terms of vehicle speed and the Throttle Pct. The percent throttle in turn is substantially proportional to the position of the accelerator pedal. As used herein, if the Pct (percent) Throttle is 0%, the engine generates substantially zero useful torque. If the Pct Throttle is 100%, the engine produces maximum torque at the current speed of the engine.

Continuing with the example of FIG. 41, the vehicle is operating in transmission gear 4 at Point 1 at 75 km/hr with the TCC open. The terrain conditions are such the engine is operating at a throttle of about 35% and the vehicle operator desires to maintain the vehicle speed at a constant 75 kph. The TCC is operating in the hydrodynamic range and the efficiency of the torque converter may typically be in the range of 75% to 85%.

In an implementation of the present embodiment, TCC control means are provided which are operable to increase the RMS Current of at least one of the drive motors to provide sufficient electrical torque so that the vehicle can be maintained at 75 kph with an engine throttle pct of about 25% (Point 2).

It will be apparent that the engine throttle pct is now below the solid Lockup Region curve for Gear 4, and the VMU will be operative to command the TCC to lock establishing thereby a mechanical connection between the engine output shaft and the transmission range pack. The efficiency of the torque converter will now be substantially 100%.

It will also be apparent that the power required to provide the increased RMS current comes from the energy storage system.

Figure 42:
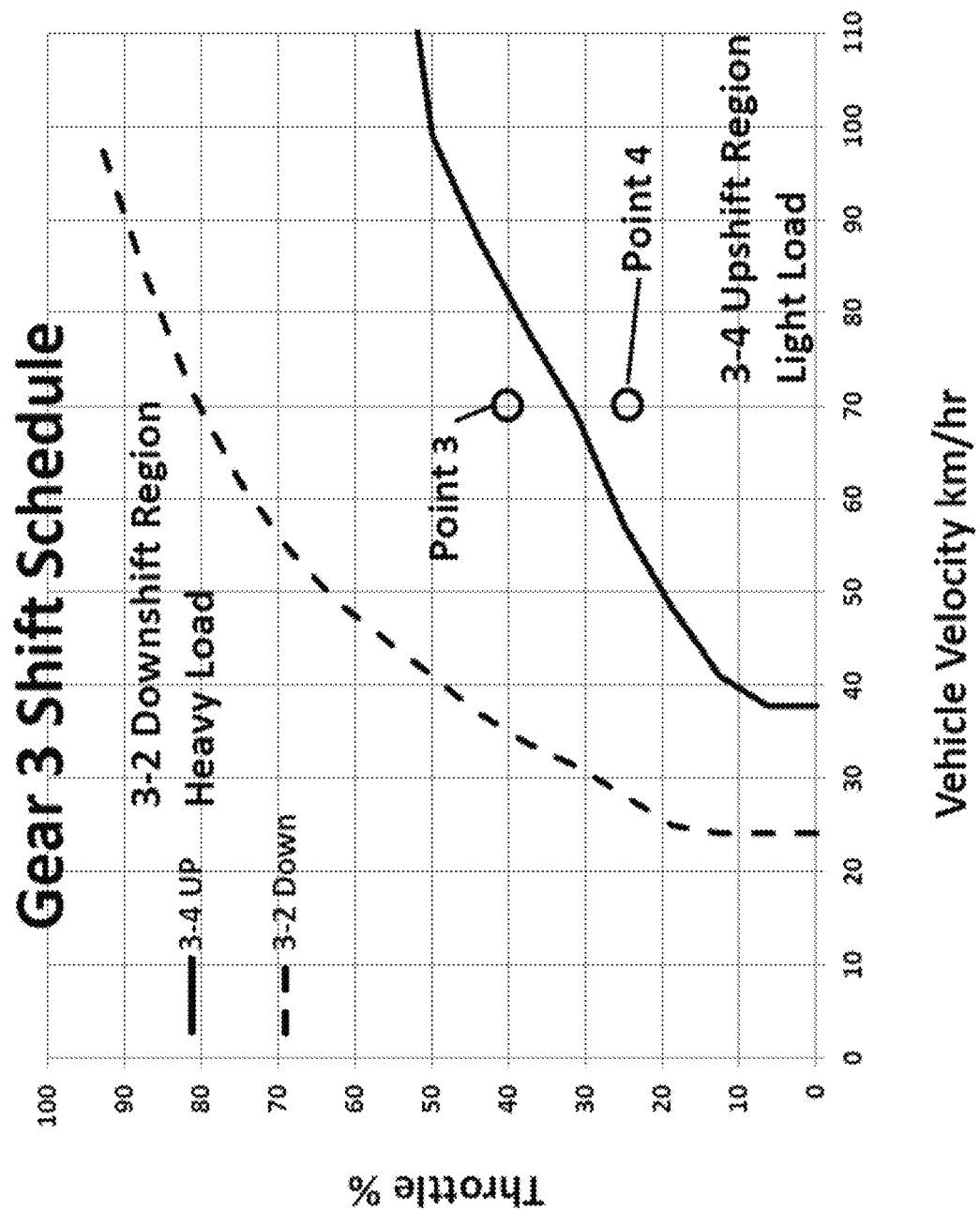
FIG. 42 is a conceptual diagram of an example transmission gear shift schedule.

Reference is now made to the FIG. 42 showing an exemplary transmission gear shift schedule of the Automatic Transmission Gearbox of the Hybrid Vehicle Powertrain of FIG. 38 wherein the gear shift schedule in FIG. 42 is implemented when the Automatic Transmission Gearbox is operating in Gear 3.

The region below and to the right of the solid curve in FIG. 42 represents a region of relatively light engine loading wherein the automatic transmission gearbox can operate in the 4th gear ratio in the indicated vehicle velocity range above about 38 km/hr thereby allowing the engine to operate in a favorable region at high efficiency.

The region above the dashed curve represents a region of heavy engine loading characterized by high accelerator pedal depression and consequent high engine torque. This region is commonly called the 'kickdown' region which results in a downshift to Gear 2 to provide a rapid increase in engine power and vehicle performance.

It will be apparent to one normally skilled in the art that the region between the 3-4 Upshift Region and the 2-3 Downshift Region is provided for hysteresis between the gear shifts to prevent rapid and frequent gear shifts.

Continuing with the example of FIG. 42, the vehicle is operating at Point 3 at 70 km/hr. The terrain conditions are such that the engine operates at a throttle of 40% and the vehicle operator desires to maintain the vehicle speed at a constant value of 70 km/hr.

In an embodiment of the present invention, transmission control means are provided that are operable to increase the RMS current of at least one of the motor controllers to provide sufficient torque from at least one of the drive motors so that the vehicle can be maintained at 70 kph with an engine throttle of only 25% (Point 4).

It will be apparent that the engine throttle pct is now below the solid 3-4 Upshift curve and the VMU will be operative to command a shift from Gear 3 to Gear 4, thereby improving engine efficiency.

It will also be apparent that the power required to provide the increased RMS current comes from the energy storage system.

It will also be apparent to one normally skilled in the art that once the transmission has shifted into Gear 4, the VMU will keep the transmission in Gear 4 until there is a substantial increase in the demand for additional propulsion power.

In yet another implementation of the present embodiment, the transmission and torque converter clutch sensor means comprises vehicle CANbus reading means operable to read the transmission gear ratio and torque converter clutch status.

In still another implementation of the present embodiment, the transmission and torque converter clutch sensor means comprises pressure switch means operable to provide information to the transmission control means regarding the operating state of the transmission gear and the torque converter clutch status.

In yet another implementation of the present embodiment, mode control means are provided that are operable to favor high vehicle performance at the expense of fuel consumption by judiciously providing short bursts of power from the energy storage system to cause the VMU to unlock the torque converter lockup clutch and/or downshift the transmission to a lower gear.

9. Generalized Control for Electric or Hybrid Vehicles with Multiple Sources of Energy Additional embodiments relate to a generalized Energy Management System for an electric vehicle drive train with a Range Extender. The Range Extender may comprise a multiplicity of energy sources in addition to the vehicle's main battery.

Figure 43:
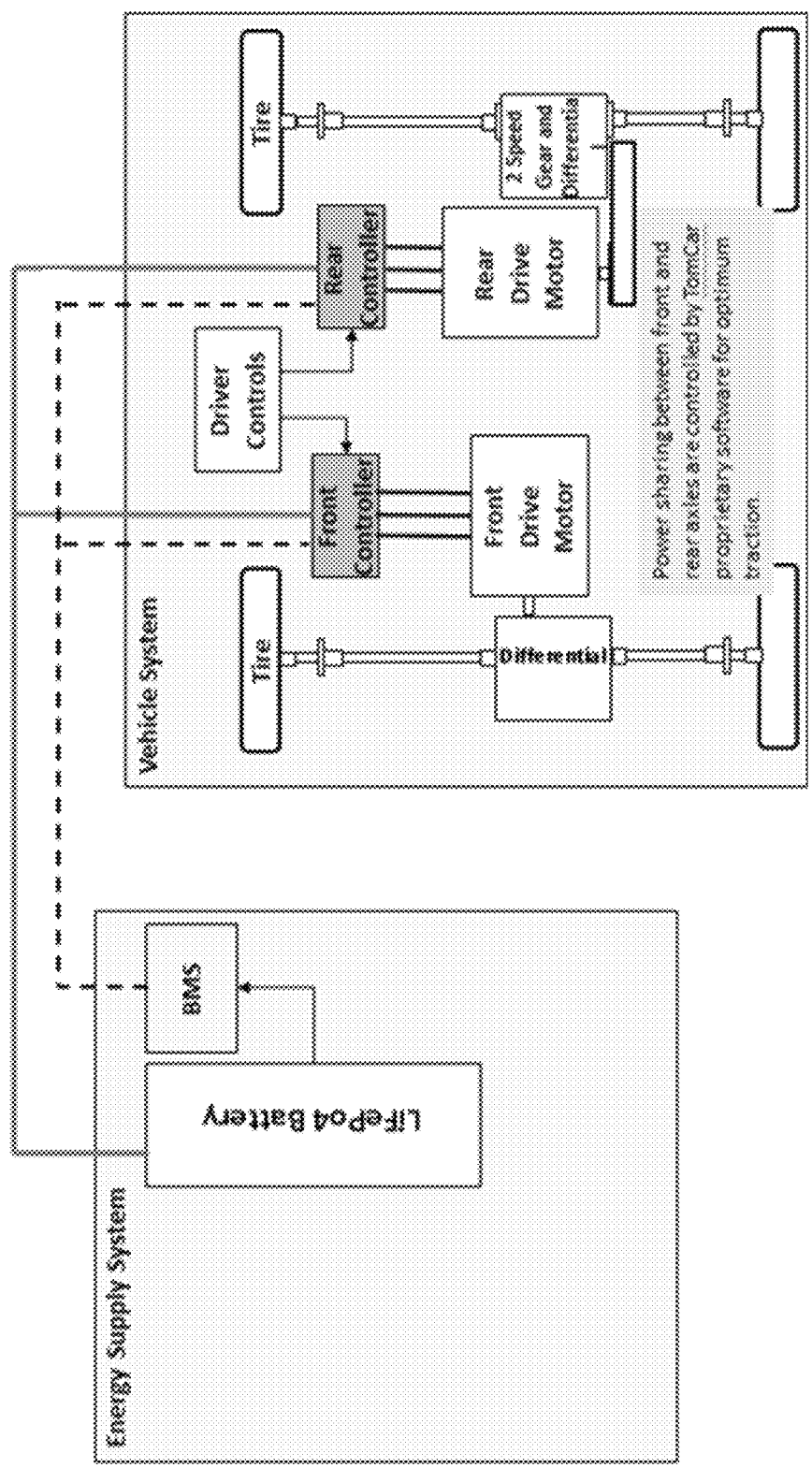
FIG. 43 is a conceptual diagram of a vehicle configuration.

FIG. 43 shows in block diagram form the main physical components of a 2-Motor 4WD electric vehicle to which the present embodiment may apply. It is appreciated that this block diagram is exemplary only and that various modifications may be made. The Energy Supply System of this embodiment comprises a conventional battery and a conventional Battery Management System.

The Front and Rear Controllers are computers and 3φ AC Induction Motor Controllers. These controllers are programmed with proprietary software that allows the vehicle to be driven in response to driver commands and thermal and electrical limitations of electric components. The software implements traction control, divides the front/rear power for optimum performance, and responds to restrictions suggested by the BMS.

Figure 44:
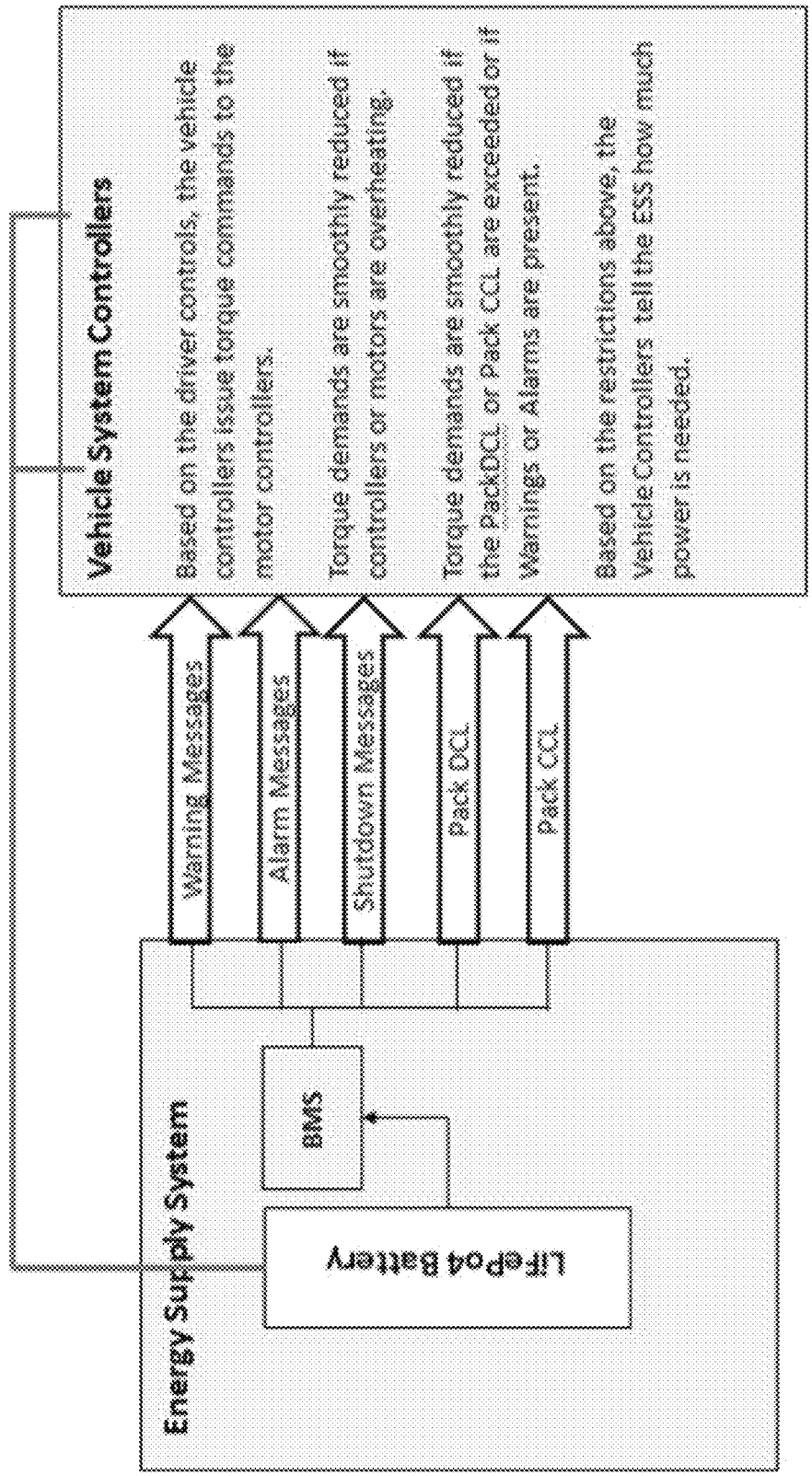
FIG. 44 is a conceptual diagram of an example flow between an energy supply system and vehicle system controllers.

FIG. 44 represents the electric vehicle drive system from the point of view of the flow of energy and control information between the Energy Supply System (the Battery and BMS) and the Vehicle System Controllers.

In addition to warnings and alarm messages sent by the BMS, values for the maximum instantaneous discharge current (PackDCL) and the maximum instantaneous charge current (PackCCL) are transmitted by the BMS.

It is the task of the software of the present invention in the Vehicle System Controllers to incorporate all of this information and issue appropriate commands to the front and rear drive motors to optimize system performance while protecting the battery and all electrical components.

It is generally understood by those skilled in the art that the amount of energy contained in the battery may not be sufficient for all types of mission profiles. To extend the range of application of the vehicle, a Range Extender may be added to the vehicle drive system. Such a Range Extender may comprise a small conventional internal combustion heat engine which can supplement the energy provided by the battery.

The Heat Engine provides for the long-term average power requirement of the vehicle, which can be surprisingly low, while the battery provides for the peak power required to overcome obstacles.

The theory and operation of a Range Extender are well known in the literature and is not the subject of the present invention.

The present embodiment relates to the method used to integrate operation of an Energy Supply System comprising multiple sources of energy.

Figure 45:
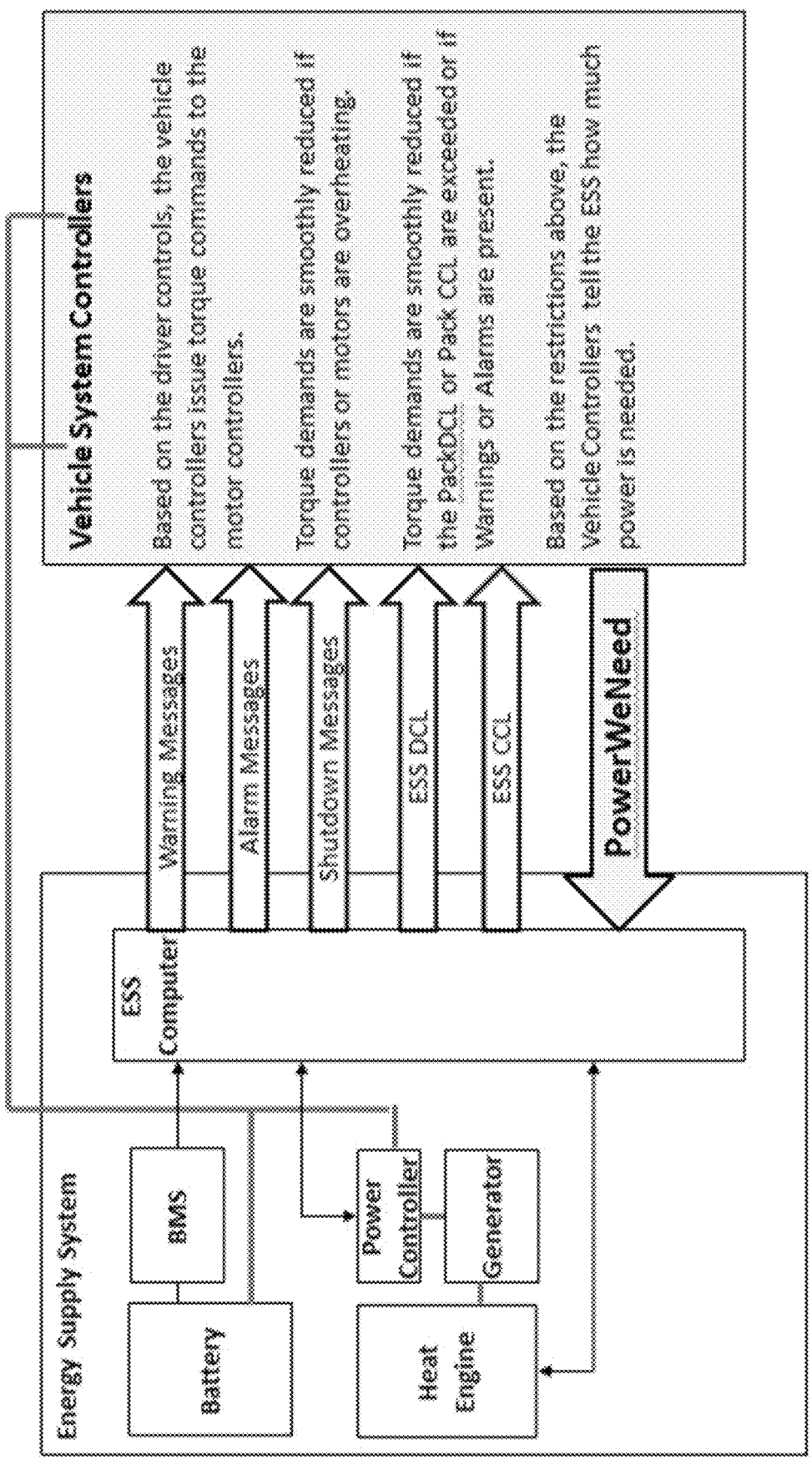
FIG. 45 is a conceptual diagram of an example flow between an energy supply system and vehicle system controllers.

According to FIG. 45, the Vehicle System Controllers receive information from an ESS Computer. It will be appreciated by those skilled in the art that the functionality of the ESS Computer can be integrated into the Power Controller of the Generator which may be a conventional Curtis AC Motor Controller.

The Vehicle System Controllers are configured switch the required functionality to compute the PowerWeNeed to meet the required driver commands and transmit this power requirement to the ESS computer. The ESS Computer will be programmed with the functionality to decide how best to provide the PowerWeNeed from the available sources of energy (i.e. the Battery and/or the Heat Engine). If the PowerWeNeed cannot be provided by any combination of the available power sources, the ESS Computer will transmit the maximum allowed discharge current in the value of ESS DCL.

It will be appreciated that as far as the Vehicle Controllers are concerned, it does not matter if the allowed discharge current is limited by the battery PackDCL or by ESS DCL (in the present invention). The Vehicle System Controllers react to the numerical value (PackDCL or ESS DCL).

It will be appreciated therefore that the investment and time spent in developing and debugging the intricate vehicle controls will operate without change. (In a certain sense it is like a plug-and-play system).

The ESS Computer will be programmed with all the knowledge of the Battery, Fuel Cell and SuperCap to decide on the best division of power. The Vehicle System Controller software does not have to know anything about how the ESS Computer makes its decisions.

Figure 46:
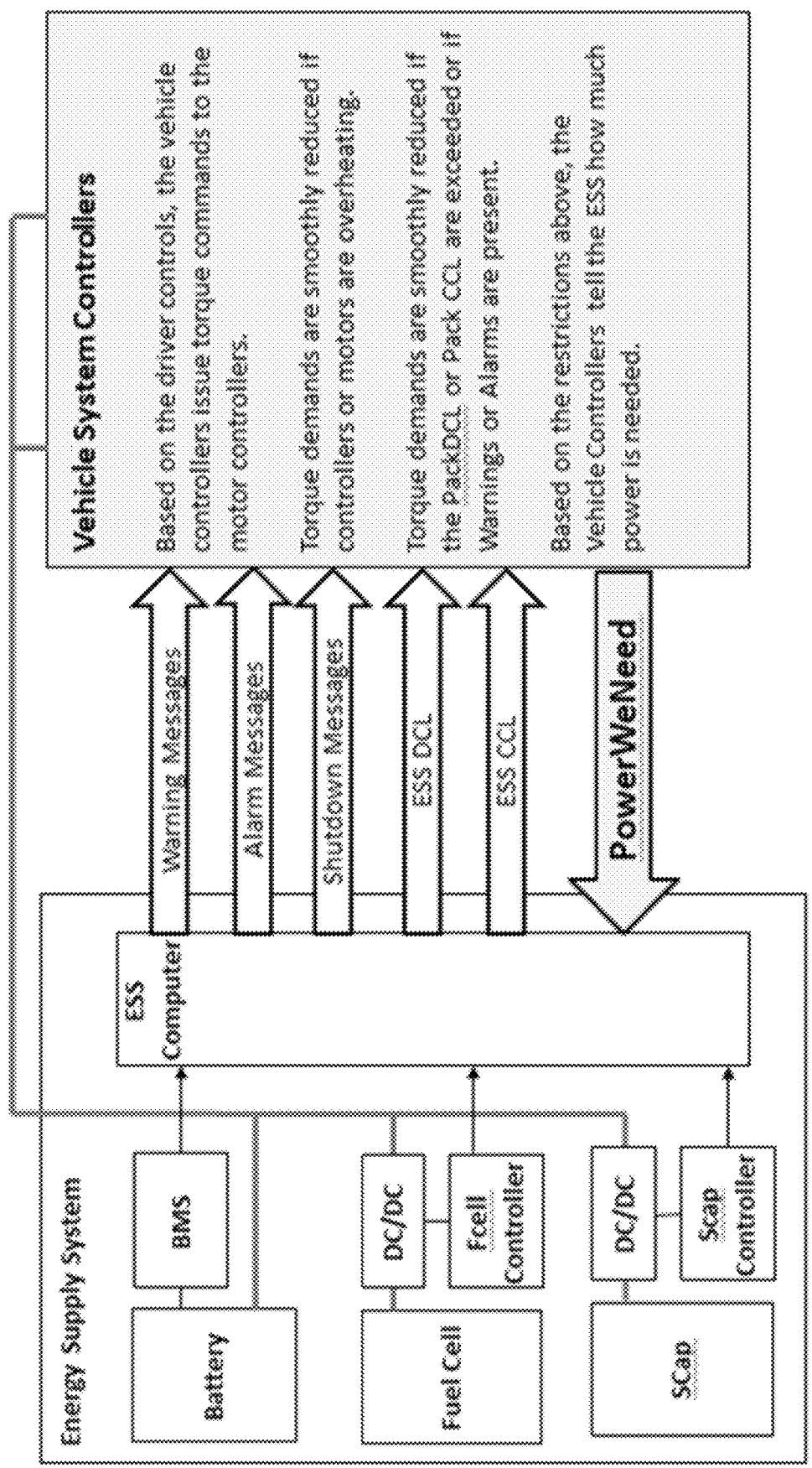
FIG. 46 is a conceptual diagram of an example flow between an energy supply system and vehicle system controllers.

In the FIG. 46, the Energy Supply System comprises a battery, a fuel cell and a SuperCap.

The Vehicle System Controller Software may be exactly the as in the above-mentioned embodiment with the Heat Engine.

The ESS Computer will be programmed with all the knowledge of the Battery, Fuel Cell and SuperCap to decide on the best division of power. The Vehicle System Controller software does not have to know anything about how the ESS Computer makes its decisions.

10. Dealing with Under-Performing Battery Modules

This embodiment relates to dealing with under-performing battery modules.

As background, the importance of balancing the State of Charge (SOC) of a multi-cell Lithium based battery is well known in the literature. Similarly, the importance of preventing even one of the cells of a multi-cell battery from exceeding prescribed limits is also well known. See for example XP Power System User Manual Rev. 4.8 published by Valence Technology of Austin Tex. Ideally, the SOC of each of the cells in a battery is substantially the same and intricate procedures have been developed for ensuring that Lithium based batteries are properly charge and balanced.

Safe operation of Lithium based batteries (particularly large batteries used in electric vehicles) may be supervised by a BMS. A BMS may monitor the state of each of the cells in a multi-cell battery and reports on the state of the battery as a whole and also on the worst-case cell(s) of the battery. Thus, a BMS may report the voltage of lowest voltage cell in the battery pack, the lowest temperature cell, the highest temperature cell, the cell with the lowest SOC, the highest SOC, etc. The system may need to respond to the messages sent by the BMS and decrease the load on the battery pack if required. In extreme cases, it may even be required to shut the vehicle down completely to prevent a dangerous situation from occurring.

For various reasons that are well known in the literature, one or more of the battery modules may be at a lower SOC than the other modules.

Figure 47:
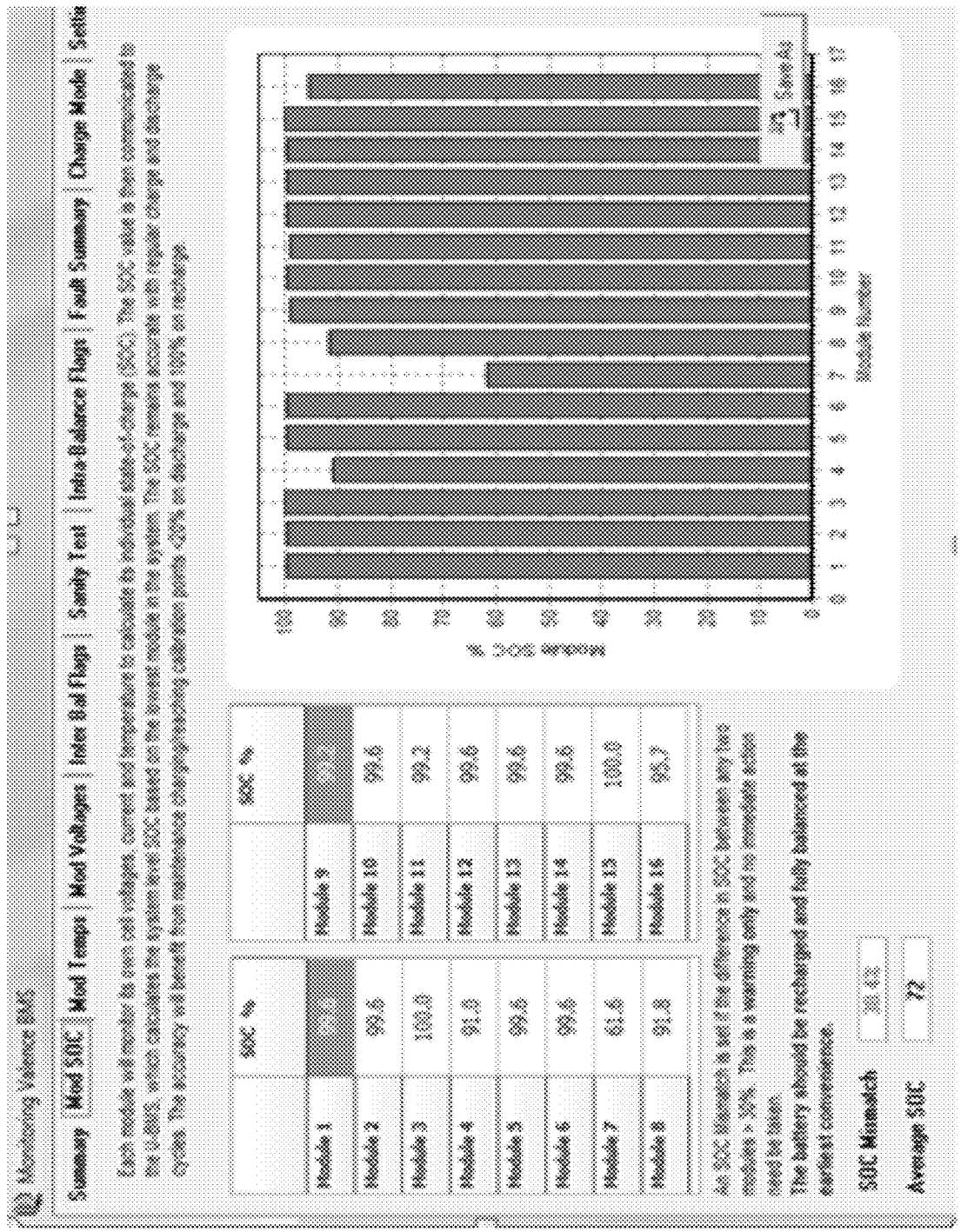
FIG. 47 is a conceptual diagram illustrating an example charge state of battery modules in a battery pack.

Reference is now made to FIG. 47 which shows the charge state of each of the battery modules in the battery pack at the start of a run. As may be seen in FIG. 47, most of the modules are above 90% SOC but Module No. 7 is at 62%.

For maximum safety, the BMS is programmed to base its calculations for the maximum recommended Discharge Current Limit (PackDCL) on the battery module with the lowest SOC. The value of the Lowest Module SOC is also reported to the driver as a measure of the charge remaining in the battery.

Figure 48:
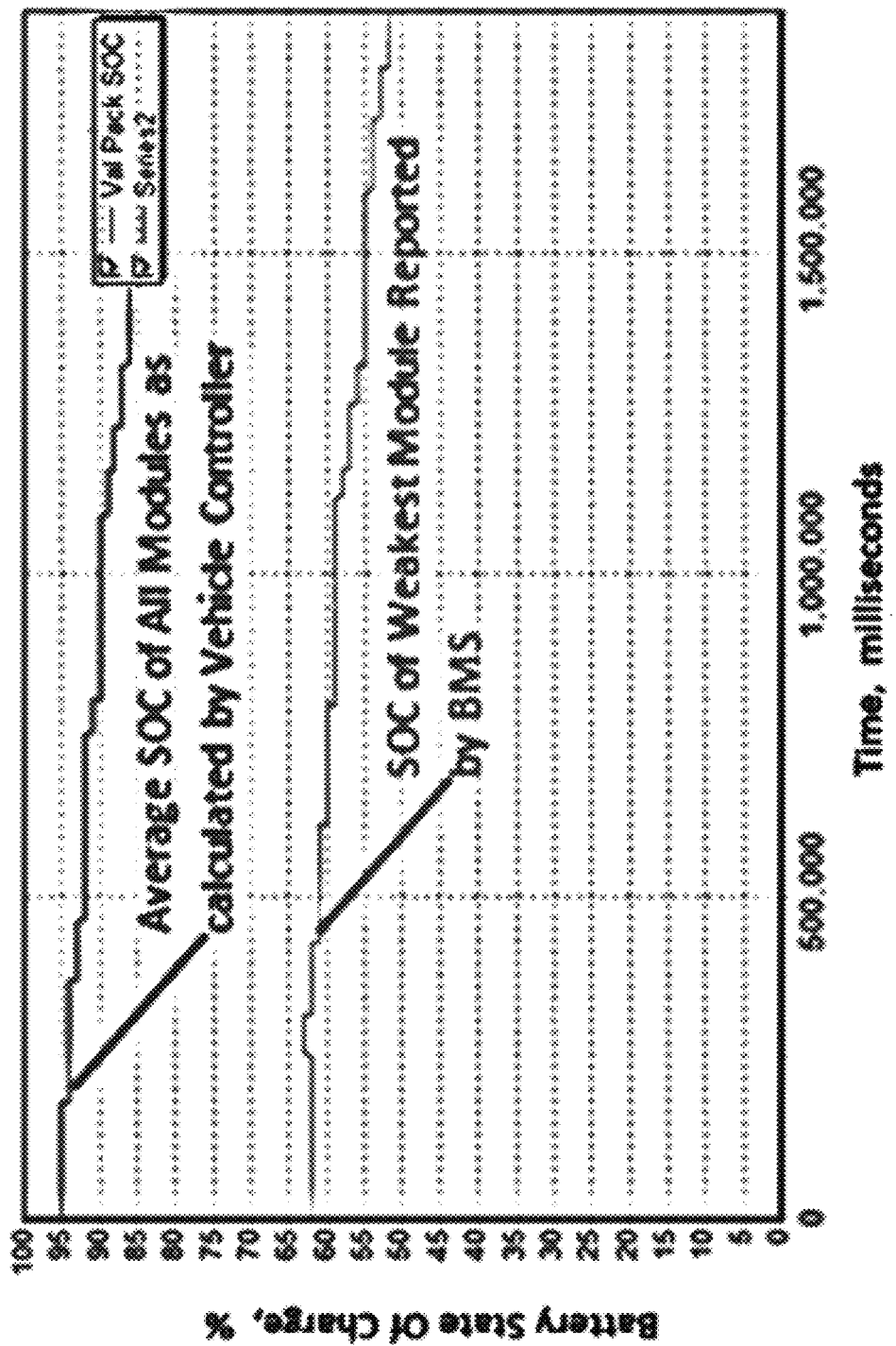
FIG. 48 is a conceptual diagram illustrating example states of charge of battery modules in a battery pack.

Reference is now made to FIG. 48 which shows the Average SOC of all the modules and the SOC of the weakest module as reported by the BMS. As may be seen in FIG. 48 as the battery is discharged, all of the modules experience a substantially uniform decrease in the reported value of the SOC.

Hence, as the weakest cell (lower curve) is discharged, this value is reported to the driver. This is the safest procedure because the BMS has to protect the weakest cell and the driver has to be notified about the decrease in the remaining battery energy.

Figure 49:
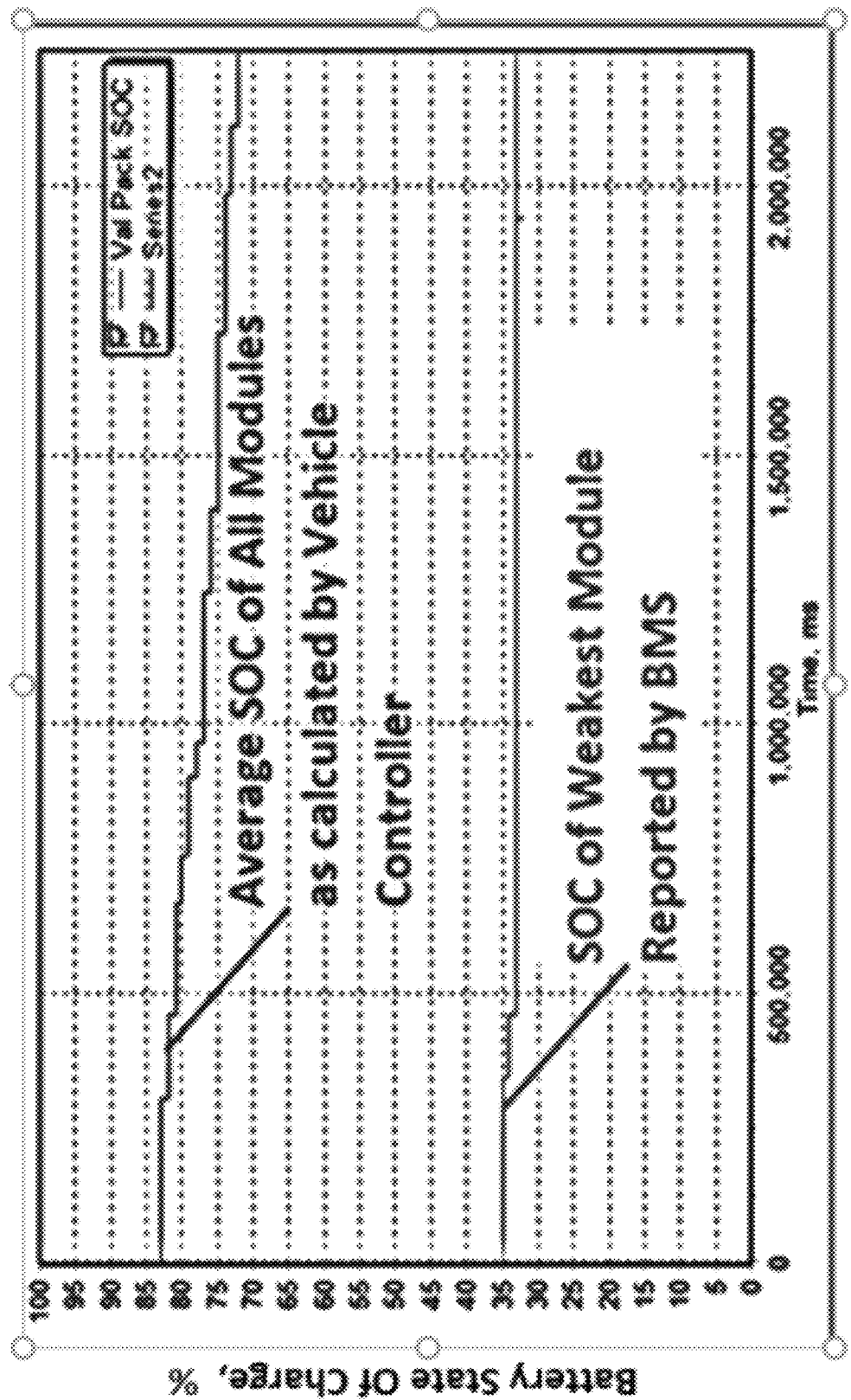
FIG. 49 is a conceptual diagram illustrating example states of charge of battery modules in a battery pack.

Another example of a misbalanced battery pack is shown in FIG. 49. The upper curve in FIG. 49 shows the average value of the SOC of all the modules. This average value is calculated by the Vehicle Controller based on information for each module broadcast by the BMS. Note that the weakest module starts at about 35%. As the vehicle travels, the weakest cell SOC (lower curve) drops to about 33% and remains at this SOC for an extended period of time.

This behavior is unexpected. The battery is surely being discharged, as shown in the upper curve and by the fact that the vehicle is moving a not-inconsiderable distance. However, the SOC of the weakest cell remains unchanged at about 33%.

As far as the battery safety is concerned, the battery is protected because the BMS uses the data for the weakest module.

The vehicle operator however notices that something is wrong because he continues driving and the SOC is not decreasing as expected.

The present embodiment may be used to prevent this anomalous situation from interfering with the driver's concentration and providing meaningful feedback to the vehicle operator, and yet protecting the battery as required. The battery state display means may also comprise means which are operative, when an SOC Mismatch warning is issued by the BMS, to display the Average Value of the SOC as calculated by the Vehicle Controller. The SOC of the weakest module will continue to protect the battery.

In an alternative implementation of the present embodiment, the average value of the SOC may be reported to the vehicle operator and the SOC of the weakest cell will always be used to protect the battery.

12. Preserving Residual Energy Level in Energy Storage System

Another embodiment relates to preserving residual energy levels in energy storage systems. As background, battery-only electric vehicle drive systems often require a low voltage energy source for operating relays, warning and indicator lights, and other low power devices typically associated with on and off-road vehicles. Similarly, a hybrid-electric vehicle may also require a low voltage energy source for operating a starter motor to start the combustion engine. These auxiliary devices are often powered by a low voltage 12V or 24V conventional battery.

As is well known by one normally skilled in the art, the vehicle cannot even be started if the low voltage battery is completely discharged. To prevent this from occurring, DC-DC Converter means may be provided to keep the low voltage battery in a charged state. The energy required for this may come from the main high voltage energy storage device of the vehicle. It will be apparent that if the main high voltage energy storage device is completely discharged, the low voltage battery will become completely discharged and the vehicle will be completely unresponsive and not even be capable of issuing an error state message indicating what the problem is. Such a case may occur if the vehicle is left completely unattended for a long period of time without the conventional vehicle ignition switch being turned off.

The present embodiment provides residual energy control means to preserve a minimum amount of energy in the low voltage system and in the high voltage energy storage device of the vehicle.

In another embodiment, the residual energy control means also comprises SOC display means operative to transform the battery pack State of Charge (PackSOC) as reported by the Battery Management System to a Displayed SOC wherein the Displayed SOC reports a higher numerical value than the actual PackSOC.

In another preferred embodiment of the present invention, the residual energy control means also comprises as conventional serial display unit (e.g., Curtis Model 840 or similar device) for displaying numerical values to the vehicle operator.

Figure 50:
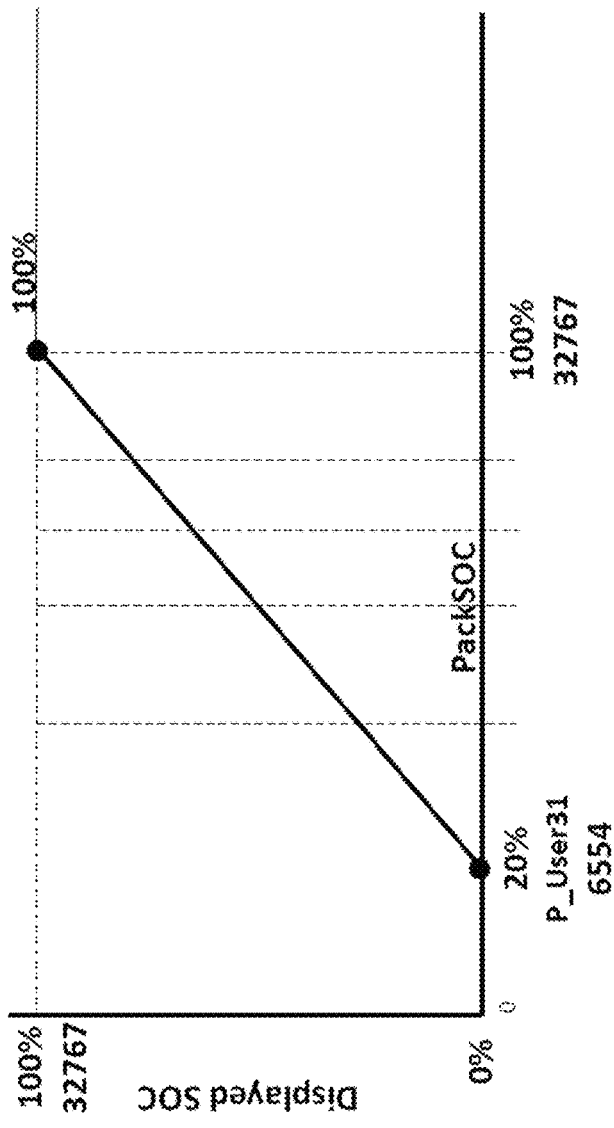
FIG. 50 is a conceptual diagram illustrating a relationship between a real and display state of charge of battery modules in a battery pack.

Referring now to FIG. 50 an exemplary functional relationship between the PackSOC and the Displayed SOC is shown.

It will be apparent to one normally skilled in the art of using motor controllers (e.g., controllers manufactured by Curtis Instruments) that numerical values may be stored in EEPROM parameter memory by a fleet manager and that these values cannot be changed by a user of the vehicle.

In the example of FIG. 50, a linear relationship may be established by entering the value of P_User31 of 20%. Thus, if the Pack SOC is 100% the Displayed SOC will be reported as 100% and if the PackSOC is 20%, the Displayed SOC will be reported as zero but 20% of the battery energy still remains.

It will be apparent that the functional relationship between the PackSOC and the Displayed SOC may be given almost any desired characteristic.

In yet another preferred implementation of the present embodiment, the LED warning lights associated with serial display units may be activated by using the Displayed SOC values.

In yet another implementation of the present embodiment, the residual energy control means also comprises Power ON Logic means operable to control the vehicle electrical systems when the vehicle is first turned ON. The Power ON logic is described in in FIG. 51.

In yet another preferred embodiment of the present invention, the residual energy control means also comprises Shutdown Control Logic means operable to control the shutdown of the vehicle if the PackSOC falls below a prescribed value.

Figure 52:
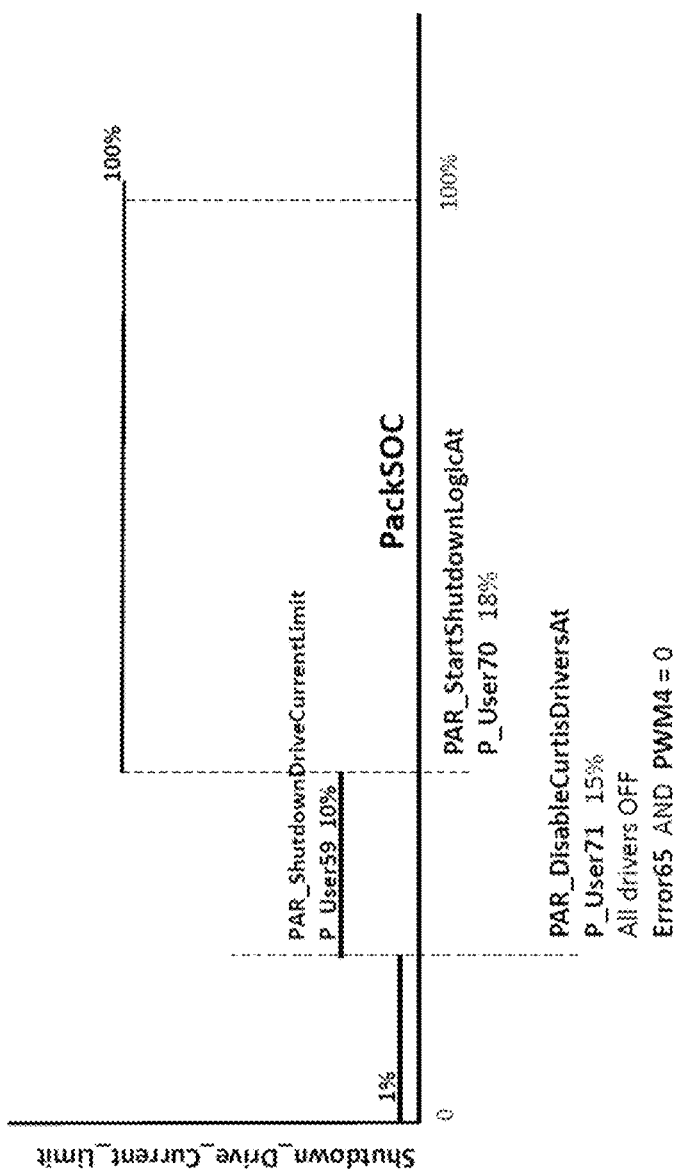
FIG. 52 is a conceptual diagram illustrating an example of shutdown logic.

The Shutdown Control Logic is described in exemplary form in FIG. 52.

In yet another preferred embodiment of the present invention, the residual energy control means also comprises Operating Mode Restriction means operable to limit the maximum power that can be taken from the high voltage battery as energy level changes.

Figure 53:
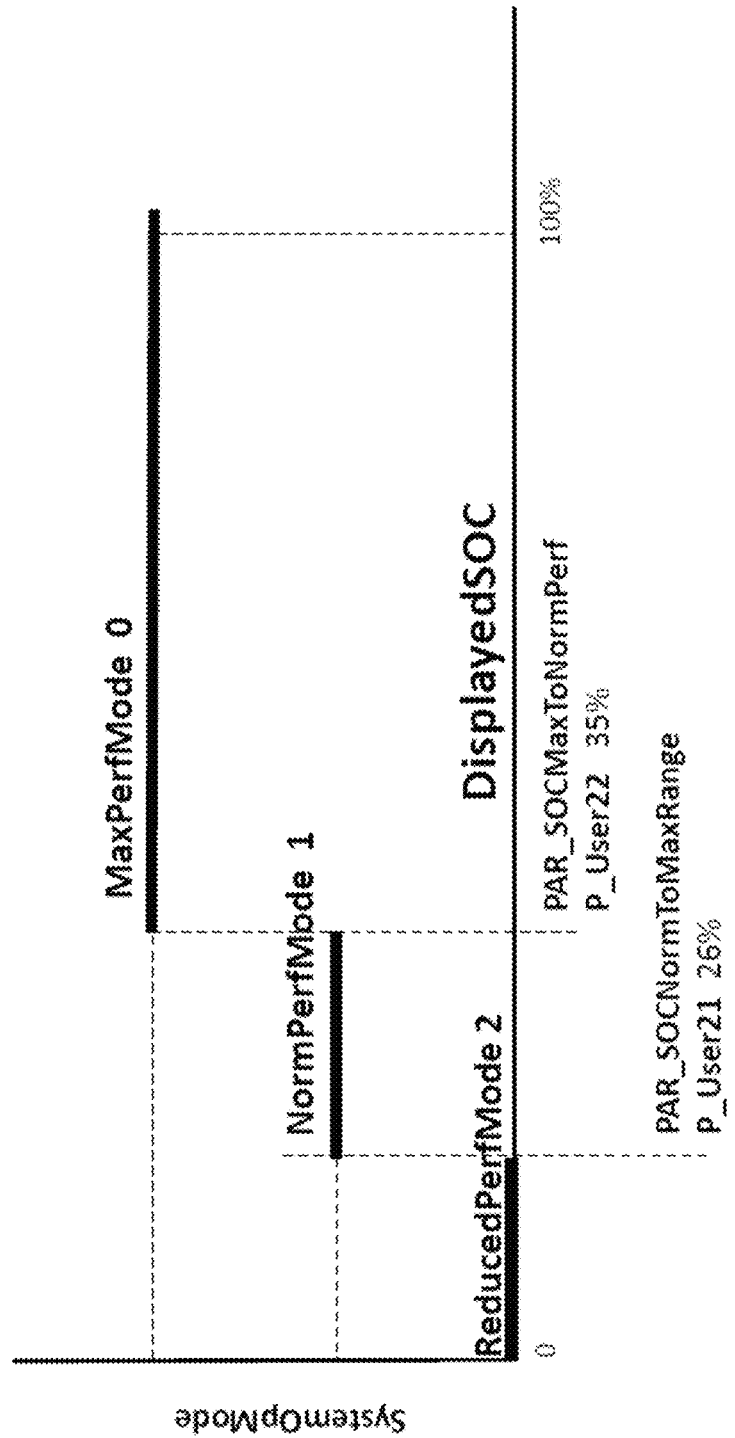
FIG. 53 is a conceptual diagram illustrating an example of operating mode restrictions.

The Operating Mode Restriction means are described in exemplary form in FIG. 53.

In still another implementation of the present embodiment, the operating mode restriction means may be activated automatically by the value of the DisplayedSOC and by manual switch means on the driver control panel and wherein the automatic setting of the mode restriction means overrides the manual switch settings.

12. Controllable Differential System for 4WD Electric Vehicles

Another embodiment of this disclosure relates to a controllable differential system for 4WD electric vehicles.

As background, the importance of being able to lock a differential to maximize traction is well known in the literature and various mechanisms for implementing this are well known to one normally skilled in the art. In most cases, a driver-selectable differential-lock mechanism is provided in both the front axle drive and the rear-axle drive system. These differential lock mechanisms prevent loss of traction when one of the drive wheels slips but at the cost of losses in the drive train on uneven terrain.

A serious problem often associated with a front-differential lock system is the susceptibility of the front axle drive system to heavy shocks when operating in a rough rock-strewn terrain. These shocks often lead to premature damage to the front axle.

It is the purpose of the present embodiment to minimize shocks encountered by the front axle by providing a rapid means for temporarily applying a varying torque on the faster of the drive wheels, thereby increasing traction to the front axle. This varying friction torque will be selectively applied only when desired by the operator.

The present invention comprises at least one shaft speed sensor arranged to monitor the rotational speed of at least one of the front wheels. The speed of the differential input shaft is known from the speed sensor located on the front axle drive motor. The speed of the second front wheel therefore may be calculated from the known speed of the front axle drive motor, the known gear ratios, and speed measured by said shaft speed sensor.

The present invention also comprises friction disks and friction control means on both sides of the differential and operative to provide a varying friction torque to one of the drive wheels when desired. In a preferred embodiment of the invention, the friction disks are the front wheel disk brakes.

Thus, if the speed of one of the front wheels is substantially higher than the speed of the second front wheel, the friction control means will operate to apply a friction torque to the faster brake disk, thereby forcing the slower wheel to provide a driving torque proportional to the torque applied to the faster wheel.

It will be apparent to one normally skilled in the art that the traction of the front axle will be increased when one of the brakes disks are activated. This embodiment may take various other forms as well.

13. Parallel Hybrid with CVT

Figure 54:
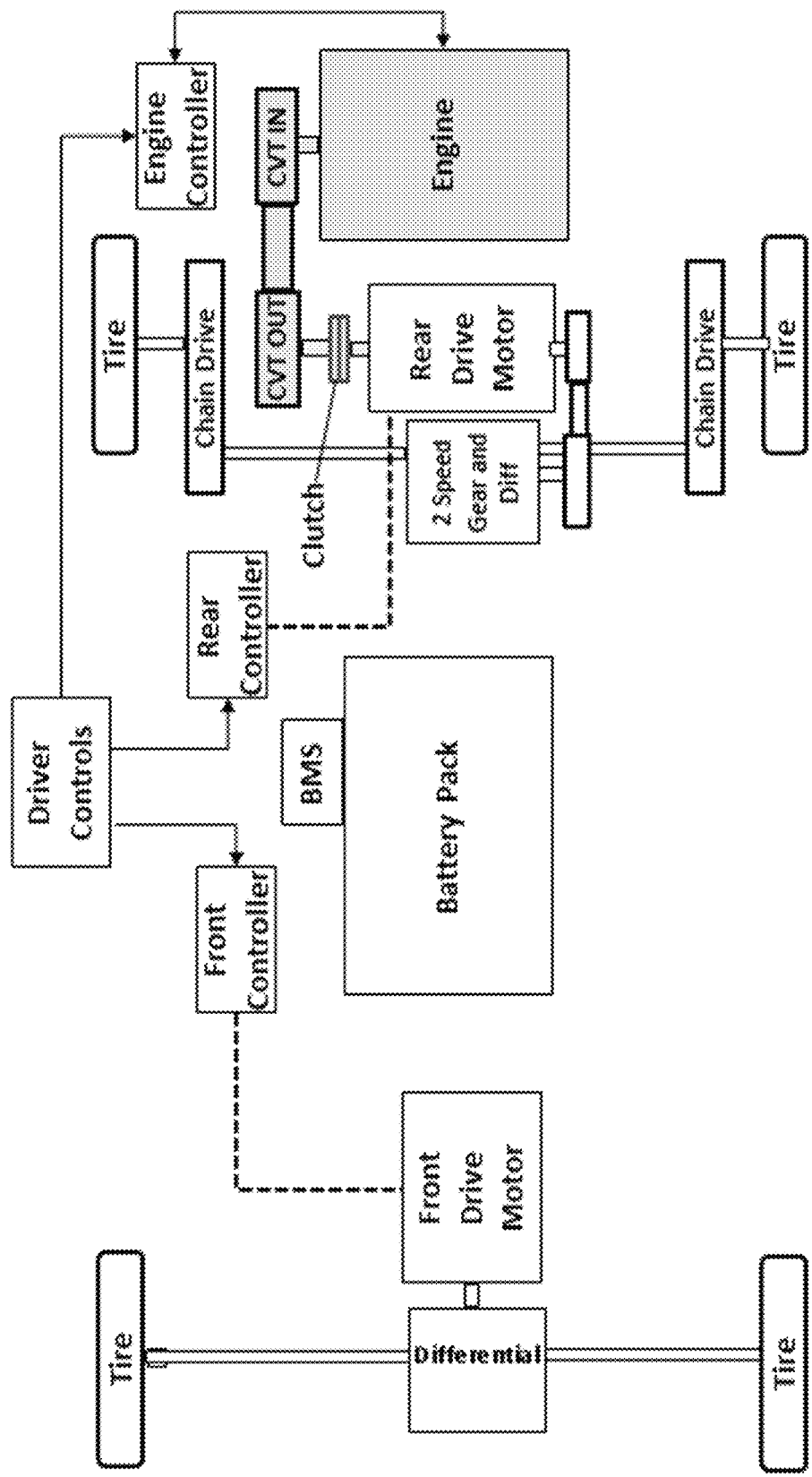
FIG. 54 is a conceptual diagram illustrating an example vehicle configuration.

Another embodiment of this disclosure relates to a Parallel Hybrid vehicle having a continuously variable transmission (CVT). This embodiment utilizes the 4WD electric vehicle drive technology and software components for battery only vehicles as part of a hybrid powertrain. In accordance with a preferred embodiment of the present invention, an internal combustion engine is drivingly connected to the Rear Drive Motor via a continuously variable transmission (CVT) and clutch as show in FIG. 54.

Figure 55:
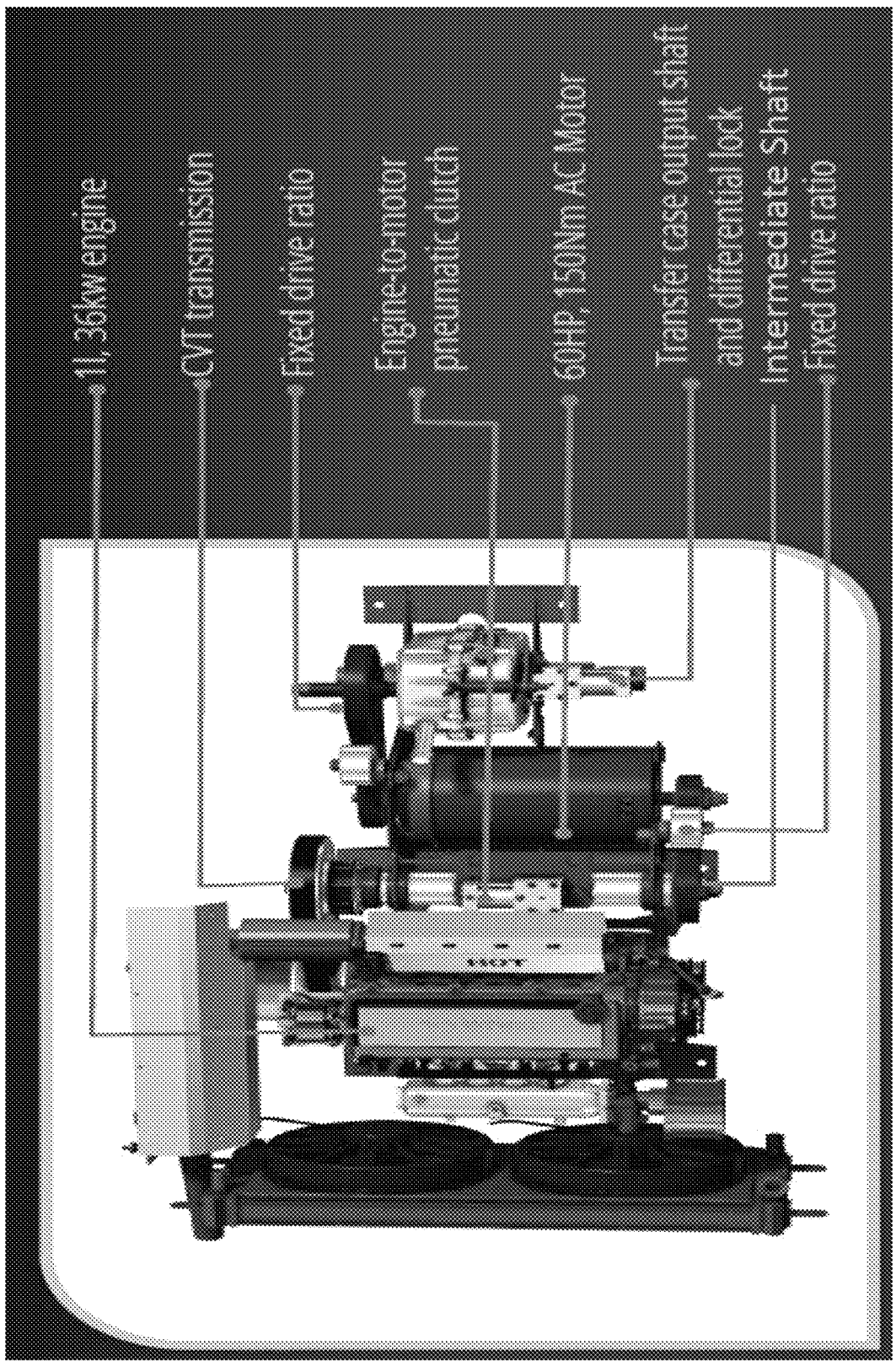
FIG. 55 is a conceptual diagram of components in a parallel hybrid vehicle having a continuously variable transmission.

It is appreciated that the above block diagram is exemplary only and that various modifications may be made. By way of example an intermediate shaft may be placed between the CVT output pulley and the rear drive motor, as shown in FIG. 55.

Figure 56:
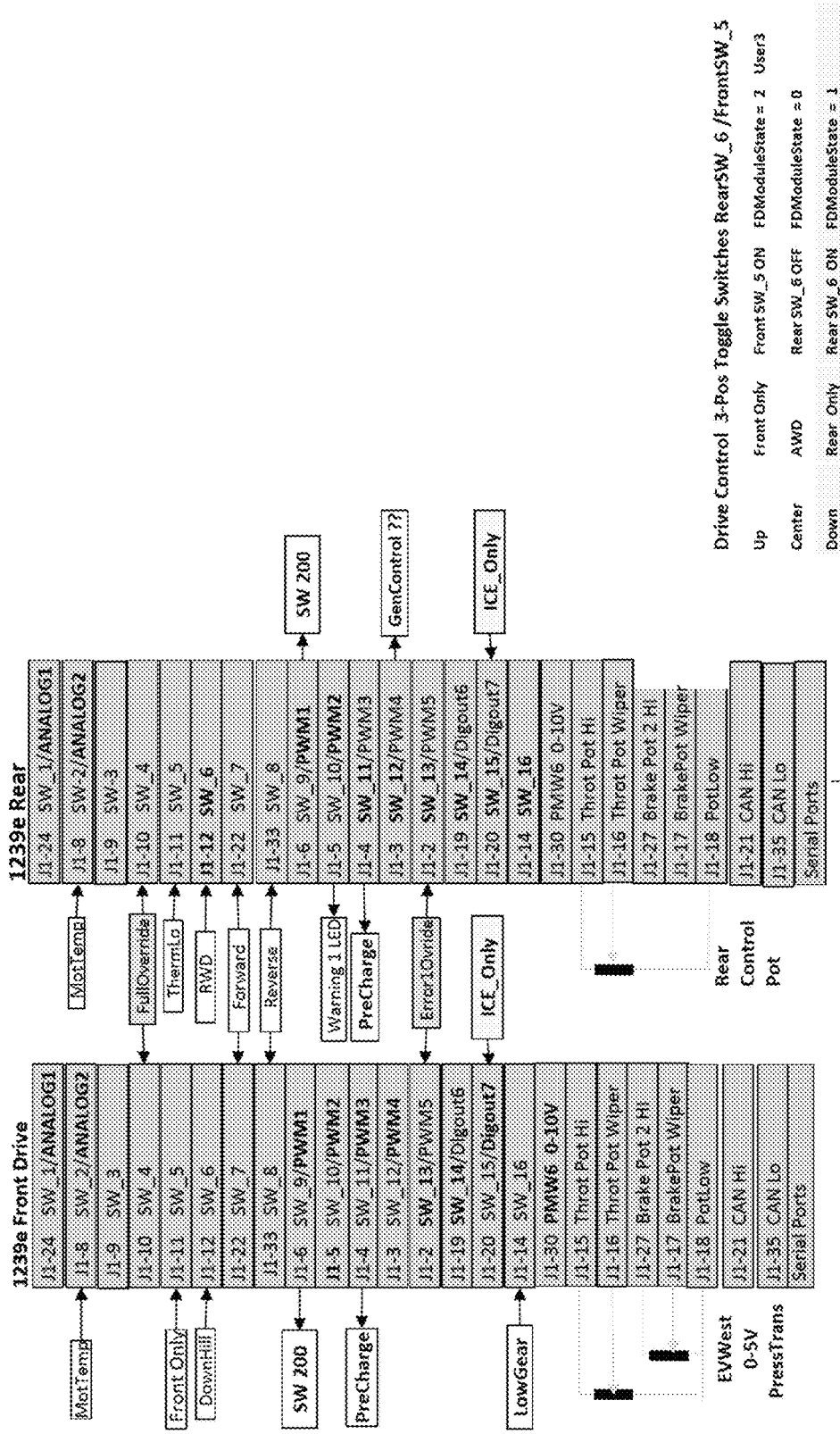
FIG. 56 is a conceptual diagram of dual motor controllers.

Reference is now made to FIG. 56 which shows the electrical connections and driver controls for the front controller and rear controller of the dual motor all-wheel drive hybrid vehicle of the present invention.

Figure 57:
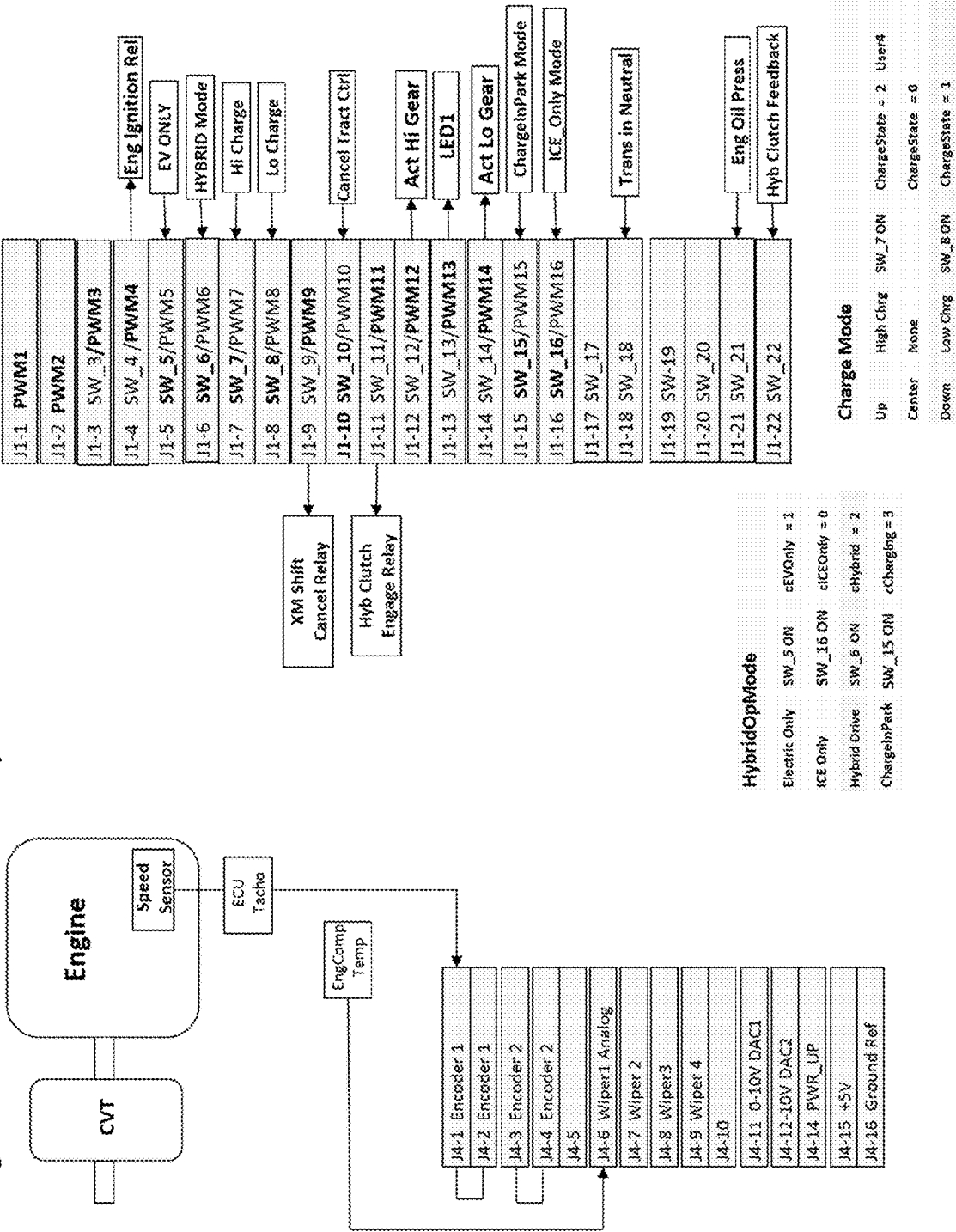
FIG. 57 is a conceptual diagram of electrical connections and driver controls.

Reference is also made to FIG. 57, which shows the electrical connections and driver controls for the engine control functions of the present invention.

The present embodiment provides numerous advantages and features. As some examples, the present embodiment may provide: (1) Silent operation with Front WD, Rear WD and All Wheel Drive, (2) FrontWD, RWD and AWD available when the engine operates, (3) may allow an engine to drive a rear axle while providing electrical power to recharge the battery and or power the Front Drive motor, (4) stop-start operation of Engine, (5) redundant controls to front and rear, (6), redundant digital and analog controls, (7) vehicle operation that continues if a CANbus fails, (8) vehicle operation in the event of catastrophic failure in electrical system, (9) 4WD operation if battery fails or is empty, (10) a vehicle range that is limited only by the vehicle's fuel supply, and/or (12) operation at high vehicle speed in excess of the maximum speeds allowed by the vehicle's the electric motors. The present embodiment may provide various other advantages as well.

Figure 58:
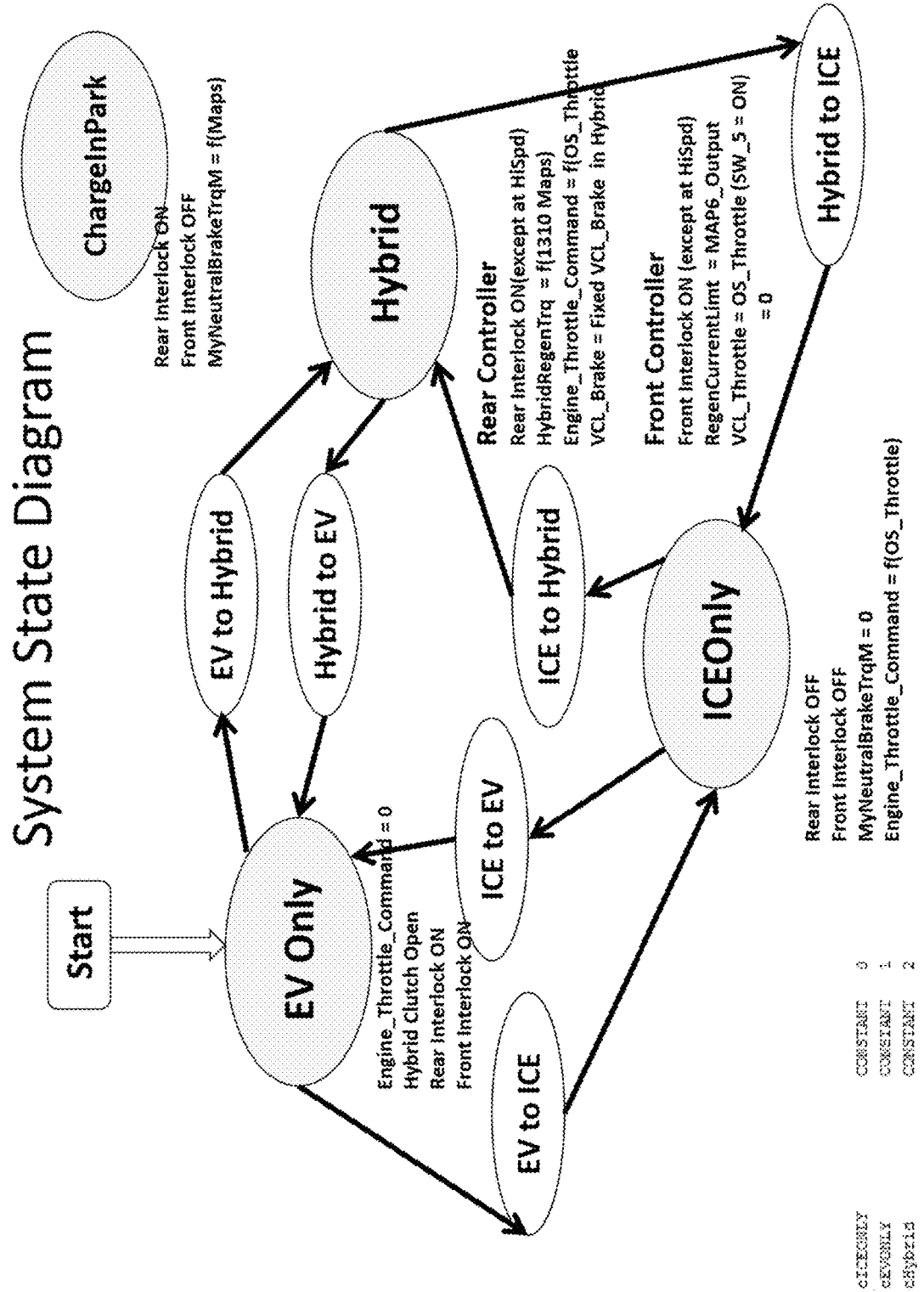
FIG. 58 is a conceptual diagram of a state diagram that illustrates transitions between different system operating modes.

Reference is now made to FIG. 58 which shows the different operating modes and transitions between the operating modes for the parallel hybrid powertrain of the present invention.

This powertrain has the following operating modes:

EVOnly—The engine is disconnected and off. All of the performance characteristics of the dual motor all-wheel drive electric vehicle are inherited.

ICEOnly—The high voltage electrical system is shut down and the vehicle operates as a conventional vehicle with rear wheel drive.

Hybrid—The front wheels may be driven electrically and the rear wheels are driven by the engine. The rear motor may be used to charge the battery under conditions of low vehicle load thereby allowing the engine to operate more efficiently. Under high load conditions, the battery and rear motor may assist the engine thereby enhancing vehicle performance.

Charge In Park—the battery is charged by the engine and the rear controller with the vehicle at standstill.

Figure 59:
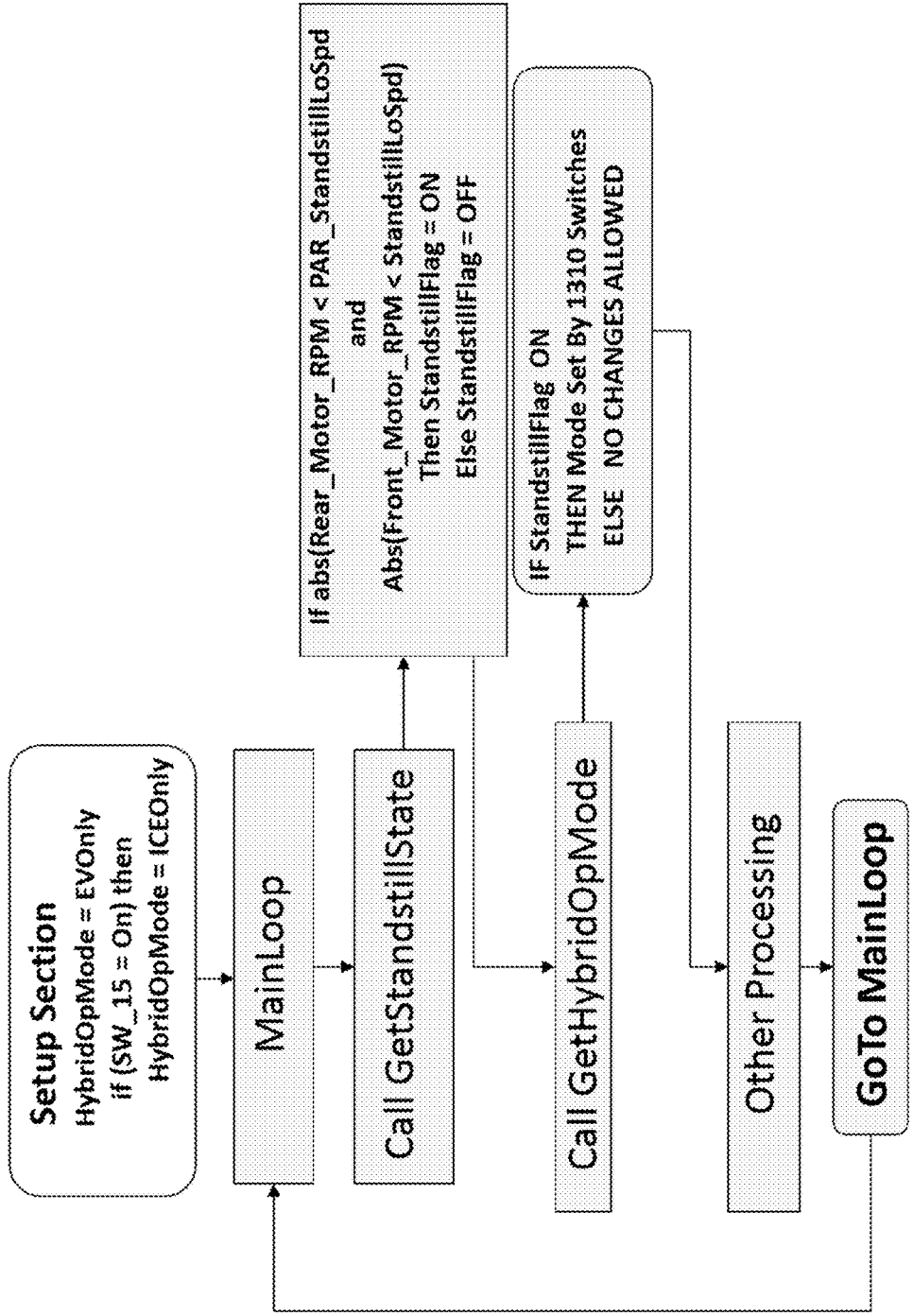
FIG. 59 is a conceptual diagram illustrating transitions between operating modes.

Reference is now made to FIG. 59 which shows some details of the conditions required to make a transition between the operating modes.

Figure 60:
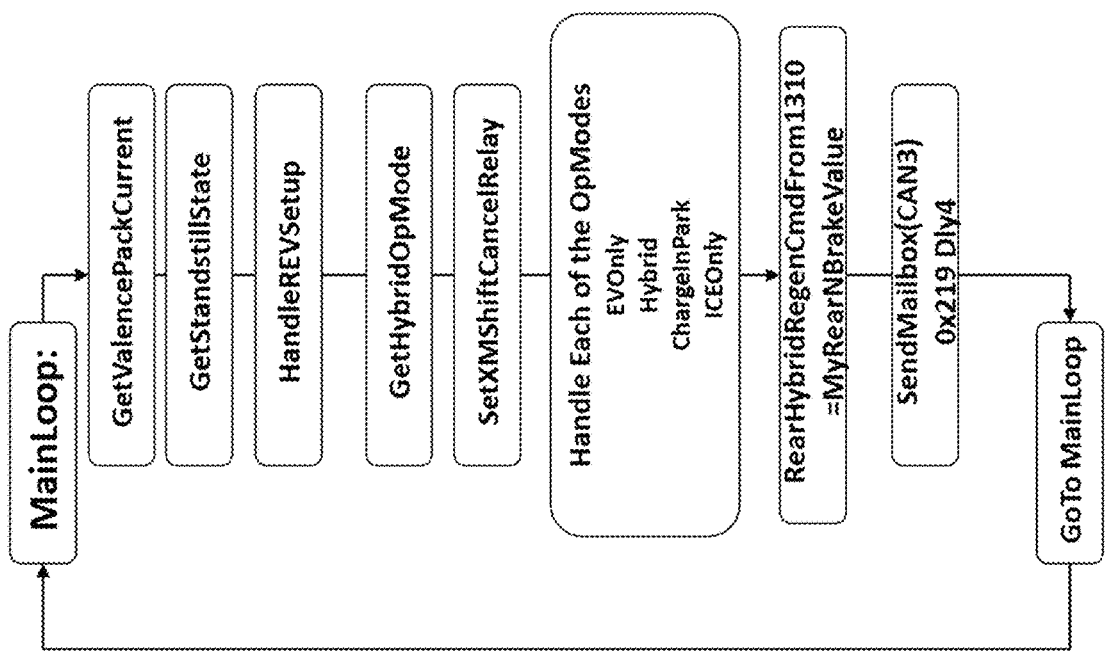
FIG. 60 is a conceptual diagram of an example main loop that may allow a vehicle to run in reverse.

Reference is also made to FIG. 60 which shows some details of methods operative to run the vehicle in the reverse direction.

Figure 61:
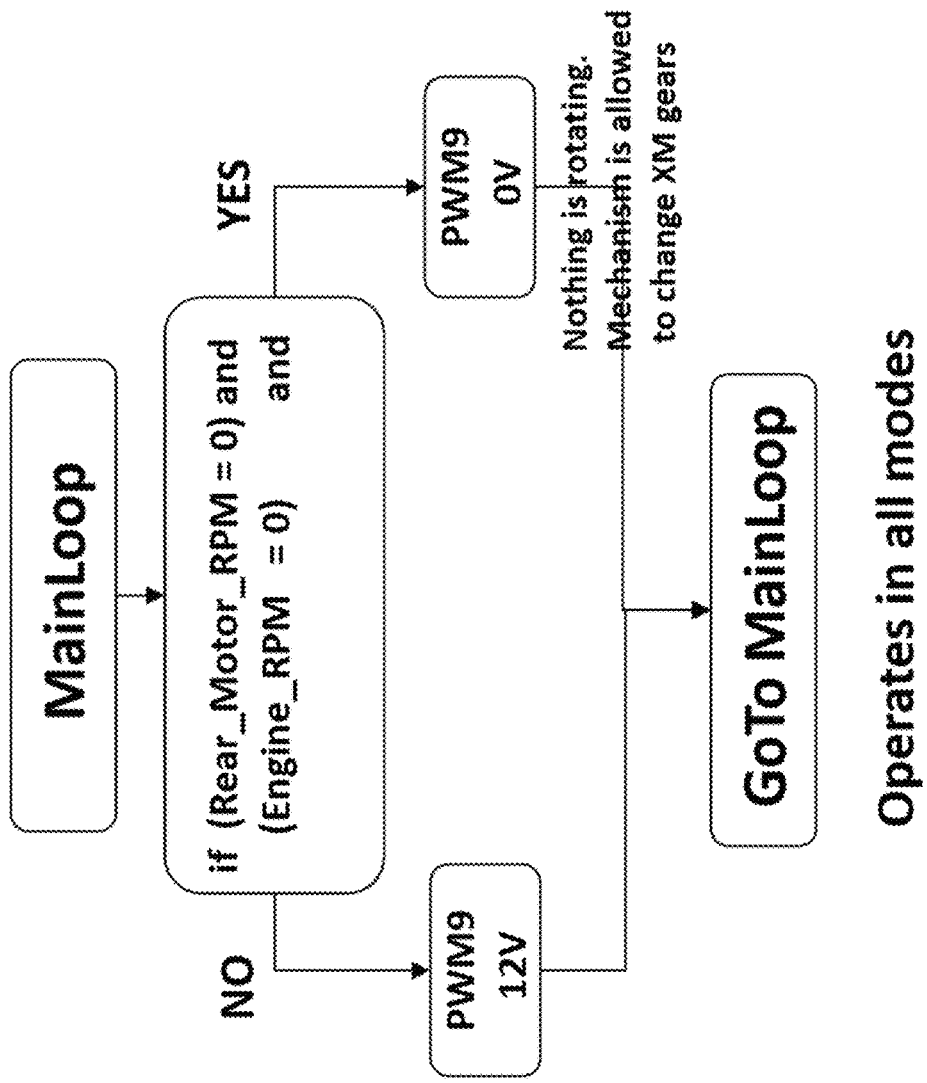
FIG. 61 is a flow diagram of an example method for operating a gear change mechanism.

Reference is now made to FIG. 61 which shows some details of methods operative to shift the 2 Spd Gear between the LoRatio, HiRatio and Neutral positions thereby preventing inadvertent operation of the gear change mechanism of the 2 Spd Gear.

Figure 62:
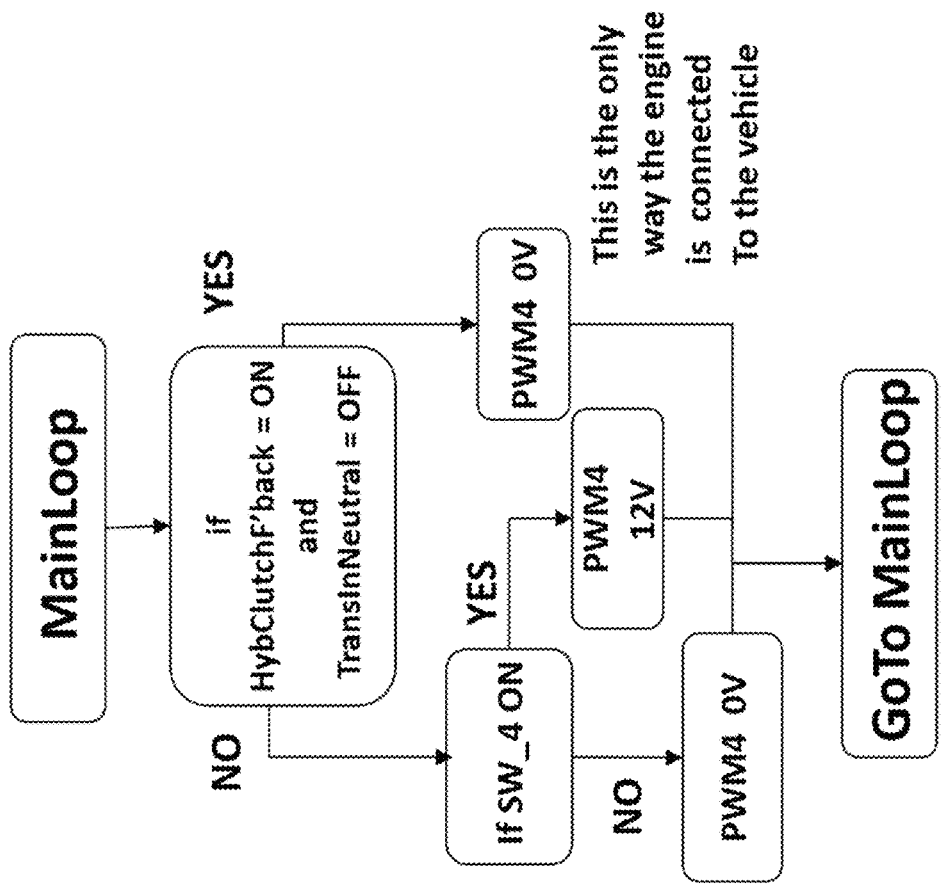
FIG. 62 is a flow diagram of an example method to activate and deactivate an engine ignition relay.

Reference is also made to FIG. 62 which shows some details of methods operative to activate and deactivate an engine ignition relay thereby preventing inadvertent operation of the engine ignition relay if the vehicle is moving or the engine is rotating.

It will be appreciated that when the engine is operating in the Hybrid Mode, the vehicle will be capable of substantially higher speeds than in the EV Only mode.

Figure 63:
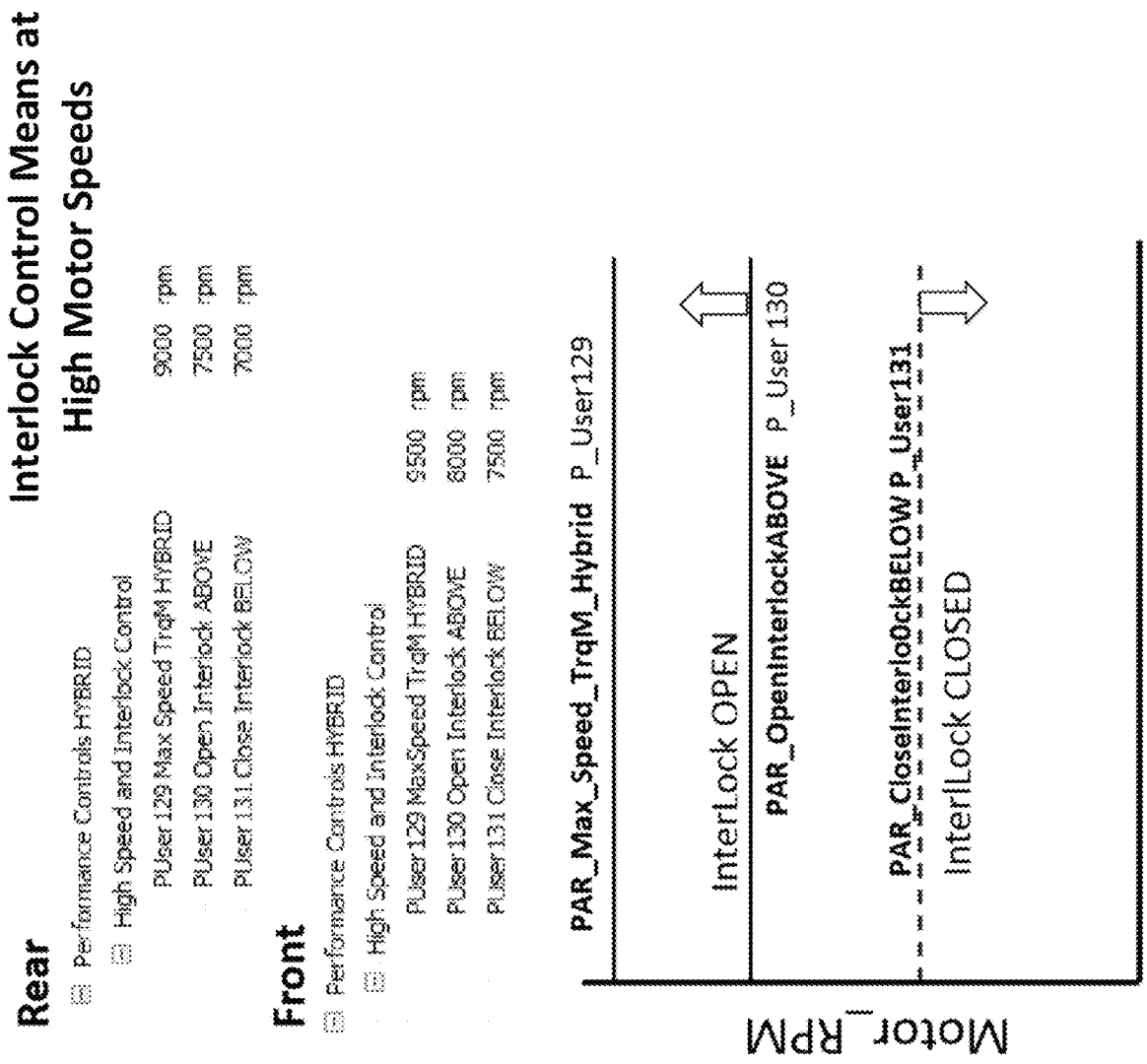
FIG. 63 is a conceptual diagram illustrating an example operation of an interlock control.

Reference is now made to FIG. 63, which shows an interlock control means operable to disconnect and reconnect the power electronics in each of the front and rear controllers at high motor speeds.

As is known by those normally skilled in the art of using Curtis motor controllers, clearing the Interlock disables the motor bridge which effectively disconnects the power electronics. Similarly, setting the Interlock effectively connects the power electronics.

As is known by those skilled in the art of using Curtis motor controllers, changing the state of the Interlock while the motor controller is delivering power will generate a system fault thereby preventing motor control functions until the fault is cleared.

This system fault can be prevented by setting the Curtis parameter HRD_SRO_Type to 0 but this effectively disables the critical safety feature that prevents Uncommanded Powered Motion.

Reference is now made to FIG. 64 which shows a Sequencing Error at Startup method operative to implement essential safety features preventing Uncommanded Powered Motion.

It will be appreciated that the Sequencing Error at Startup method described above is also applicable to the Dual Motor All-Wheel Drive Electric Vehicle.

Figure 65:
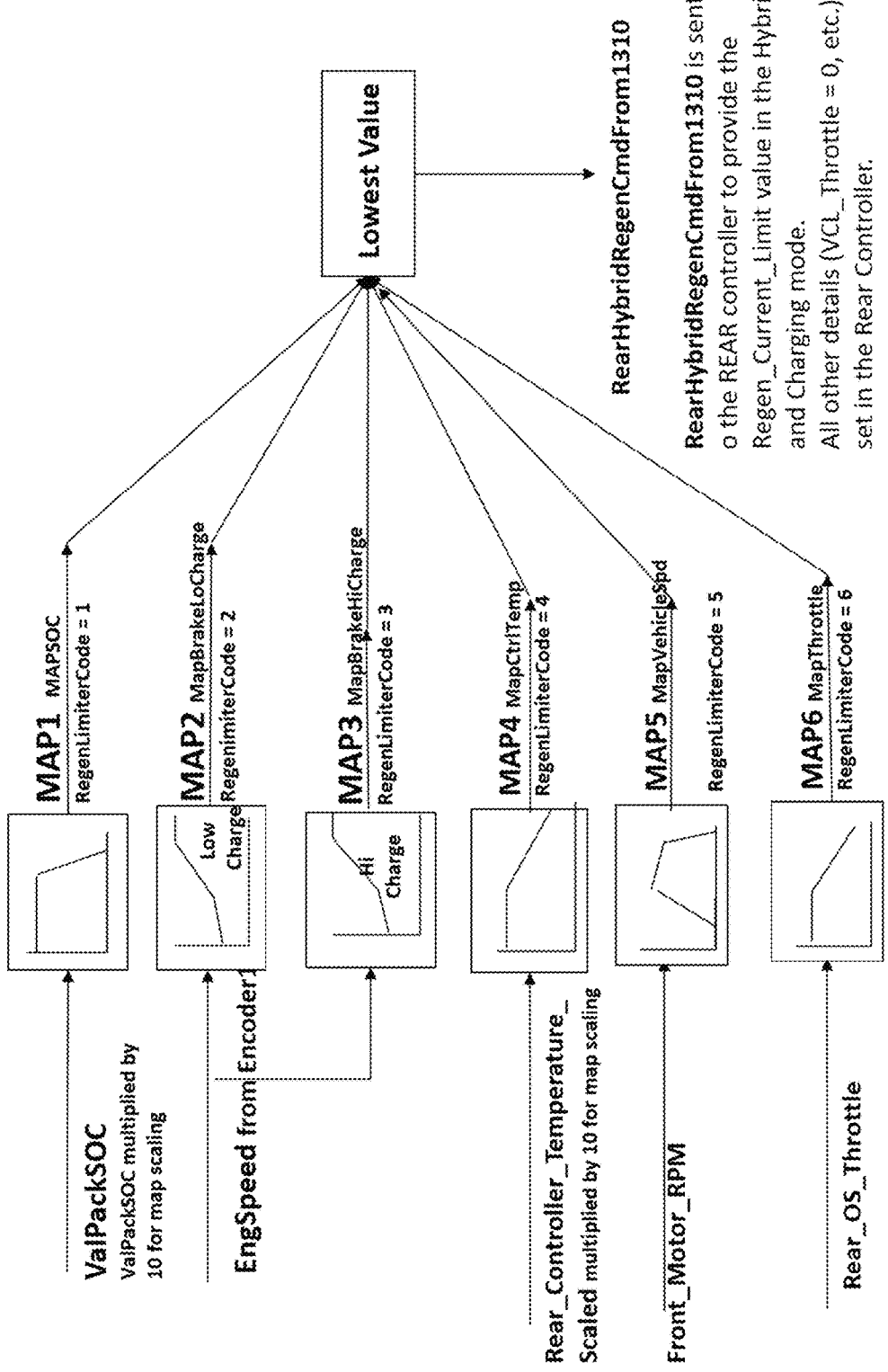
FIG. 65 is a conceptual diagram illustrating example techniques for determining amounts of regenerative torque.

Reference is now made to FIG. 65 which shows a Hybrid Regen Trq method operative to control the amount of regenerative torque requested by the Rear Controller while operating in the Hybrid Mode.

In the exemplary diagram of FIG. 65, the amount of regenerative torque is determined separately as a function of the system variables battery state (MAP1), speed of the engine in the Low Gear Ratio (MAP2), speed of the engine in the High Gear Ratio (MAP3) temperature of the Rear Controller (MAP4), speed of the vehicle (MAP5) and a throttle command of the driver controls (MAP6). The Hybrid Regen Trq calculations are carried out in the Engine Controller and the Lowest Value of the different functions is reported in the variable RearHybridRegenCmdFrom1310 and transmitted to the Rear Controller.

Reference is now made to FIG. 66 which shows exemplary values that may be used to determine the numerical values for each of the MAP1-MAP6 functions.

Reference is now made to FIG. 67 which shows how the RearHybridRegenCmdFrom1310 variable is implemented in the rear motor controller by assigning it to the Regen_Current_Limit variable.

Reference is now made to FIG. 68, which shows a Regen and Engine Throttle Control Method for Charge in Park method operative to control recharging of the battery using engine power when the vehicle is in the Charge in Park mode of operation.

It will be appreciated that the battery can also be charged to full capacity by using a conventional battery charger under control of the Battery Management System (BMS).

In an alternative embodiment of the Regen and Engine Throttle Control Method for Charge in Park method, the amount of battery charging is reduced if the temperature of the hottest battery cell triggers an Over Temperature Warning Value issued by the Battery Management System.

Figure 69A:
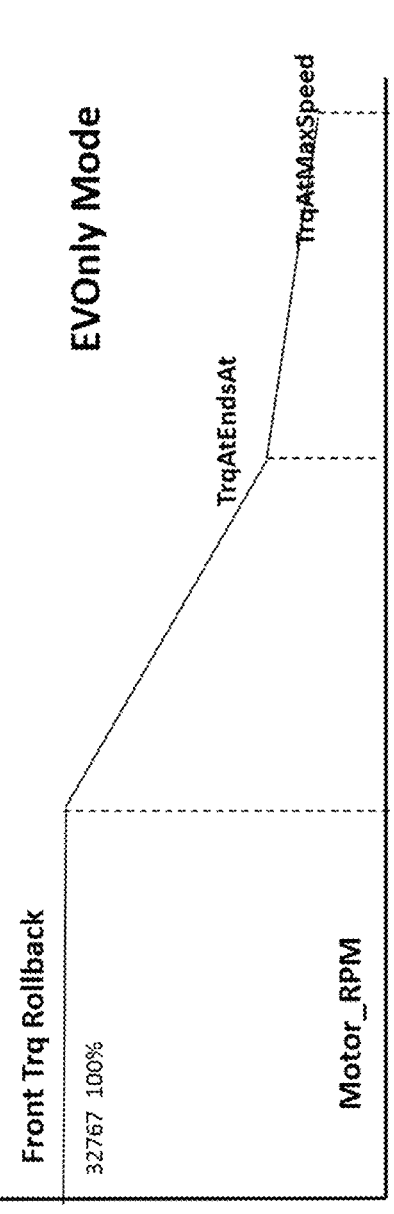
FIGS. 69A-69B are graphs for determining torque rollback drive current limits.
Figure 69B:
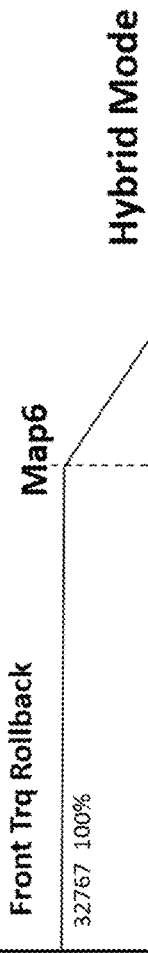

In an alternate embodiment of the present invention, the Front Torque Rollback means is operative to use one schedule for the EV Only Mode and another schedule when operating in the Hybrid Mode, as seen in the functions displayed in FIG. 69A and FIG. 69B.

It will be appreciated that the Front Torque Rollback schedule for the Hybrid Mode allows more power to be provided by the Front Motor at higher vehicle speeds.

It will be apparent that the control methods described hereinabove with respect to Traction Control for Dual All-Wheel Drive Electric Vehicles are operative in the Parallel Hybrid with CVT.

It will also be apparent that the methods described hereinabove for Optimizing Vehicle Performance with Underperforming Battery Modules are operative in the Parallel Hybrid with CVT.

It will also be apparent that all of the driveability features described hereinabove for the Dual Motor All Wheel Drive Vehicles are operative in the Parallel Hybrid with CVT.

It will also be apparent that the interlock control method described hereinabove for the Parallel Hybrid with CVT are operative in the Dual All-Wheel Drive Electric vehicle.

14. Safety Measure for Remote Control of Electric and Hybrid Vehicles

Yet another embodiment may provide safety measure for remote control of electric and hybrid vehicles. This aspect of the invention deals with control means for enhancing the safety of remote controlled electric and hybrid vehicles and in particular means for bringing the vehicle to a safe stop when remote control is lost.

Reference is made to FIGS. 70 and 71, which show a preferred method for bringing a remote-controlled vehicle to a safe stop in the event of a failure in the system.

Such control means may comprise a combination of mechanical and software control features, such as: (1) release of spring-loaded brake responsive to detection of loss of control of the vehicle, and/or (2) electrically disabling drive controllers responsive to detection of loss of control of the vehicle. The present embodiment may provide various other advantages as well.

15. Predicting Remaining Battery Life Based on Analysis of Total Energy Consumption Still another embodiment of the present disclosure is related to predicting remaining battery life of a vehicle based on Analysis of Total Energy Consumption.

As background to this embodiment, the state-of-health of a secondary battery when subject to variations in charge and discharge rates, battery cell temperature, unequal cell balancing, depth of discharge, etc. is an important factor in fleet management of electric and hybrid electric vehicles. This is especially critical in applications which require a guaranteed return-to-base capability.

III. Conclusion

Various inventions have been described in sufficient detail with a certain degree of particularity. It is understood to those skilled in the art that the present disclosure of embodiments has been made by way of examples only and that numerous changes in the arrangement and combination of parts may be resorted without departing from the spirit and scope of the present disclosure as claimed. While the embodiments discussed herein may appear to include some limitations as to the presentation of the information units, in terms of the format and arrangement, the embodiments have applicability well beyond such embodiment, which can be appreciated by those skilled in the art. Accordingly, the scope of the present disclosure is defined by the appended claims rather than the forgoing description of embodiments.

The invention claimed is:

1. A computing system coupled to a drive motor of a vehicle, wherein the vehicle is at least partially powered by a battery pack, the computing system comprising:
at least one processor;
non-transitory computer-readable medium; and
program instructions stored on the non-transitory computer-readable medium that are executable by the at least one processor such that the computing system is configured to:
based on at least (i) an estimated distance remaining in a current trip of the vehicle and (ii) an estimated terrain profile over the estimated distance, predict a total power required to complete the current trip of the vehicle;
determine a current charge level of the battery pack;
based on the predicted total power required to complete the current trip of the vehicle and the current charge level of the battery pack:
determine a maximum drive current that can be drawn from the battery pack; and
automatically limit a discharge from the battery pack to the maximum drive current;
receive an indication of an override condition;
based on the received indication of the override condition, discontinue limiting the discharge from the battery pack to the maximum drive current;
receive an indication that the override condition has ended; and
based on receiving the indication that the override condition has ended:
determine an updated charge level of the battery pack;
determine an updated maximum drive current that can be drawn from the battery pack; and
automatically limit the discharge from the battery pack to the updated maximum drive current.

2. The computing system of claim 1, wherein the estimated distance remaining in the current trip of the vehicle comprises a return trip distance.

3. The computing system of claim 2, further comprising program instructions stored on the non-transitory computer-readable medium that are executable by the at least one processor such that the computing system is configured to:
obtain global positioning system (GPS) data for the vehicle during the current trip of the vehicle; and
determine the estimated terrain profile over the return trip distance based on the obtained GPS data for the vehicle.

4. The computing system of claim 1, wherein the estimated terrain profile over the estimated distance comprises at least one downhill region, and wherein the program instructions that are executable by the at least one processor such that the computing system is configured to predict the total power required to complete the current trip of the vehicle comprise program instructions that are executable by the at least one processor such that the computing system is configured to:
determine an amount of regenerative braking current that will be supplied to the battery pack by the drive motor when the vehicle is operating in the downhill region.

5. The computing system of claim 4, further comprising program instructions stored on the non-transitory computer-readable medium that are executable by the at least one processor such that the computing system is configured to:
based on the amount of regenerative braking current that will be supplied to the battery pack by the drive motor when the vehicle is operating in the downhill region, increase the maximum drive current that can be drawn from the battery pack while the vehicle is operating in a region preceding the downhill region.

6. The computing system of claim 1, wherein the computing system is communicatively coupled to a remote computing device configured for remote control of the vehicle.

7. The computing system of claim 6, wherein the program instructions that are executable by the at least one processor such that the computing system is configured to receive the indication of the override condition comprise program instructions that are executable by the at least one processor such that the computing system is configured to:
receive an override signal from the remote computing device.

8. The computing system of claim 1, wherein the program instructions that are executable by the at least one processor such that the computing system is configured to receive the indication of the override condition comprise program instructions that are executable by the at least one processor such that the computing system is configured to:
receive, via a user interface of the vehicle, an operator input indicating the override condition.

9. A non-transitory computer-readable medium, wherein the non-transitory computer-readable medium is provisioned with program instructions that, when executed by at least one processor, cause a computing system coupled to a drive motor of a vehicle to:
based on at least (i) an estimated distance remaining in a current trip of the vehicle and (ii) an estimated terrain profile over the estimated distance, predict a total power required to complete the current trip of the vehicle, wherein the vehicle is at least partially powered by a battery pack;
determine a current charge level of the battery pack;
based on the predicted total power required to complete the current trip of the vehicle and the current charge level of the battery pack:
determine a maximum drive current that can be drawn from the battery pack; and
automatically limit a discharge from the battery pack to the maximum drive current;

receive an indication of an override condition;
based on the received indication of the override condition, discontinue limiting the discharge from the battery pack to the maximum drive current;
receive an indication that the override condition has ended; and
based on receiving the indication that the override condition has ended:
  determine an updated charge level of the battery pack;
  determine an updated maximum drive current that can be drawn from the battery pack; and
  automatically limit the discharge from the battery pack to the updated maximum drive current.

10. The non-transitory computer-readable medium of claim 9, wherein the estimated distance remaining in the current trip of the vehicle comprises a return trip distance.

11. The non-transitory computer-readable medium of claim 10, wherein the non-transitory computer-readable medium is also provisioned with program instructions that, when executed by at least one processor, cause the computing system to:
obtain global positioning system (GPS) data for the vehicle during the current trip of the vehicle; and
determine the estimated terrain profile over the return trip distance based on the obtained GPS data for the vehicle.

12. The non-transitory computer-readable medium of claim 9, wherein the estimated terrain profile over the estimated distance comprises at least one downhill region, and wherein the program instructions that, when executed by at least one processor, cause the computing system to predict the total power required to complete the current trip of the vehicle comprise program instructions that, when executed by at least one processor, cause the computing system to:
determine an amount of regenerative braking current that will be supplied to the battery pack by the drive motor when the vehicle is operating in the downhill region.

13. The non-transitory computer-readable medium of claim 12, wherein the non-transitory computer-readable medium is also provisioned with program instructions that, when executed by at least one processor, cause the computing system to:
based on the amount of regenerative braking current that will be supplied to the battery pack by the drive motor when the vehicle is operating in the downhill region, increase the maximum drive current that can be drawn from the battery pack while the vehicle is operating in a region preceding the downhill region.

14. The non-transitory computer-readable medium of claim 9, wherein the computing system is communicatively coupled to a remote computing device configured for remote control of the vehicle.

15. The non-transitory computer-readable medium of claim 14, wherein the program instructions that, when executed by at least one processor, cause the computing system to receive the indication of the override condition comprise program instructions that, when executed by at least one processor, cause the computing system to:
receive an override signal from the remote computing device.

16. The non-transitory computer-readable medium of claim 9, wherein the program instructions that, when executed by at least one processor, cause the computing system to receive the indication of the override condition comprise program instructions that, when executed by at least one processor, cause the computing system to:
receive, via a user interface of the vehicle, an operator input indicating the override condition.

17. A method carried out by a computing system coupled to a drive motor of a vehicle, wherein the vehicle is at least partially powered by a battery pack, the method comprising:
based on at least (i) an estimated distance remaining in a current trip of the vehicle and (ii) an estimated terrain profile over the estimated distance, predicting a total power required to complete the current trip of the vehicle;
determining a current charge level of the battery pack;
based on the predicted total power required to complete the current trip of the vehicle and the current charge level of the battery pack:
  determining a maximum drive current that can be drawn from the battery pack; and
  automatically limiting a discharge from the battery pack to the maximum drive current;
receiving an indication of an override condition;
based on the received indication of the override condition, discontinue limiting the discharge from the battery pack to the maximum drive current;
receiving an indication that the override condition has ended; and
based on receiving the indication that the override condition has ended:
  determining an updated charge level of the battery pack;
  determining an updated maximum drive current that can be drawn from the battery pack; and
  automatically limiting the discharge from the battery pack to the updated maximum drive current.

18. The method of claim 17, wherein the estimated distance remaining in the current trip of the vehicle comprises a return trip distance, the method further comprising:
obtaining global positioning system (GPS) data for the vehicle during the current trip of the vehicle; and
determining the estimated terrain profile over the return trip distance based on the obtained GPS data for the vehicle.

19. The method of claim 17, wherein the estimated terrain profile over the estimated distance comprises at least one downhill region, and wherein predicting the total power required to complete the current trip of the vehicle comprises:
determining an amount of regenerative braking current that will be supplied to the battery pack by the drive motor when the vehicle is operating in the downhill region.

20. The method of claim 17, wherein the computing system is communicatively coupled to a remote computing device configured for remote control of the vehicle, and wherein receiving the indication of the override condition comprises:
receiving an override signal from the remote computing device.

* * * * *